(12) United States Patent
Adachi et al.

(10) Patent No.: US 7,031,501 B2
(45) Date of Patent: Apr. 18, 2006

(54) IMAGE COLLATION METHOD AND APPARATUS AND RECORDING MEDIUM STORING IMAGE COLLATION PROGRAM

(75) Inventors: Takuya Adachi, Kanagawa (JP);
Satoshi Shigematsu, Kanagawa (JP);
Takahiro Hatano, Kanagawa (JP);
Mamoru Nakanishi, Kanagawa (JP);
Katsuyuki Machida, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 314 days.

(21) Appl. No.: 09/876,319

(22) Filed: Jun. 6, 2001

(65) Prior Publication Data
US 2002/0006233 A1    Jan. 17, 2002

(30) Foreign Application Priority Data
Jun. 9, 2000    (JP)    ............................. 2000-173342

(51) Int. Cl.
*G06K 9/00* (2006.01)
*G06K 9/74* (2006.01)
*G06K 9/64* (2006.01)

(52) U.S. Cl. ........................ 382/124; 382/278; 382/213

(58) Field of Classification Search ................ 382/124, 382/216–219, 278, 294, 295, 296
See application file for complete search history.

(56) References Cited

U.S. PATENT DOCUMENTS

| 4,581,760 A | 4/1986 | Schiller et al. |
| 4,641,350 A * | 2/1987 | Bunn .......................... 382/124 |
| 4,690,554 A | 9/1987 | Froelich |
| 4,983,036 A | 1/1991 | Froelich |
| 5,633,947 A | 5/1997 | Sibbald |
| 6,094,499 A * | 7/2000 | Nakajima et al. ........... 382/124 |

FOREIGN PATENT DOCUMENTS

| EP | 0 251 504 A | 1/1988 |
| JP | 05-089244 | 4/1993 |

OTHER PUBLICATIONS

Ratkovic J.A., et al, "Concepts for a Next Generation Automated Fingerprint System", Prceedings of the Carnahan Conference on Crime Countermeasures, pp. 157-161.
Kobayashi, T. "A Fingerprint Image Recognition Method for Network User Identification", Proceedings ICCI 4th International Conference on Computing & Information, pp. 369-372.

* cited by examiner

*Primary Examiner*—Jingge Wu
*Assistant Examiner*—Wes Tucker
(74) *Attorney, Agent, or Firm*—Blakely Sokoloff Taylor & Zafman

(57) ABSTRACT

An image collation apparatus includes a collation unit, minimum coincidence ratio extraction unit, and determination unit. The collation unit obtains a coincidence ratio between first and second images within a printing element range for each collation unit by collating the first and second images with each other. The minimum coincidence ratio extraction unit obtains a minimum coincidence ratio from coincidence ratios obtained from the collation unit. The determination unit determines that the first and second images are identical, if the extracted minimum coincidence ratio is smaller than a predetermined threshold. An image collation method is also disclosed.

44 Claims, 47 Drawing Sheets

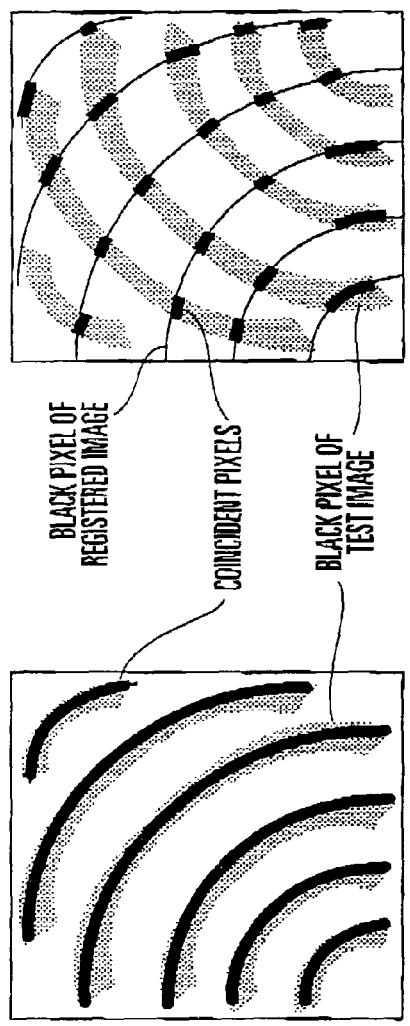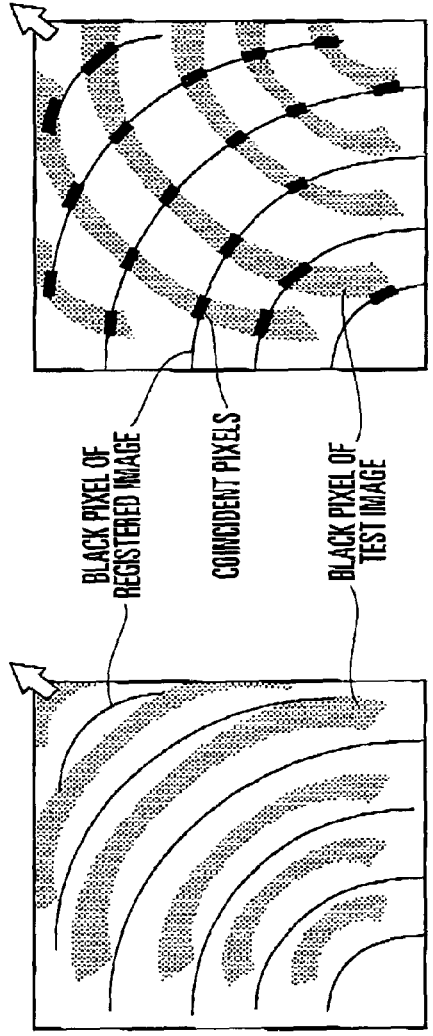
FIG.4A  FIG.4C  FIG.4B  FIG.4D

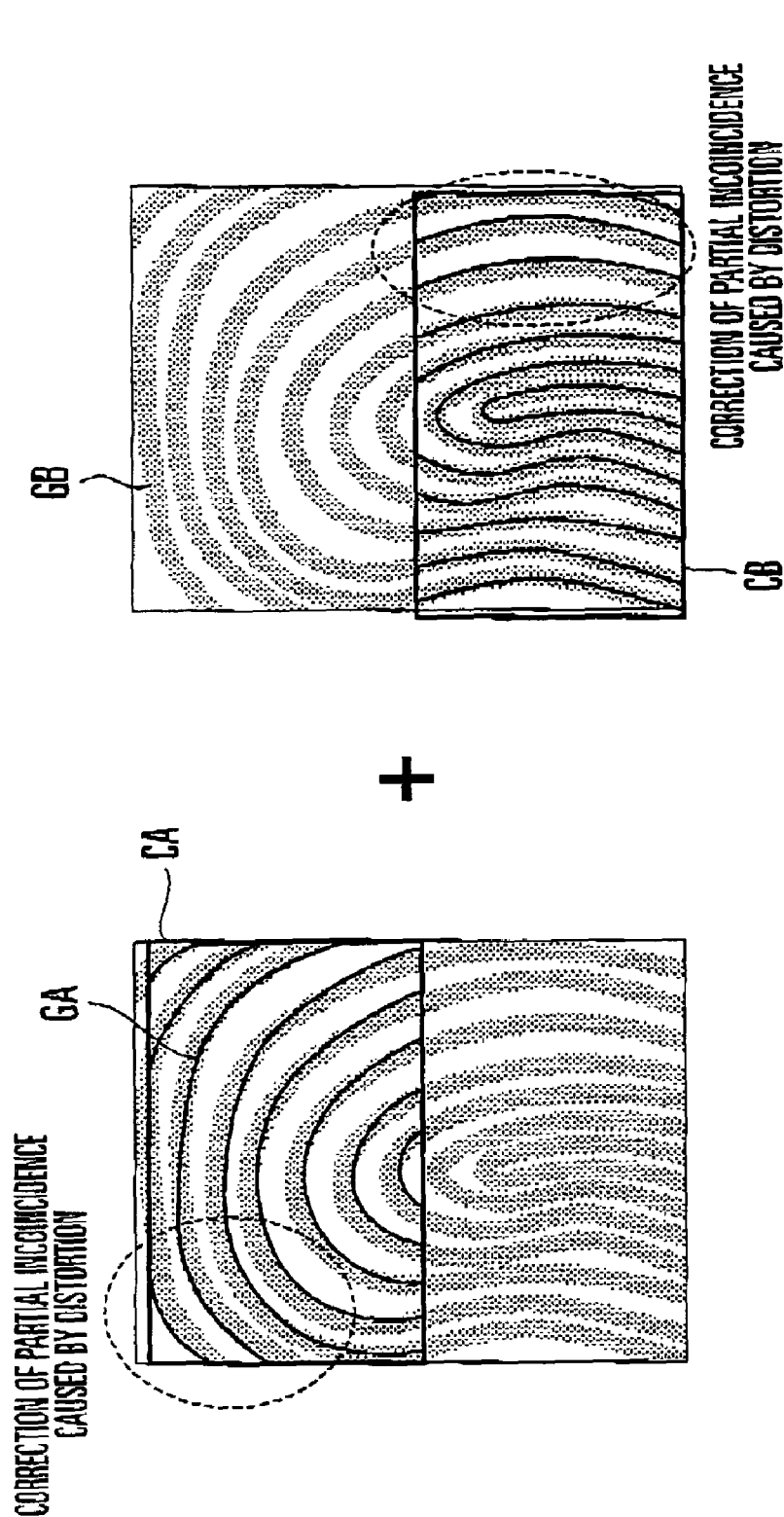

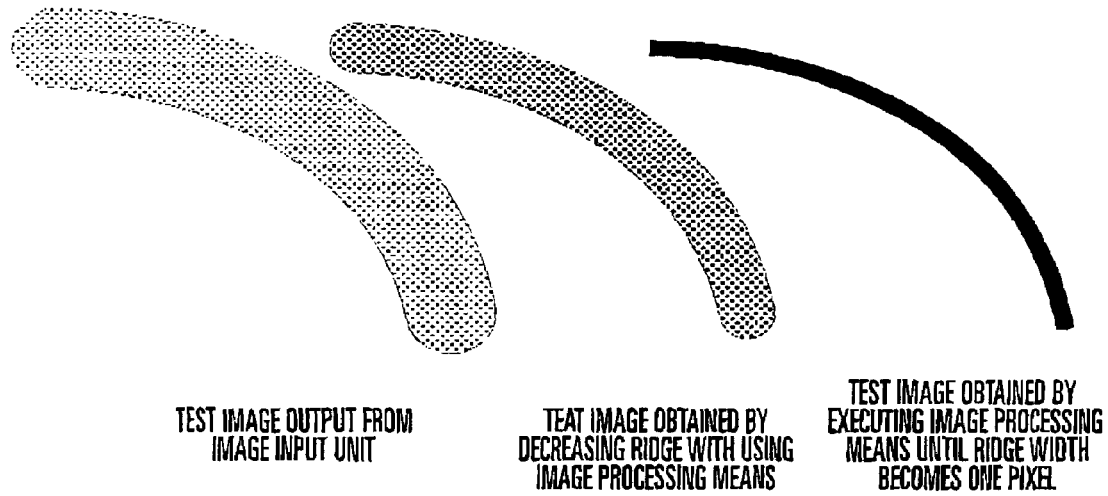
| TEST IMAGE OUTPUT FROM IMAGE INPUT UNIT | TEAT IMAGE OBTAINED BY DECREASING RIDGE WITH USING IMAGE PROCESSING MEANS | TEST IMAGE OBTAINED BY EXECUTING IMAGE PROCESSING MEANS UNTIL RIDGE WIDTH BECOMES ONE PIXEL |
|---|---|---|
| FIG.28A | FIG.28B | FIG.28C |
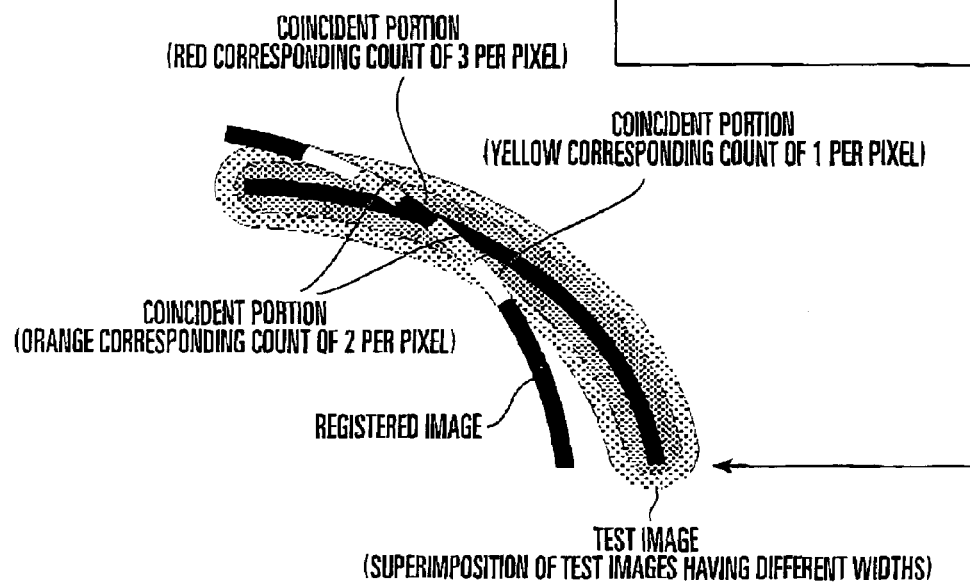
FIG.29

IMAGE COLLATION METHOD AND APPARATUS AND RECORDING MEDIUM STORING IMAGE COLLATION PROGRAM

BACKGROUND OF THE INVENTION

The present invention relates to an image collation apparatus and, more particularly, to an image collation method and apparatus for images such as fingerprint, noseprint, iris, and texture pattern images, and a recording medium storing an image collation program.

Various image collation apparatuses for collating images such as fingerprint, noseprint, iris, and texture pattern images have been known. For example, in the fingerprint collation apparatus disclosed in Kobayashi, "A Fingerprint Verification Method Using Thinned Image Pattern Matching", THE TRANSACTIONS OF THE INSTITUTE OF ELECTRONICS, INFORMATION AND COMMUNICATION ENGINEERS (D-II), vol. J79-D-II, no. 3, pp. 330–340, March 1996, pattern matching is performed for fingerprint images themselves to check whether the two images are identical or different fingerprint images. FIG. 42 shows the arrangement of a fingerprint collation apparatus using such pattern matching. This fingerprint collation apparatus is comprised of an image input unit 101, image database 201, and image processing unit 305.

The image input unit 101 detects the ridges/valleys of the skin of a finger placed on a sensor by using the sensor, and performs image processing such as analog/digital conversion and binarization for a signal output from the sensor. An output from the image input unit 101 is a binary image representing a ridge of the finger skin by a pixel having a luminance corresponding to black (black pixel) and representing a valley of the finger skin by a pixel having a luminance corresponding to white (white pixel). Note that a ridge of the finger skin may be represented by a white pixel, and a valley of the finger skin may be represented by a black pixel.

The image database 201 stores fingerprint images acquired in advance as registered data. The images stored in the image database 201 will be referred to as registered images.

The image processing unit 305 collates the test image output from the image input unit 101 with the registered image output from the image database 201 to check whether the two images are identical or different fingerprint images. To improve the determination precision (collation precision), the image processing unit 305 includes an image transformation means 15, collation means 23, maximum coincidence ratio extraction means 32, and determination means 53.

The image transformation means 15 translates (shifts) and rotates each pixel of an input test image by a predetermined change amount, and outputs the resultant test image. The collation means 23 compares the luminance values of pixels at corresponding positions in the test image output from the image transformation means 15 and the registered image output from the image database 201, totals the number of pixels whose luminance values coincide with each other within a predetermined collation region, and obtains the degree or similarity (coincidence ratio) between the test image and the registered image on the basis of the totaled number of coincident pixels and the number of black pixels of the registered image. The collation means 23 also outputs a translation amount 408 to the image transformation means 15 to make the image transformation means 15 repeatedly perform translation and rotation and repeatedly perform collation by itself until the translation amount falls outside a predetermined range.

The maximum coincidence ratio extraction means 32 obtains the maximum value (maximum coincidence ratio) from the coincidence ratios output from the collation means 23 and outputs it.

The determination means 53 compares the maximum coincidence ratio with a predetermined threshold If the maximum coincidence ratio is equal to or more than the threshold, the determination means 53 determines that the two image are identical fingerprint images. If the maximum coincidence ratio is smaller than the threshold, the determination means 53 determines that the two images are different fingerprint images.

FIG. 43 shows the collating operation of the fingerprint collation apparatus in FIG. 42. First of all, the image input unit 101 detects the fingerprint of a finger placed on the sensor and generates a test image (step S51). Upon reception of the test image from the image input unit 101 (step S52) and the registered image from the image database 201 (step S53), the image processing unit 305 causes the collation means 23 to compare/collate the test image output from the image transformation means 15 with the registered image output from the image database 201 so as to obtain coincidence ratios (step S55) while causing the image transformation means 15 to translate and rotate the test image (step S54).

The image processing unit 305 then causes the maximum coincidence ratio extraction means 32 to obtain the maximum coincidence ratio from the coincidence ratios (steps S56 and S57). The image processing unit 305 repeats the above translating operation and comparison/collation until the translation amount falls outside a predetermined range (NO in step S58).

Finally, the determination means 53 of the image processing unit 305 determines that the two images are identical fingerprint images, if a maximum coincidence ratio 417 is equal to or more than the threshold (YES in step S59). If the maximum coincidence ratio 417 is smaller than the threshold, the determination means 53 determines that the two images are different fingerprint images. Note that the image processing performed by the image transformation means 15 may be performed for a registered image instead of a test image.

In the conventional fingerprint collation apparatus using pattern matching, since a maximum coincidence ratio used as a determination index is obtained from the number of coincident pixels, the ratio of the number of black pixels to the total number of pixels of each test image must be kept constant. If, for example, the ratio of the number of black pixels to the total number of pixels is set to 50%, the maximum coincidence ratio in collation between two fingerprint images acquired from different fingers (user-to-others collation) becomes about 50%. In contrast to this, the maximum coincidence ratio in collation between two fingerprint images acquired from a single finger (user-to-user collation) ideally becomes 100%. In practice, however, this ratio becomes much lower than 100% due to a positional offset or the like. As a consequence, the difference in maximum coincidence ratio between user-to-others collation and user-to-user collation becomes small. For this reason, in a conventional fingerprint collation apparatus using a maximum coincidence ratio as a determination index, it is difficult to set a threshold for determination of identical or different fingerprint images, resulting in a deterioration in collation precision. Image collation apparatus other than a fingerprint collation apparatus also suffer this problem.

SUMMARY OF THE INVENTION

It is a principal object of the present invention to provide an image collation method and apparatus which can improve the collation precision as compared with the prior art and a recording medium storing an image collation program.

In order to achieve the above object, according to the present invention, there is provided an image collation apparatus comprising first collation means for obtaining a coincidence ratio between first and second images within a printing element range for each collation unit by collating the first and second images with each other, minimum coincidence ratio extraction means for obtaining a minimum coincidence ratio from coincidence ratios obtained from the first collation means, and determination means for determining that the first and second images are identical, if the extracted minimum coincidence ratio is smaller than a predetermined threshold.

BRIEF DESCRIPTION OF THE DRAWINGS

FIGS. 4A to 4D are enlarged views showing fingerprints to explain the principle of the first embodiment of the present invention;

FIGS. 21A and 21B are views for explaining actual fingerprint collation to explain the 11th embodiment;

FIGS. 28A to 28C are views showing changes in the ridge width of a test image to explain the 16th embodiment;

FIG. 29 is a schematic view showing superimposition of test images in partial regions with optimal position correction to explain the 16th embodiment;

DESCRIPTION OF THE PREFERRED EMBODIMENTS

According to the basic concept of the present invention, image processing is performed for one of the first and second images to facilitate collation, the first and second images after this image processing are compared/collated to obtain the degrees of similarity (coincidence ratios), and a value associated with at least the minimum coincidence ratio is obtained, thereby determining whether the first and second images are identical to each other.

As this determination processing, in addition to the method of making a determination by obtaining a minimum coincidence ratio itself, for example, the following methods may be used: a method of making a determination on the basis of the difference between maximum and minimum values, and a method of making a determination on the basis of the quotient of maximum and minimum values.

As image processing, in addition to position correction of the first and second images, the operation of repeatedly thinning and fattening images to increase the degree of similarity (coincidence ratio) and the like are selectively performed. As comparing/collating operation, the operation of comparing/collating entire images with each other or the operation of sequentially comparing/collating partly selected ranges of images is selected.

The present invention will be described below in conjunction with the embodiments. In the following embodiments, only fingerprint images are described as images. However, the present invention can be applied to collation of similar images such as noseprint, iris, and texture pattern images.

(First Embodiment)

Figure 1:
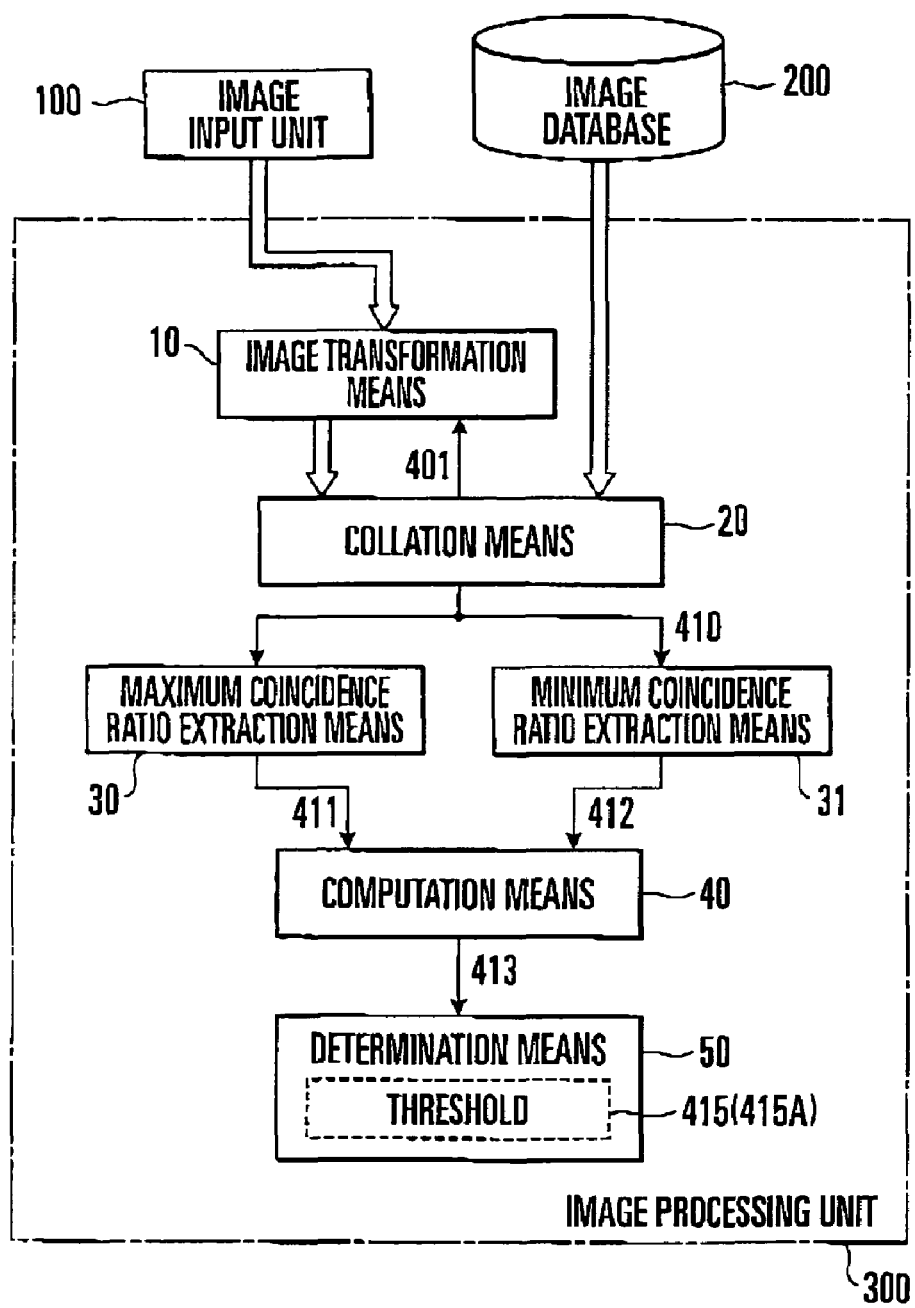
FIG. 1 is a block diagram showing the arrangement of an image collation apparatus according to the first embodiment of the present invention.

FIG. 1 shows the arrangement of an image collation apparatus according to the first embodiment of the present invention. This image collation apparatus is comprised of an image input unit 100, image database 200, and image processing unit 300.

The image input unit 100 detects ridges/valleys of the skin of a finger placed on the sensor (not shown) of the apparatus, and performs image processing such as analog/digital image conversion (A/D conversion) and binarization for a signal output from the sensor. An output from the image input unit 100 is a binary image representing a ridge of the finger skin by a pixel having a luminance corresponding to black (black pixel) and representing a valley of the finger skin by a pixel having a luminance corresponding to white (white pixel). An image output from the image input unit 100 will be referred to as a test image hereinafter.

The image input unit 100 is comprised of a capacitance detection type fingerprint sensor for sensing a fingerprint ridge/valley pattern by detecting the capacitances formed between the electrodes of small sense units two-dimensionally arranged on an LSI chip and the skin of a finger that touches the electrodes through an insulating film, an A/D converter for A/D-converting an output signal from the sensor, a processor for executing image processing such as binarization for output data from the A/D converter, and a storage unit such as a semiconductor memory for storing image data. For example, such a capacitance detection type fingerprint sensor is disclosed in M. Tartagni and R. Guerrieri, "A fingerprint sensor based on the feedback capacitive sensing scheme", IEEE J. Solid-State Circuits, Vol 33, pp. 133–142, January 1998.

The image database 200 stores fingerprint images acquired in advance as registered data. The image database 200 is formed by a storage unit such as a hard disk unit or nonvolatile memory. Each image stored in the image database 200 will be referred to as a registered image hereinafter.

The image processing unit 300 compares/collates the test image output from the image input unit 100 with the registered image output from the image database 200 to determine whether the two images are identical fingerprint images or different fingerprint images. To improve the determination precision (collation precision), the image processing unit 300 includes an image transformation means 10, collation means 20, maximum coincidence ratio extraction means 30, minimum coincidence ratio extraction means 31, computation means 40, and determination means 50.

The image transformation means 10 outputs a test image obtained by translating (shifting) each pixel of an input test image from the initial position (the position set when the image is input from the image input unit 100) by a predetermined amount (for each collation unit) in accordance with a translation amount designation signal 401. Shifting operation by the image transformation means 10 will be described. First of all, a coordinate system is set for the test image. Linear transformation is then performed to translate the coordinates of each pixel determined by this coordinate system. Finally, an image is reconstructed on the basis of the coordinates of each pixel after the linear transformation, thus generating a translated test image for each collation unit.

The collation means 20 compares/collates the luminance values of the respective pixels at corresponding positions in the test image output from the image transformation means 10 and the registered image output from the image database 200, and totals the number of black pixels whose luminance values coincide with each other in a predetermined collation region. The collation means 20 then divides the totaled number of coincident pixels by the number of black pixels of the registered image to obtain the degree of similarity (coincidence ratio) between the test image and the registered image. Note that the number of coincident pixels×2/(the number of black pixels of the registered image+the number of black pixels of the test image) may be set as a coincidence ratio.

If the movement amount of the test image from the initial position to the current position (the position set after translation is performed by the image transformation means 10) falls within a predetermined range, the collation means 20 outputs the translation amount designation signal 401 for designating the movement amount of the test image for each moving operation to the image transformation means 10, thereby executing translation of the test image and calculation of a coincidence ratio again. The image transformation means 10 translates the test image by the amount designated by the translation amount designation signal 401.

The maximum coincidence ratio extraction means 30 obtains a maximum coincidence ratio 411 from coincidence ratios 410 output from the collation means 20, and outputs the obtained coincidence ratio.

The minimum coincidence ratio extraction means 31 obtains a minimum coincidence ratio 412 from the coincidence ratios 410 output from the collation means 20, and outputs the obtained coincidence ratio.

The computation means 40 calculates a difference (coincidence ratio difference) 413 between the maximum coincidence ratio 411 output from the maximum coincidence ratio extraction means 30 and the minimum coincidence ratio 412 output from the minimum coincidence ratio extraction means 31. This difference may be an absolute value.

The determination means 50 compares the coincidence ratio difference 413 with a predetermined threshold 415. If the coincidence ratio difference 413 is equal to or more than threshold, the determination means 50 determines that the two images are identical fingerprint images. If the coincidence ratio difference 413 is smaller than the threshold, the determination means 50 determines that the two images are difference fingerprint images.

Figure 2:
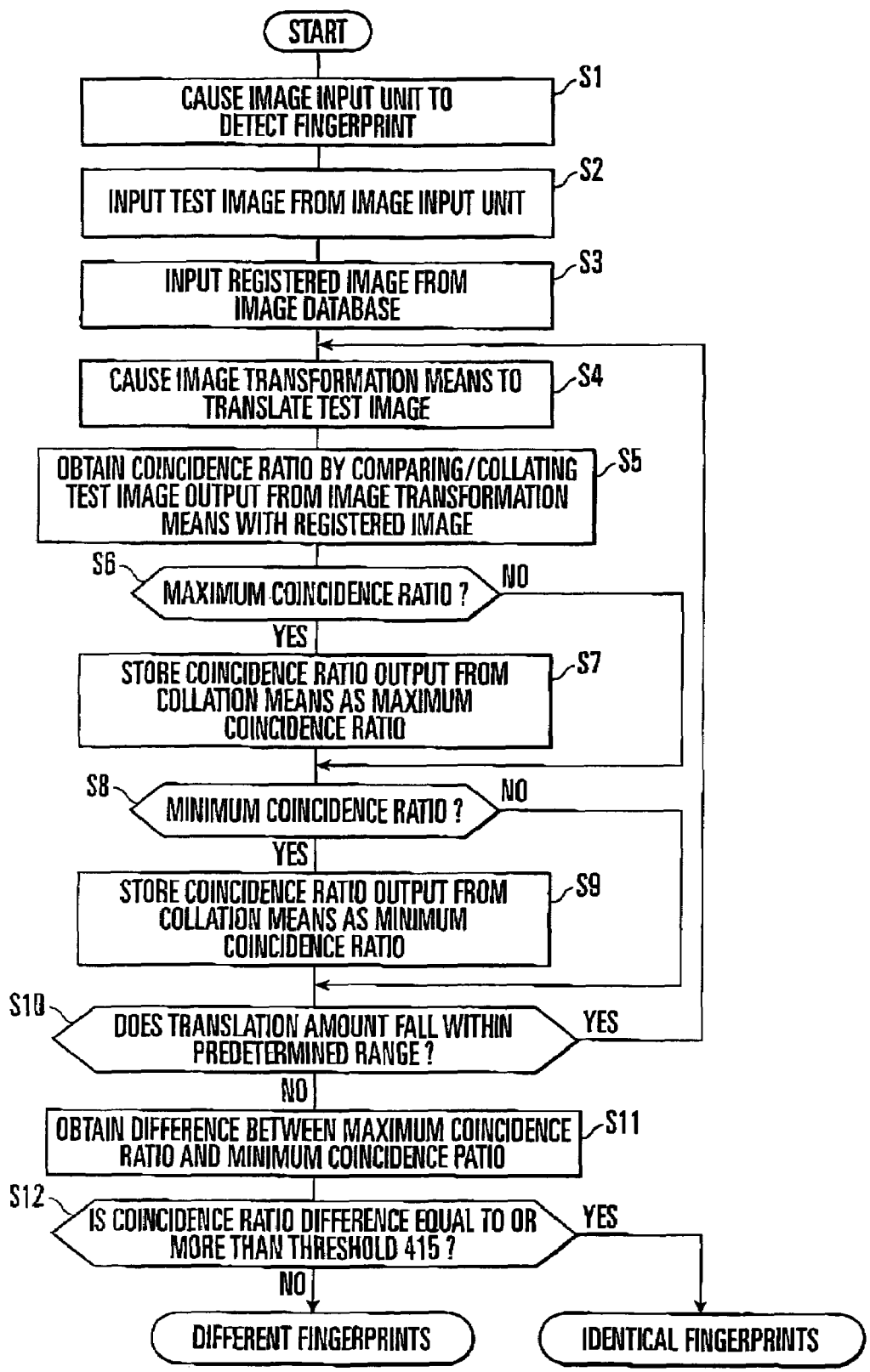
FIG. 2 is a flow chart showing the collating operation of the image collation apparatus in FIG. 1.

FIG. 2 shows collating operation performed by the image collation apparatus in FIG. 1. First of all, the image input unit 100 detects the fingerprint of a finger placed on the sensor and generates a test image (step S1). The image processing unit 300 receives the test image from the image input unit 100 (step S2). Upon reception of a registered image from the image database 200 (step S3), the image processing unit 300 translates the test image for each collation unit by using the image transformation means 10 (step S4).

The collation means 20 compares/collates the test image output from the image transformation means 10 with the registered image output from the image database 200 to obtain the coincidence ratio 410, and stores it if necessary (step S5).

The maximum coincidence ratio extraction means 30 checks whether the coincidence ratio 410 output from the collation means 20 is a maximum value (step S6). If the output value is a maximum value, the maximum coincidence ratio extraction means 30 stores the maximum value as the maximum coincidence ratio 411 (step S7).

The minimum coincidence ratio extraction means 31 checks whether the coincidence ratio 410 output from the collation means 20 is a minimum value (step S8). If the output value is a minimum value, the minimum coincidence ratio extraction means 31 stores the minimum value as the minimum coincidence ratio 412 (step S9).

The collation means 20 also checks whether the movement amount of the test image from the initial position to the current position falls within a predetermined range (step S10). If the movement amount falls within the predetermined range, the collation means 20 outputs the translation amount designation signal 401 to the image transformation means 10. In this manner, the processing in steps S4 to S9 is repeated as long as the movement amount of the test image from the initial position to the current position falls within the predetermined range.

If the movement amount of the test image exceeds the predetermined range (NO in step S10), the computation means 40 calculates the coincidence ratio difference 413 which is the difference between the maximum coincidence ratio 411 and the minimum coincidence ratio 412 (step S11).

The determination means 50 compares the coincidence ratio difference 413 with the predetermined threshold 415 (step S12). If the coincidence ratio difference 413 is equal to or more than the threshold, the determination means 50 determines that the two images are identical fingerprint images. If the coincidence ratio difference 413 is smaller than the threshold, the determination means 50 determines that the two images are different fingerprint images.

Figures 3A, 3B:
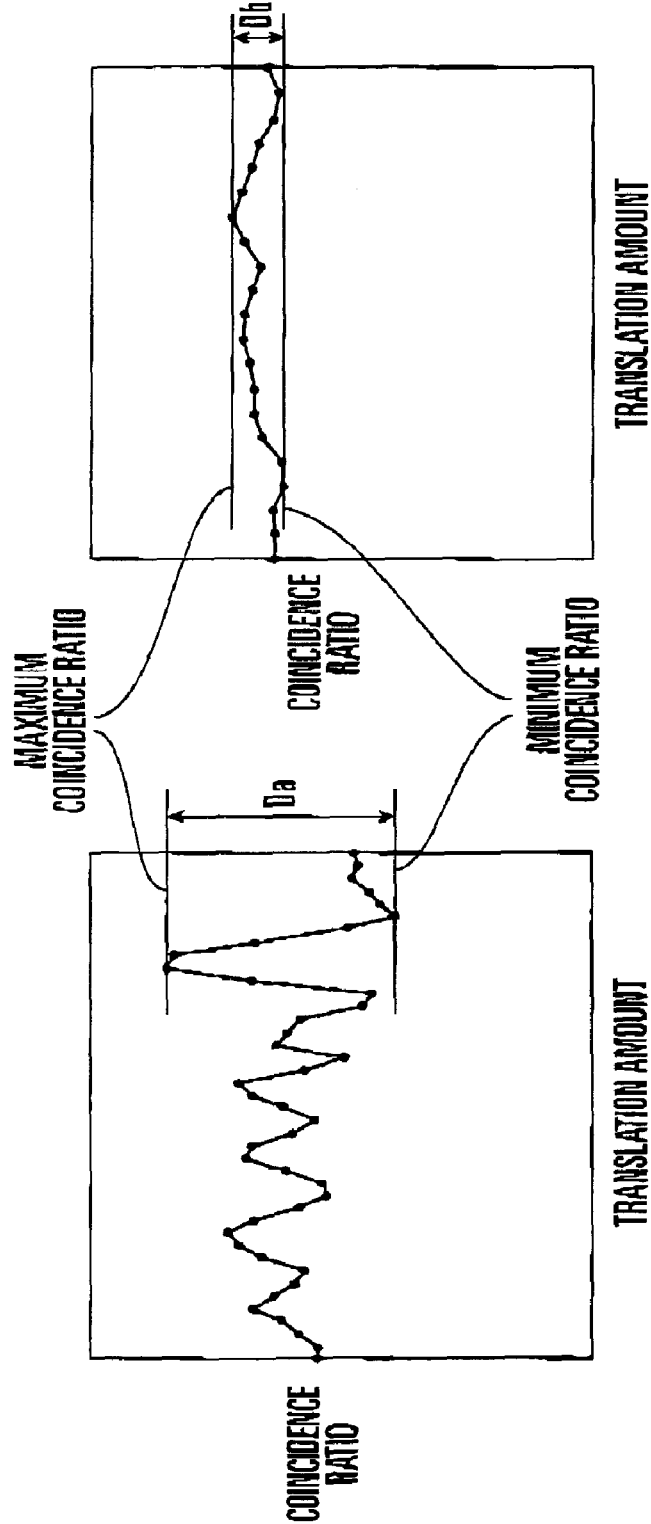
FIGS. 3A and 3B are graphs showing the relationship between the translation amount of a test image and the coincidence ratio in the first embodiment of the present invention.

Each of FIGS. 3A and 3B shows the relationship between the translation amount of the test image translated by the image transformation means 10 and the coincidence ratios 410 output from the collation means 20. FIG. 3A shows collation of fingerprint images acquired from the same finger (user-to-user collation). FIG. 3B shows collation of fingerprint images acquired from different fingers (user-to-others collation). Referring to FIGS. 3A and 3B, when Da and Db are compared with each other, it is found that the coincidence ratio differences (Da and Db) in user-to-user collation and user-to-others collation clearly differ from each other. The reason for this difference will be described with reference to FIGS. 4A to 4D.

FIGS. 4A and 4B show user-to-user collation. FIG. 4B shows a case where the test image in FIG. 4A is translated in the direction indicated by the arrow. FIG. 4C shows user-to-others collation. FIG. 4D shows a case where the test image in FIG. 4C is translated in the direction indicated by the arrow.

In the case of user-to-user collation, since the fingerprint ridges (black pixels) of a registered image and test image have the same periodicity, a minimum coincidence ratio tends to be obtained near the position where a maximum coincidence ratio in FIG. 4A is obtained, as shown in FIG. 4B. In contrast to this, in the case of user-to-others collation in which fingerprint ridges of a registered image and test image differ in periodicity, the number of coincident pixels increases as a registered image and test image cross each other, as shown in FIGS. 4C and 4D, and there is not any tendency like that described in the case of user-to-user collation. This difference causes a large difference in determination index (coincidence ratio difference) between user-to-user collation and user-to-others collation. As described above, in this embodiment, the difference in determination index between user-to-user collation and user-to-others collation can be increased. This makes it possible to improve the collation precision.

(Second Embodiment)

Figure 5:
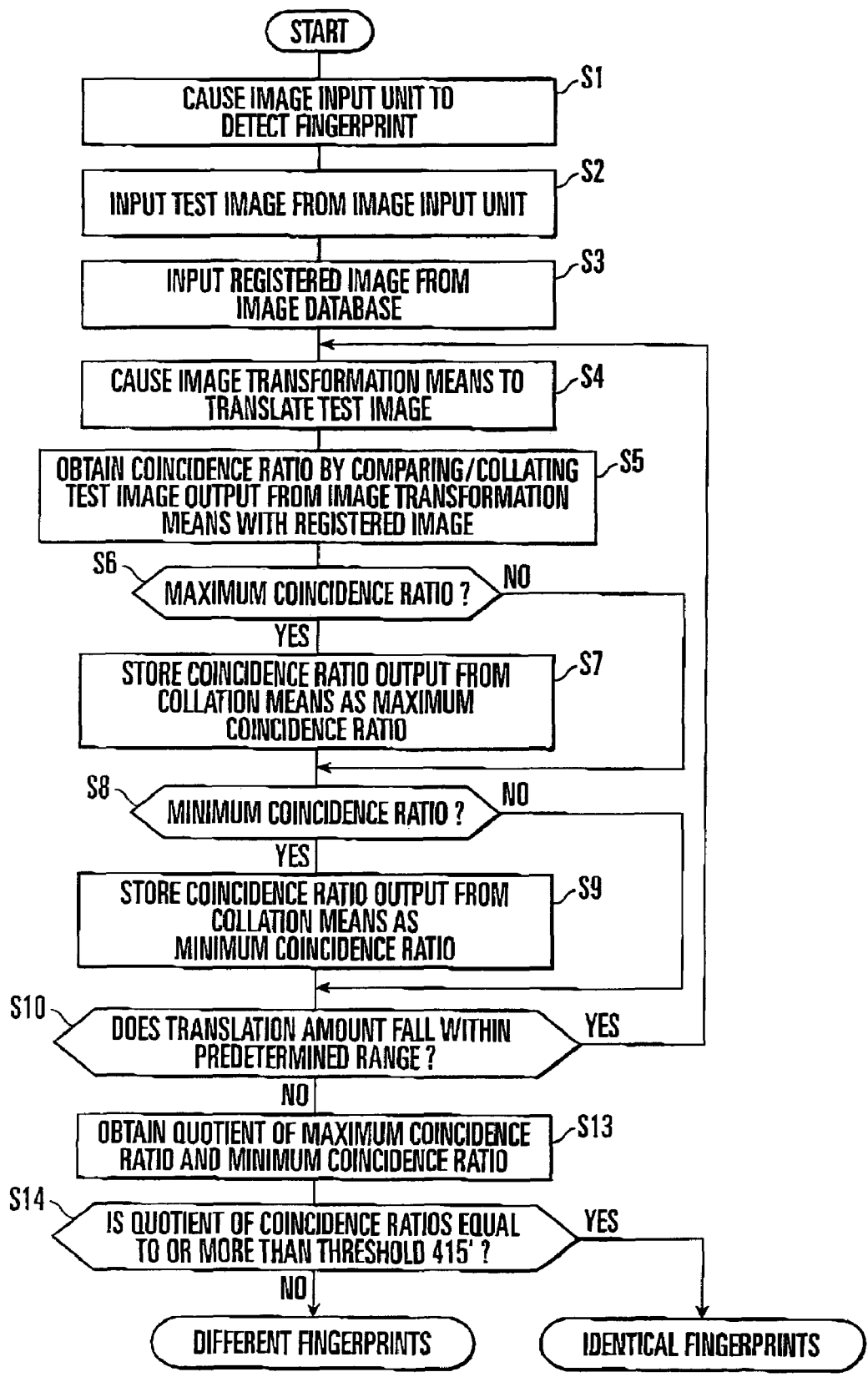
FIG. 5 is a flow chart showing the collating operation of an image collation apparatus according to the second embodiment of the present invention.

FIG. 5 shows the collation operation of an image collation apparatus according to the second embodiment of the present invention. The same reference numerals as in FIG. 2 denote the same parts in FIG. 5. The arrangement of the image collation apparatus of the embodiment shown in FIG. 5 is almost the same as that of the first embodiment, and hence will be described with reference to FIG. 1 The differences between this embodiment and the first embodiment are that a computation means 40 of an image processing unit 300 obtains the quotient by dividing a maximum coincidence ratio 411 by a minimum coincidence ratio 412 instead of obtaining a coincidence ratio difference (Da and Db), and a determination means 50 compares the coincidence ratio quotient output from the computation means 40, as a determination index, with a predetermined threshold 415'.

The operation of the image collation apparatus according to the second embodiment will be described next. The processing in steps S1 to S10 is the same as that in the first embodiment. If the movement amount of the test image from the initial position to the current position exceeds a predetermined range (NO in step S10), the computation means 40 calculates a quotient by dividing the maximum coincidence ratio 411 by the minimum coincidence ratio 412 (step S13).

The determination means 50 compares this coincidence ratio quotient with the predetermined threshold 415' (step S14). If the coincidence ratio quotient is equal to or more than the threshold, the determination means 50 determines that the two images are identical fingerprint images. If the coincidence ratio quotient is smaller than the threshold, the determination means 50 determines that the two images are different fingerprint images. In this embodiment, if the minimum coincidence ratio 412 between the test image and the registered image is smaller than the maximum coincidence ratio 411 by two or more orders of magnitude, the difference in determination index between user-to-user collation and user-to-others collation can be increased, thus improving the collation precision.

(Third Embodiment)

Figure 6:
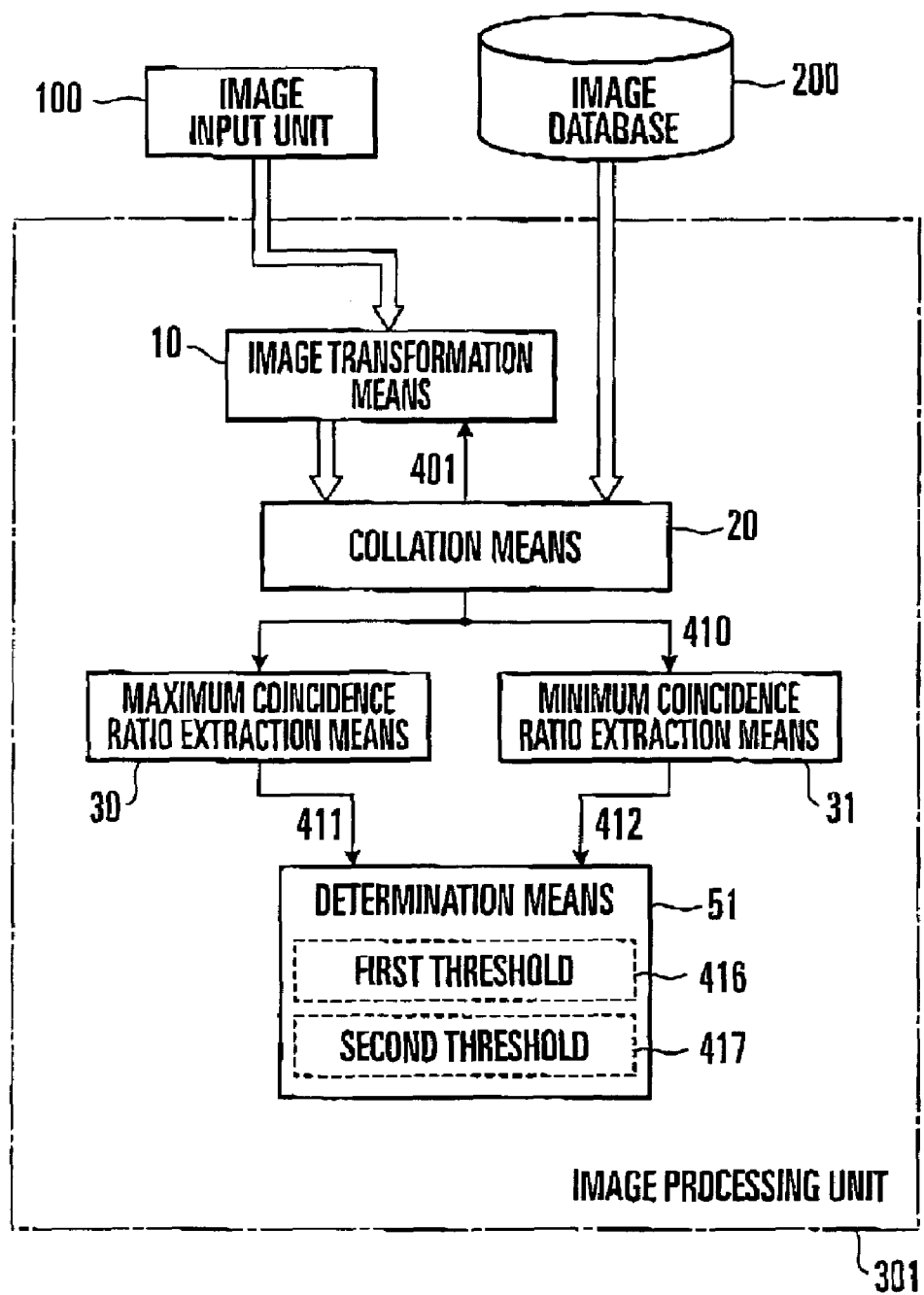
FIG. 6 is a block diagram showing the arrangement of an image collation apparatus according to the third embodiment of the present invention.

FIG. 6 shows the arrangement of an image collation apparatus according to the third embodiment of the present invention. The same reference numerals as in FIG. 1 denote the same parts in FIG. 6. The differences between this embodiment and the first embodiment are that an image processing unit 301 does not have the computation means 40 and has a determination means 51, in place of the determination means 50, which compares a maximum coincidence ratio 411 and minimum coincidence ratio 412 with predetermined thresholds, respectively, and determines that the test image and registered image are identical fingerprint images, only when the maximum coincidence ratio 411 is equal to or more than a first threshold 416, and the minimum coincidence ratio 412 is smaller than a second threshold 417 (first threshold≧second threshold).

Figure 7:
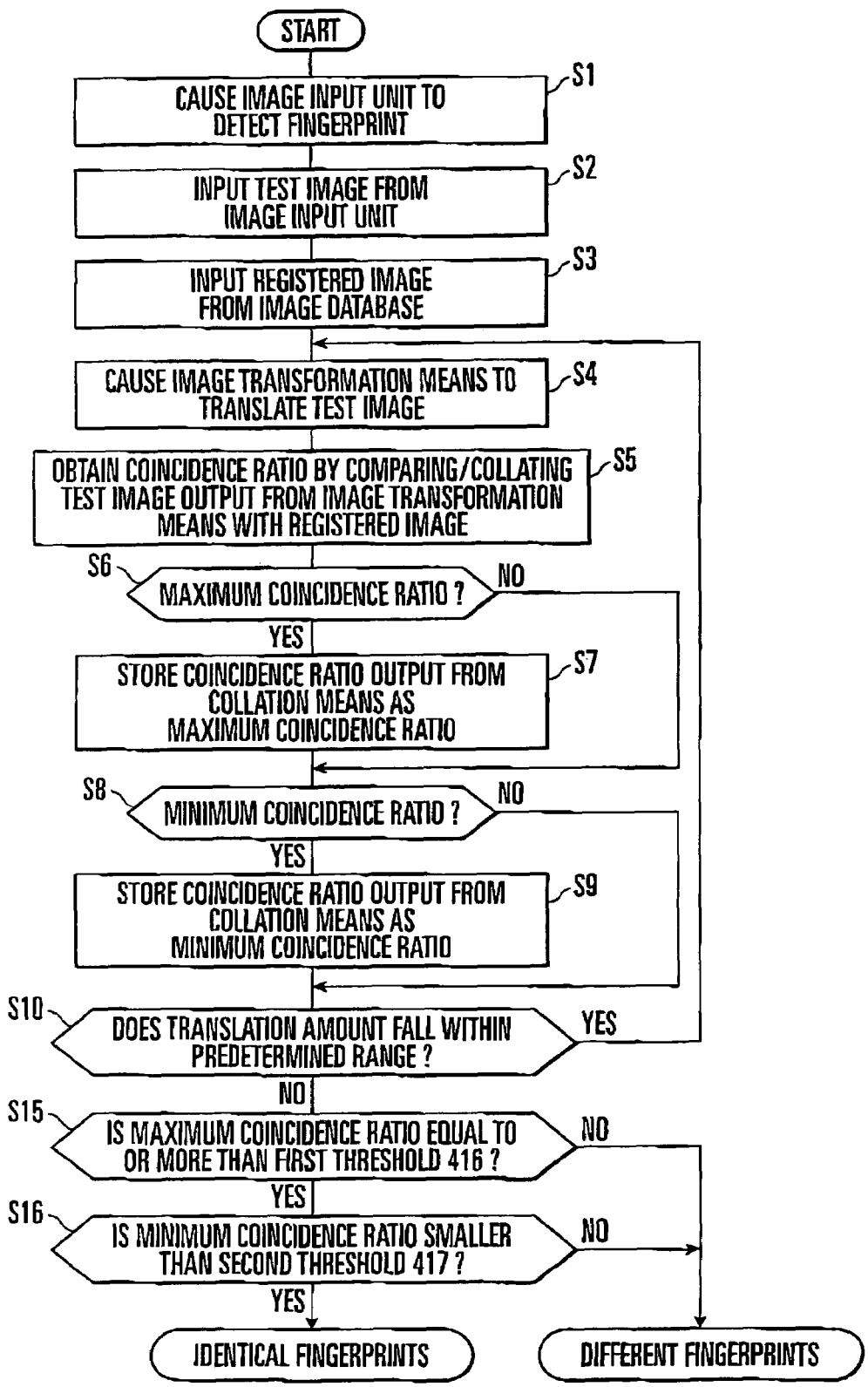
FIG. 7 is a flow chart showing the collating operation of the image collation apparatus in FIG. 6.

FIG. 7 shows the collating operation of the image collation apparatus according to this embodiment. The same reference symbols as in FIG. 2 denote the same processing in FIG. 7. The processing in steps S1 to S10 is the same as that in the first embodiment. If the movement amount of the test image from the initial position to the current position exceeds a predetermined range (NO in step S10), the determination means 51 compares the maximum coincidence ratio 411 output from a maximum coincidence ratio extraction means 30 with a predetermined first threshold (step S15). If the maximum coincidence ratio 411 is smaller than the first threshold, the determination means 51 determines that the two images are different fingerprint images.

If it is determined in step S15 that the maximum coincidence ratio 411 is equal to or more than the first threshold 416, the determination means 51 compares the minimum coincidence ratio 412 output from the minimum coincidence ratio extraction means 31 with the predetermined second threshold 417 (step S16). If the minimum coincidence ratio 412 is smaller than the second threshold, the determination means 51 determines that the two image are identical fingerprint images. If the minimum coincidence ratio 412 is equal or more than the second threshold, the determination means 51 determines that the two image are different fingerprint images.

Figure 8:
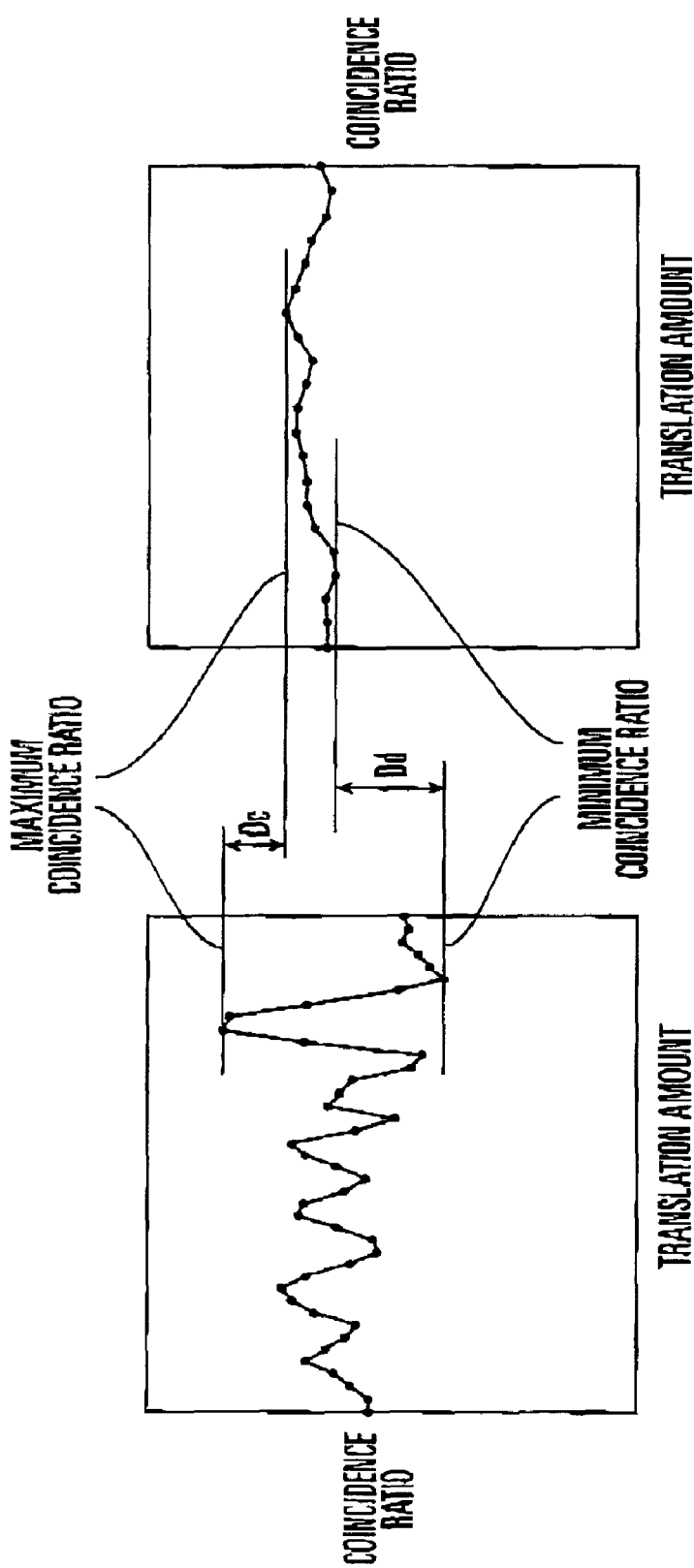
FIGS. 8A and 8B are graphs showing the relationship between the translation amount of a test image and the coincidence ratio in the third embodiment of the present invention.
Figure 42:
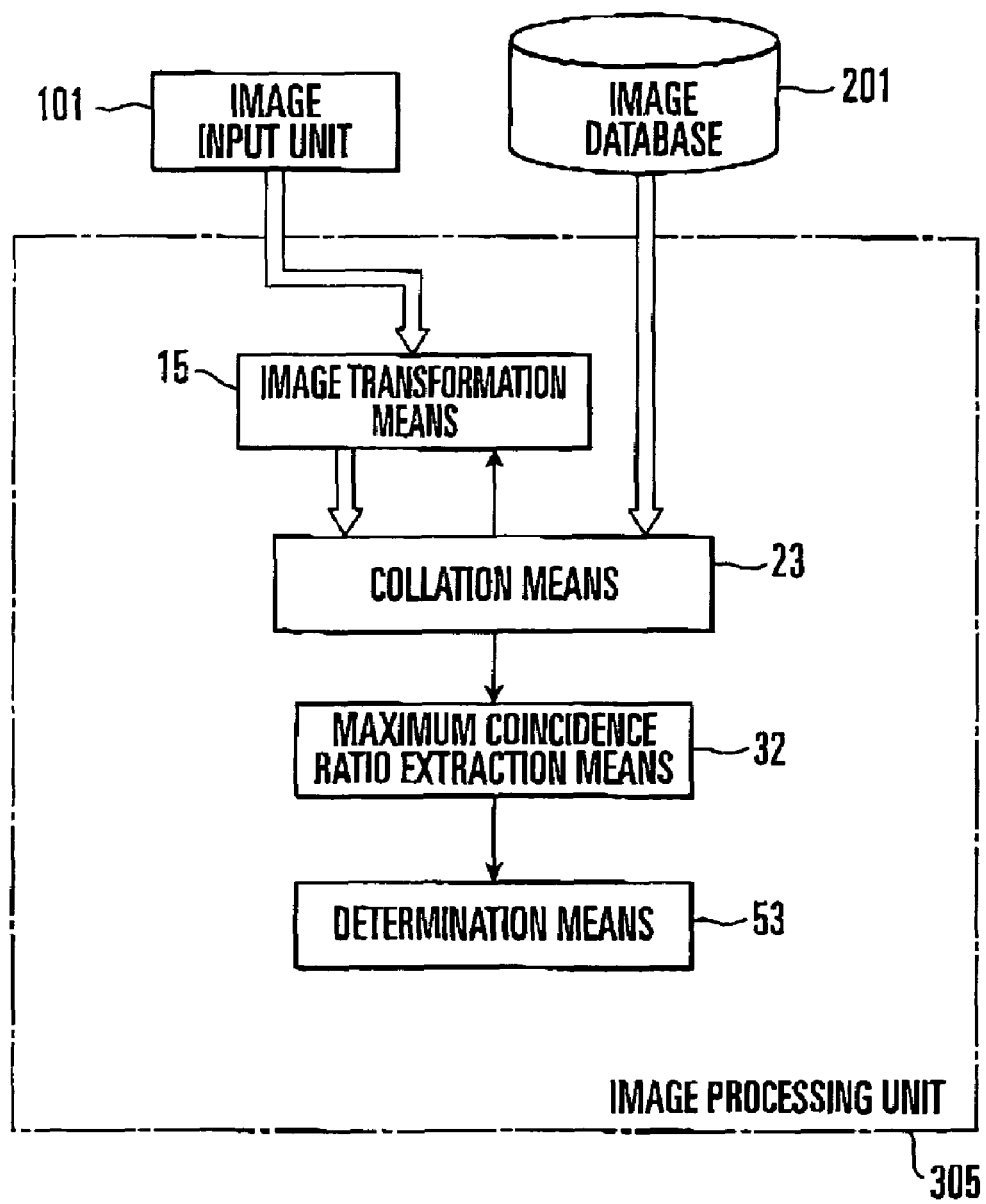
FIG. 42 is a block diagram showing the arrangement of a conventional fingerprint collation apparatus.
Figure 43:
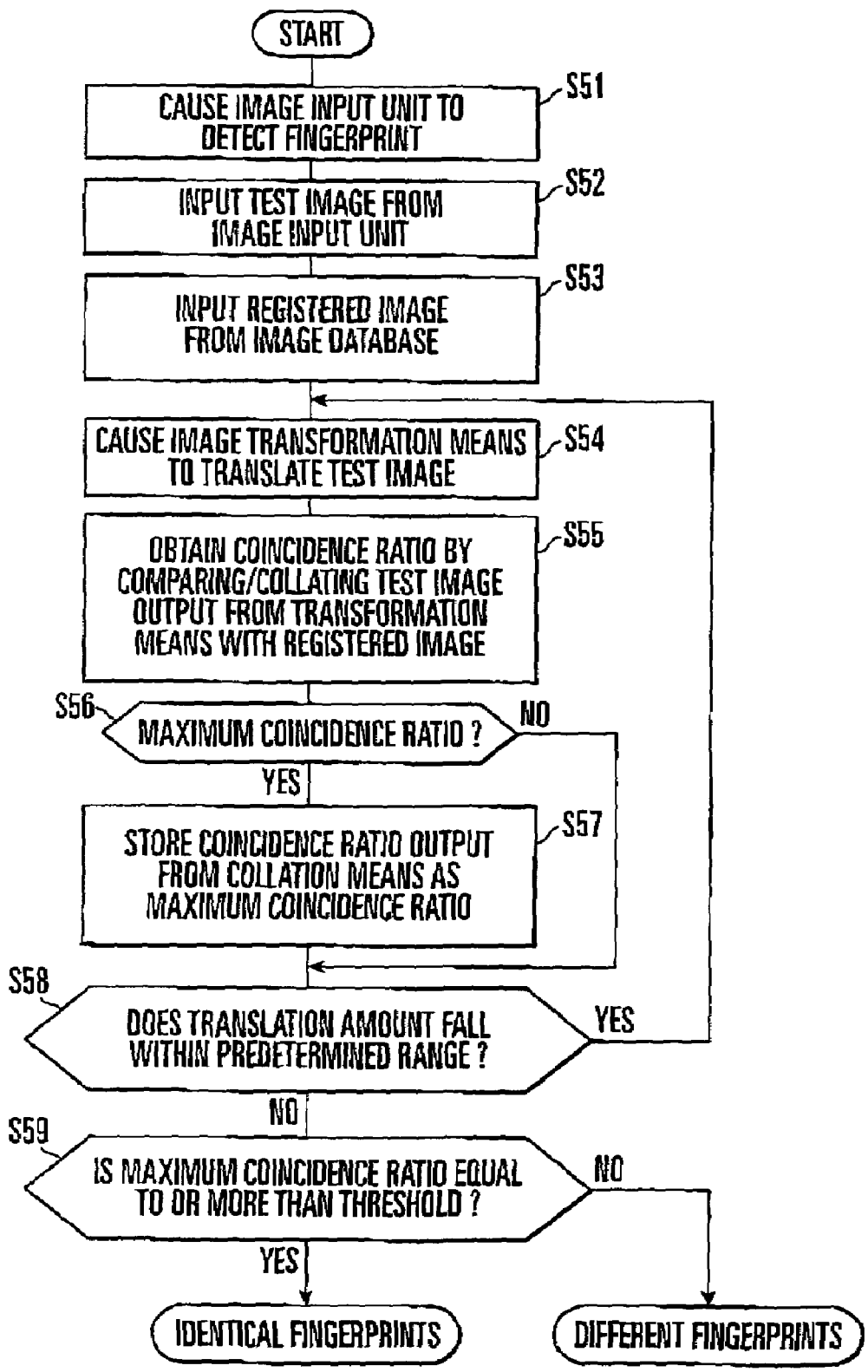
FIG. 43 is a flow chart showing the collating operation of the fingerprint collation apparatus in FIG. 42.

Each of FIGS. 8A and 8B shows the relationship between the translation amount of the test image translated by a image transformation means 10 and coincidence ratios 410 output from a collation means 20. FIG. 8A shows collation of fingerprint images acquired from the same finger (user-to-user collation). FIG. 8B shows collation of fingerprint images acquired from different fingers (user-to-others collation). In the conventional collation apparatus shown in FIG. 42, a threshold can be set only in a coincidence ratio range Dc shown in FIGS. 8A and 8B. In contrast to this, in this embodiment, since a minimum coincidence ratio is added as a determination index as well as a maximum coincidence ratio, thresholds can be set in both ranges Dc and Dd shown in FIGS. 8A and 8B.

As described above, according to the third embodiment shown in FIGS. 6, 7, 8A, and 8B, a broader range can be set in which thresholds can be set. This makes it possible to improve the collation precision. If the first and second thresholds 416 and 417 are set to be same value, the value is set in either the range Dc (more specifically, the range between the maximum coincidence ratio in user-to-others collation (exclusive) and the maximum coincidence ratio in user-to-user collation (inclusive)) or the range Dd (more specifically, the range between the minimum coincidence ratio in user-to-others collation (inclusive) and the minimum coincidence ratio in user-to-user collation (exclusive)). When the first and second thresholds are set to be different values, the first threshold may be set within the range Dc, and the second threshold may be set within the range Dd.

(Fourth Embodiment)

Figure 9:
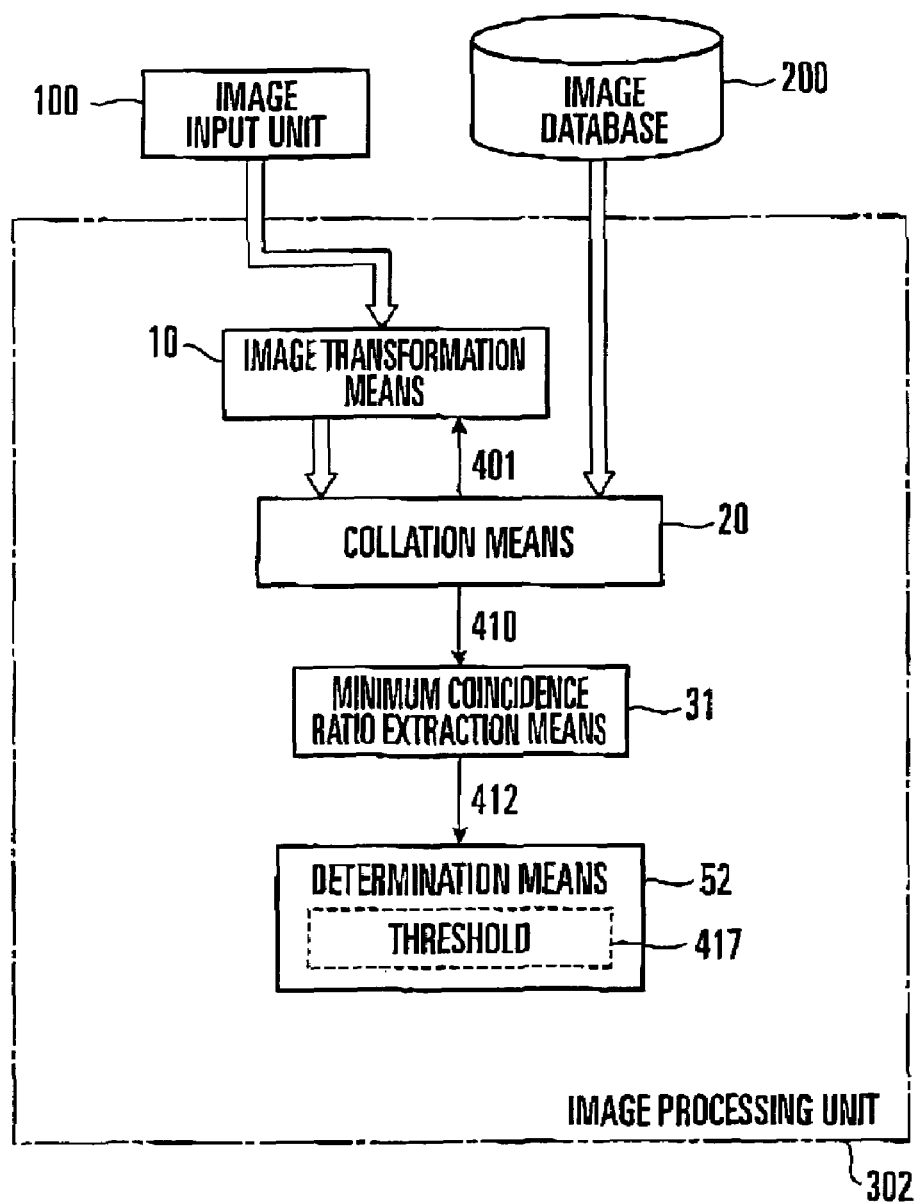
FIG. 9 is a block diagram showing the arrangement of an image collation apparatus according to the fourth embodiment of the present invention.

FIG. 9 shows the arrangement of an image collation apparatus according to the fourth embodiment of the present invention. The same reference numerals as in FIG. 6 denote the same parts in FIG. 9. The differences between this embodiment and the third embodiment are that an image processing unit 302 does not have the maximum coincidence ratio extraction means 30 and has a determination means 52, in place of the determination means 51, which determines that a test image and registered image are identical fingerprint images, when a minimum coincidence ratio 412 is smaller than a threshold.

Figure 10:
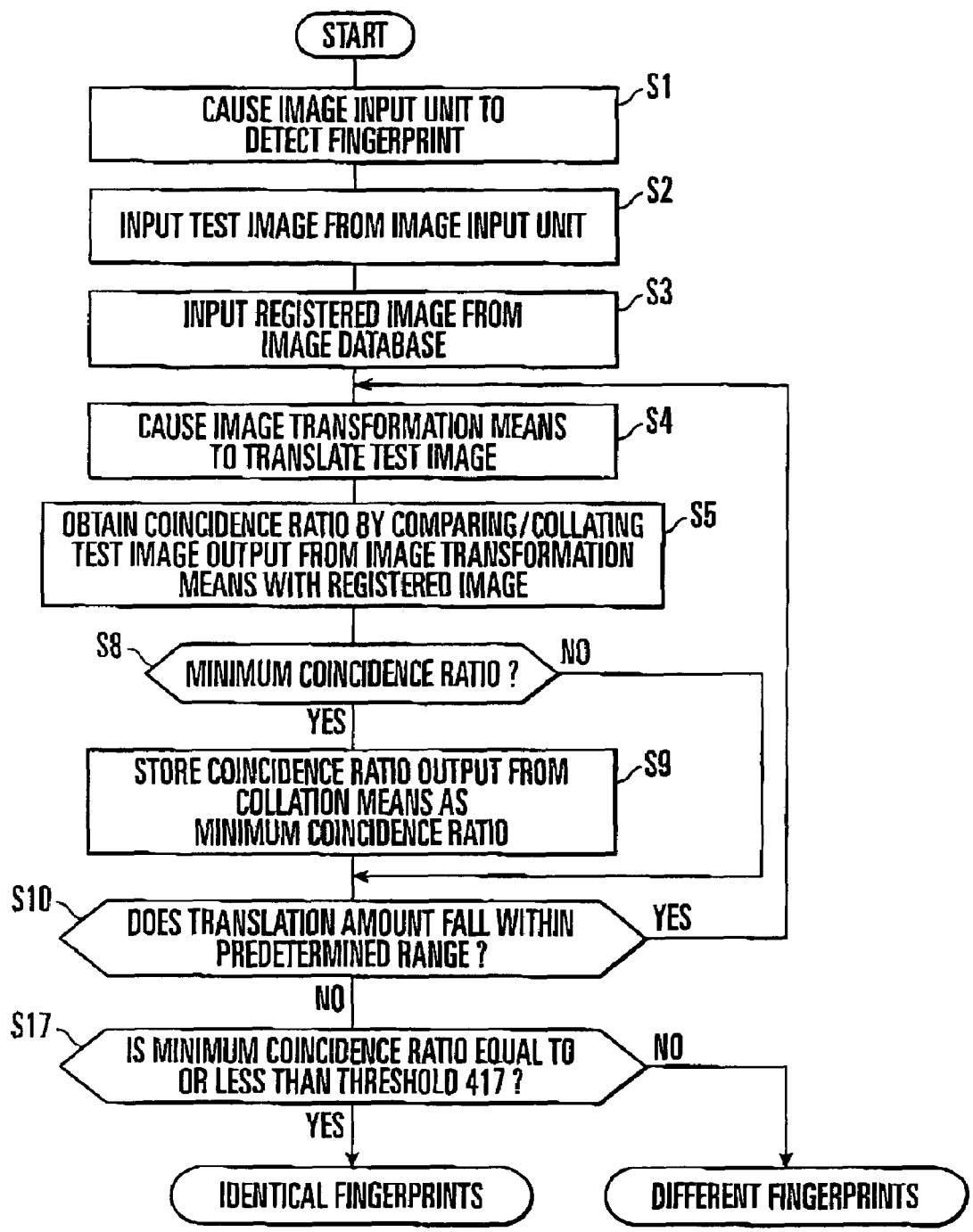
FIG. 10 is a flow chart showing the collating operation of the image collation apparatus in FIG. 9.

FIG. 10 shows the collating operation of the image collation apparatus according to this embodiment. The same reference symbols as in FIG. 2 denote the same processing in FIG. 10. The processing in steps S1 to S5 and S8 to S10 is the same as that in the first embodiment. If the movement amount of the test image from the initial position to the current position exceeds a predetermined range (No in step S10), the determination means 52 compares the minimum coincidence ratio 412 output from the minimum coincidence ratio extraction means 31 with a predetermined threshold (step S17). If the minimum coincidence ratio 412 is smaller than a threshold 417, the determination means 52 determines that the two images are identical fingerprint images. If the minimum coincidence ratio 412 is equal to or more than the threshold 417, the determination means 52 determines that the two images are different fingerprint images.

In the fourth embodiment shown in FIGS. 9 and 10, image processing can be simplified by omitting the maximum coincidence ratio extraction means 30. This makes it possible to shorten the image processing time as compared with the first embodiment. In this embodiment, a threshold must be set within the range Dd in FIG. 8A and 8B (more specifically, the range between the minimum coincidence ratio in user-to-others collation (inclusive) and the minimum coincidence ratio in user-to-user collation (exclusive)).

(Fifth Embodiment)

Figure 11:
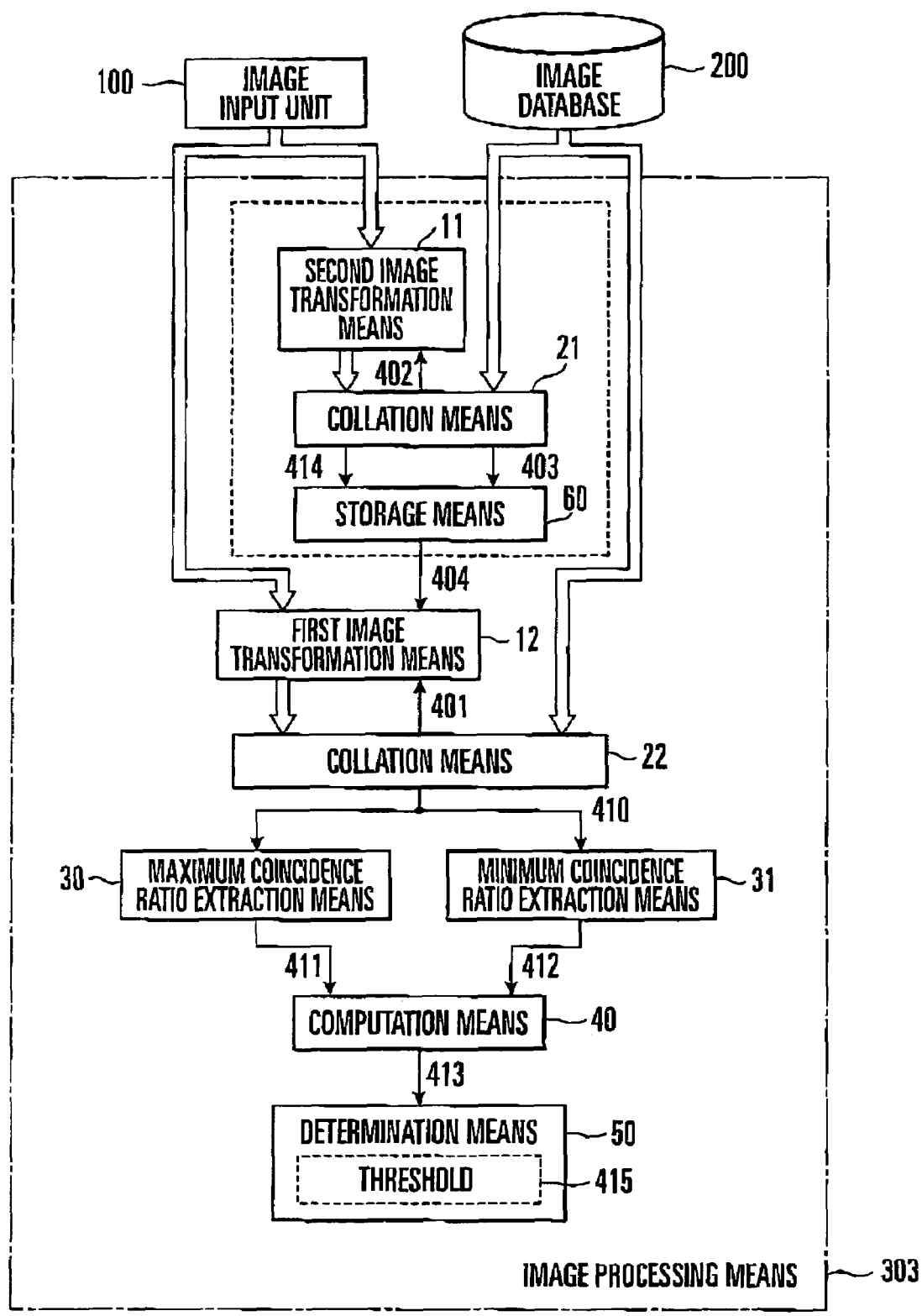
FIG. 11 is a block diagram showing the arrangement of an image collation apparatus according to the fifth embodiment of the present invention.

FIG. 11 shows the arrangement of an image collation apparatus according to the fifth embodiment of the present invention. The same reference numerals as in FIG. 1 denote the same parts in FIG. 11. This embodiment differs from the first embodiment in the following points. First, an image processing means 303 includes an image transformation means 11, collation means 21, and storage means 60 as means for roughly correcting the relative positional offset between a registered image and a test image, and causes the storage means 60 to store a movement amount when a maximum coincidence ratio is obtained while the image transformation means 11 and collation means 21 repeatedly perform translation and comparison/collation, respectively. Second, a movement amount is output from the storage means 60 to an image transformation means 12 corresponding to the image transformation means 10 in the first embodiment, and the image transformation means 12 is made to start translation of the test image from the second initial position based on the movement amount and the first initial position.

The image transformation means 11 outputs the test image obtained by translating each pixel of an input test image from the first initial position (the position set when it is input from an image input unit 100) by a predetermined amount in accordance with a translation amount designation signal 402 (to be described later).

The collation means 21 compares/collates the luminance values of the respective pixels at corresponding positions in the test image output from the image transformation means 11 and the registered image output from an image database 200, and totals the number of black pixels whose luminance values coincide with each other in a predetermined collation region. The collation means 21 then divides the totaled number of coincident pixels by the number of black pixels of the registered image to obtain a coincidence ratio 414 between the test image and the registered image.

In addition, the collation means 21 outputs a movement amount signal 403 representing the movement amount of the Lest image from the first initial position to the current position (the position set after translation is performed by the image transformation means 11) to the storage means 60. If this movement amount falls within a predetermined first range, the collation means 21 outputs the translation amount designation signal 402 for designating the movement amount of the test image for each moving operation to the image transformation means 11.

The image transformation means 11 translates the test image by the amount designated by the translation amount designation signal 402. In this case, the first range is the game as the range set for the collation means 20 in the first embodiment.

The storage means 60 stores the movement amount signal 403 output from the collation means 21 when the coincidence ratio 414 output from the collation means 21 becomes maximum, and outputs it as a movement amount signal 404 to the image transformation means 12.

The image transformation means 12 moves the test image input from the image input unit 100 to the second initial position which is set by adding the movement amount represented by the movement amount signal 404 to the first initial position, and outputs the test image obtained by translating each pixel of the test image by a predetermined amount in accordance with a translation amount designation signal 401.

A collation means 22 obtains a coincidence ratio 410 between the test image output from the image transformation means 12 and the registered image output from the image database 200 in the same manner as the first collation means 20. If the movement amount of the test image from the second initial position to the current position (the position set after translation is performed by the image transformation means 12) falls within a predetermined second range, the collation means 22 outputs the translation amount designation signal 401 for designating the movement amount of the test image for each moving operation.

The image transformation means 12 translates the test image by the amount designated by the translation amount designation signal 401. In this case, the second range is set to be narrower than the first range.

Figure 12A:
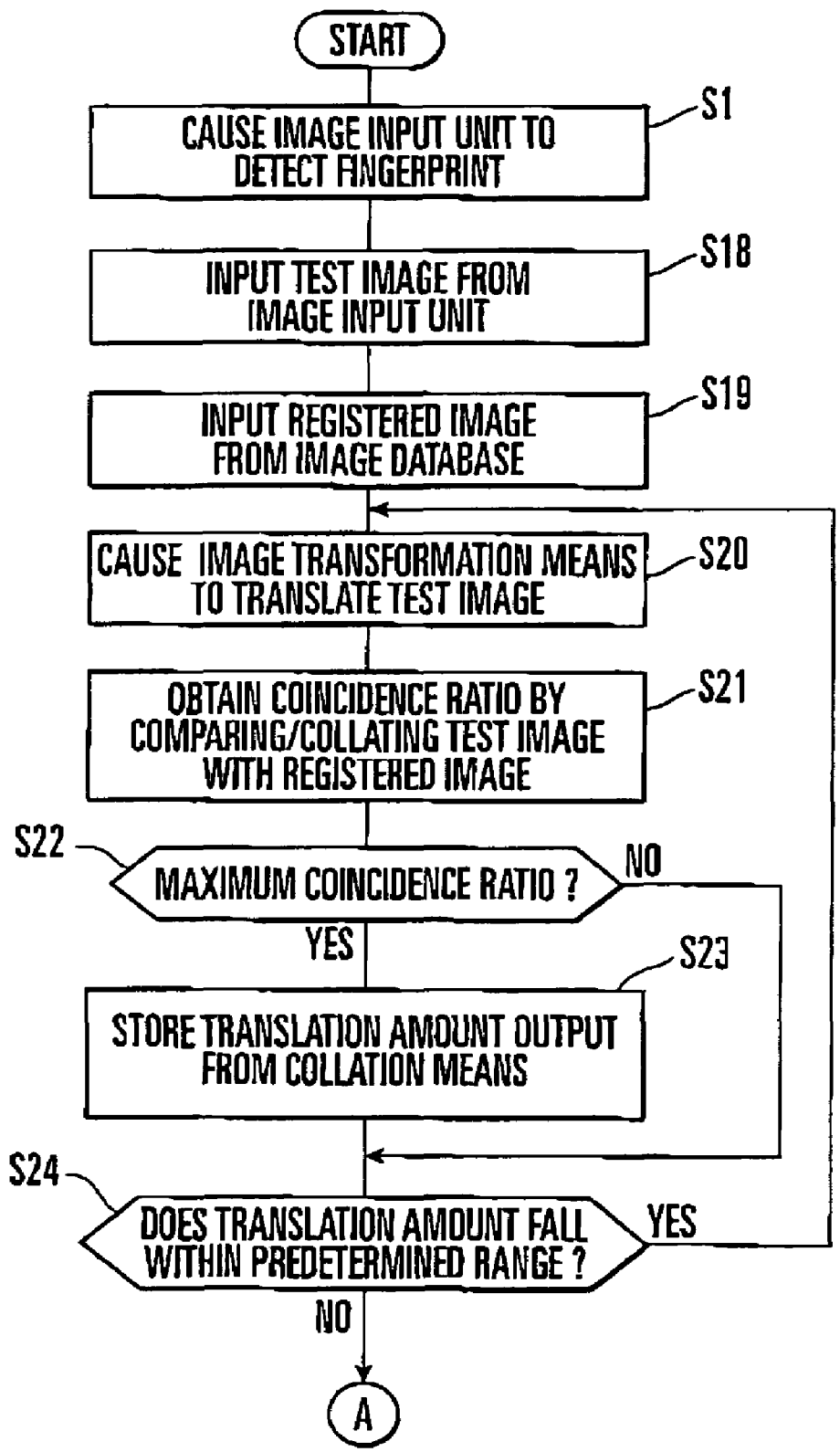
FIGS. 12A and 12B are flow charts showing the collating operation of the image collation apparatus in FIG. 11.
Figure 12B:
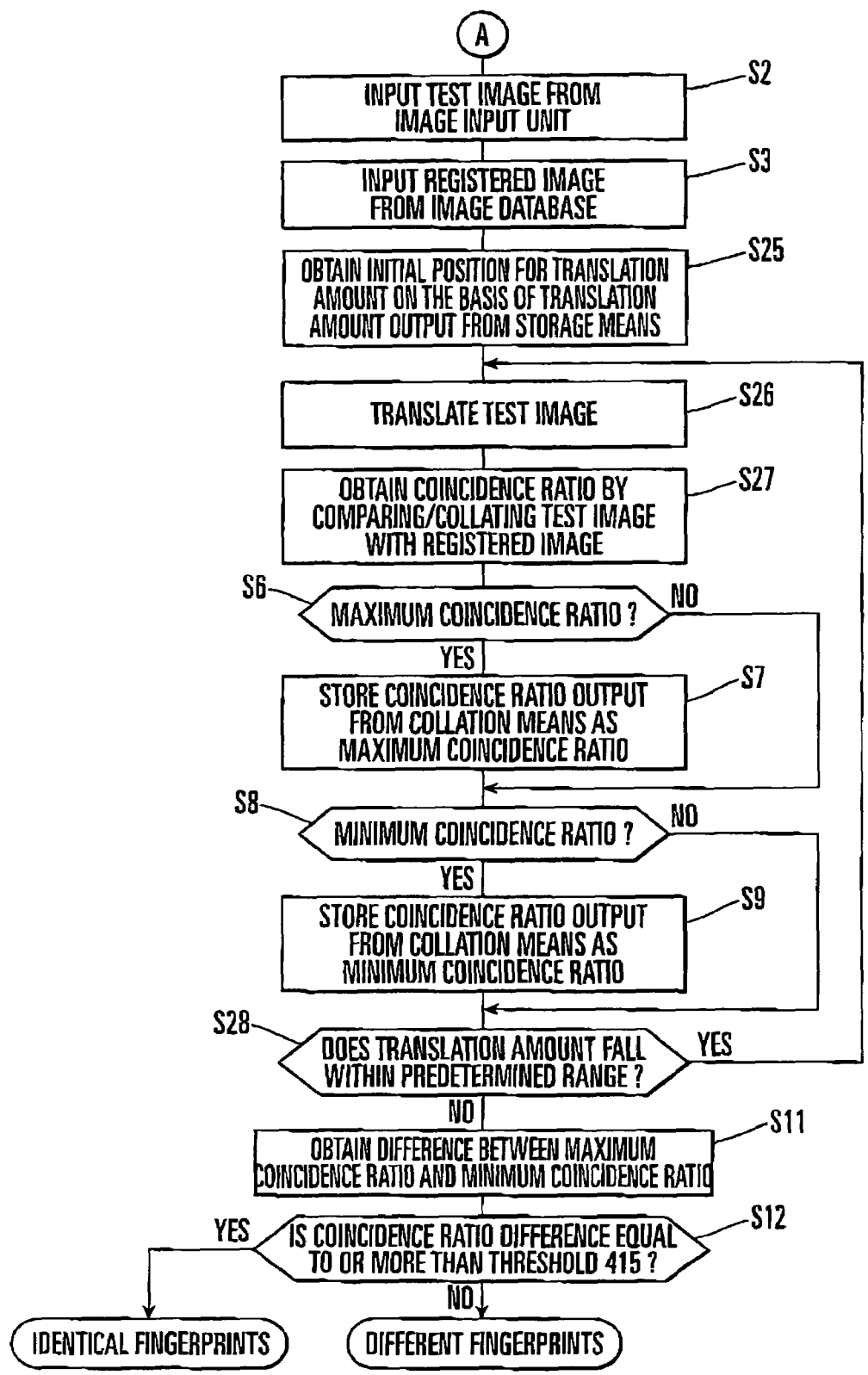

FIG. 12 shows the collating operation of the image collation apparatus according to the fifth embodiment shown in FIG. 11. The same reference symbols as in FIG. 2 denote the same processing in FIG. 12.

First of all, the image Input unit 100 detects the fingerprint of a finger placed on the sensor and generates a test image (step S1). Upon reception of the test image from the image input unit 100 (step S18) and a registered image from the image database 200 (step S19), an image processing means 303 causes the image transformation means 11 to translate the test image (step S20). The collation means 21 compares/collates the test image output from the image transformation means 11 with the registered image output from the image database 200 to obtain the coincidence ratio 414 (step S21).

The storage means 60 checks whether the coincidence ratio 414 output from the collation means 21 is a maximum value (step S22). If the coincidence ratio 414 is a maximum value, the storage means 60 stores the movement amount signal 403 output from the collation means 21 at this time (step S23).

The collation means 21 checks whether the movement amount of the test image from the first initial position to the current position falls within the first range (step S24). If the movement amount falls within the first range, the collation means 21 outputs the translation amount designation signal 402 to the image transformation means 11. The processing in steps S20 to S23 is repeated in this manner as long as the movement amount of the test image from the first initial position to the current position falls within the first range. If the movement amount of the test image exceeds the first range (NO in step S24), the storage means 60 outputs the stored movement amount signal 403 as the movement amount signal 404.

If the movement amount of the test image exceeds the first range, the image transformation means 12 moves the test image input from the image input unit 100 to the second initial position set by adding the movement amount represented by the movement amount signal 404 to the first initial position (step S25). The image transformation means 12 then translates the test image in accordance with the translation amount designation signal 401 (step S26).

The collation means 22 obtains the coincidence ratio 410 by comparing/collating the test image output from the image transformation means 12 with the registered image output from the image database 200 (step S27). The processing in steps S6 to S9 is the same as that in the first embodiment. The collation means 22 checks whether the movement amount of the test image from the second initial position to the current position fall within the second range (step S28). If the movement amount falls within the second range, the collation means 22 outputs the translation amount designation signal 401 to the image transformation means 12. The processing in steps S26, S27, and S6 to S9 is repeated in this manner as long as the movement amount of the test image from the second initial position to the current position falls within the second range. The processing in steps S11 and S12 is the sate as that in the first embodiment.

In the fifth embodiment shown in FIGS. 11 and 12, a maximum coincidence ratio is obtained within the first range to roughly correct the relative positional offset between a registered image and a test image, and the same processing as that described in the first embodiment is executed within the second range narrower than the first range with the position where this maximum coincidence ratio is obtained being set as the second initial position. If, therefore, the first range is set to be same as the range set for the first collation means 20 in the first embodiment, it is only required that a maximum coincidence ratio be obtained in the first range. This makes it possible to shorten the image processing time as compared with the first embodiment.

(Sixth Embodiment)

In the fifth embodiment shown in FIGS. 11 and 12, the collation region in which the collation means 21 obtains a coincidence ratio is set to be equal in size to the collation region in which the collation means 22 obtains a coincidence ratio. However, the second collation region in which the collation means 21 obtains a coincidence ratio may be set to be narrower than the first collation region in which the collation means 22 obtains a coincidence ratio. In this case as well, the arrangement and collating operation of the image collation apparatus remain the same as those shown in FIGS. 11 and 12. As described above, in this embodiment, since the number of pixels to be compared/collated can be decreased in roughly correcting the relative positional offset between a registered image and a test image, the image processing time can be shortened as compared with the fifth embodiment.

(Seventh Embodiment)

In the fifth embodiment shown in FIGS. 11 and 12, no reference is made to the difference between the translation amount designation signal 402, which is output from the collation means 21 to roughly correct the relative positional offset between a registered image and a test image, and the translation amount designation signal 401, which is output from the collation means 22 to obtain maximum and minimum coincidence ratios. However, the movement amount for each moving operation represented by the translation amount designation signal 402 may be larger than that represented by the translation amount designation signal 401. In this case as well, the arrangement and collating operation of the image collation apparatus remain the same as those shown in FIGS. 11 and 12.

As described above, in this embodiment, since the movement amount of a test image for each moving operation in roughly correcting the relative positional offset between a registered image and the test image is set to be large, the number of times an image transformation means 11 performs translation and the number of times a collation means 21 performs comparison/collation can be decreased, thereby shortening the image processing time as compared with the fifth embodiment.

In each of the fifth to seventh embodiments, the arrangement of the image processing unit 300 in the first embodiment is used as the basic arrangement of the image processing means 303. However, the arrangement of each of the second to fourth embodiments may be used. That is, the image transformation means 12 may be used in place of the image transformation means 10 shown in FIGS. 6 and 9, and the movement amount signal 404 from the storage means 60 may be supplied to the image transformation means 12.

(Eighth Embodiment)

Figure 13:
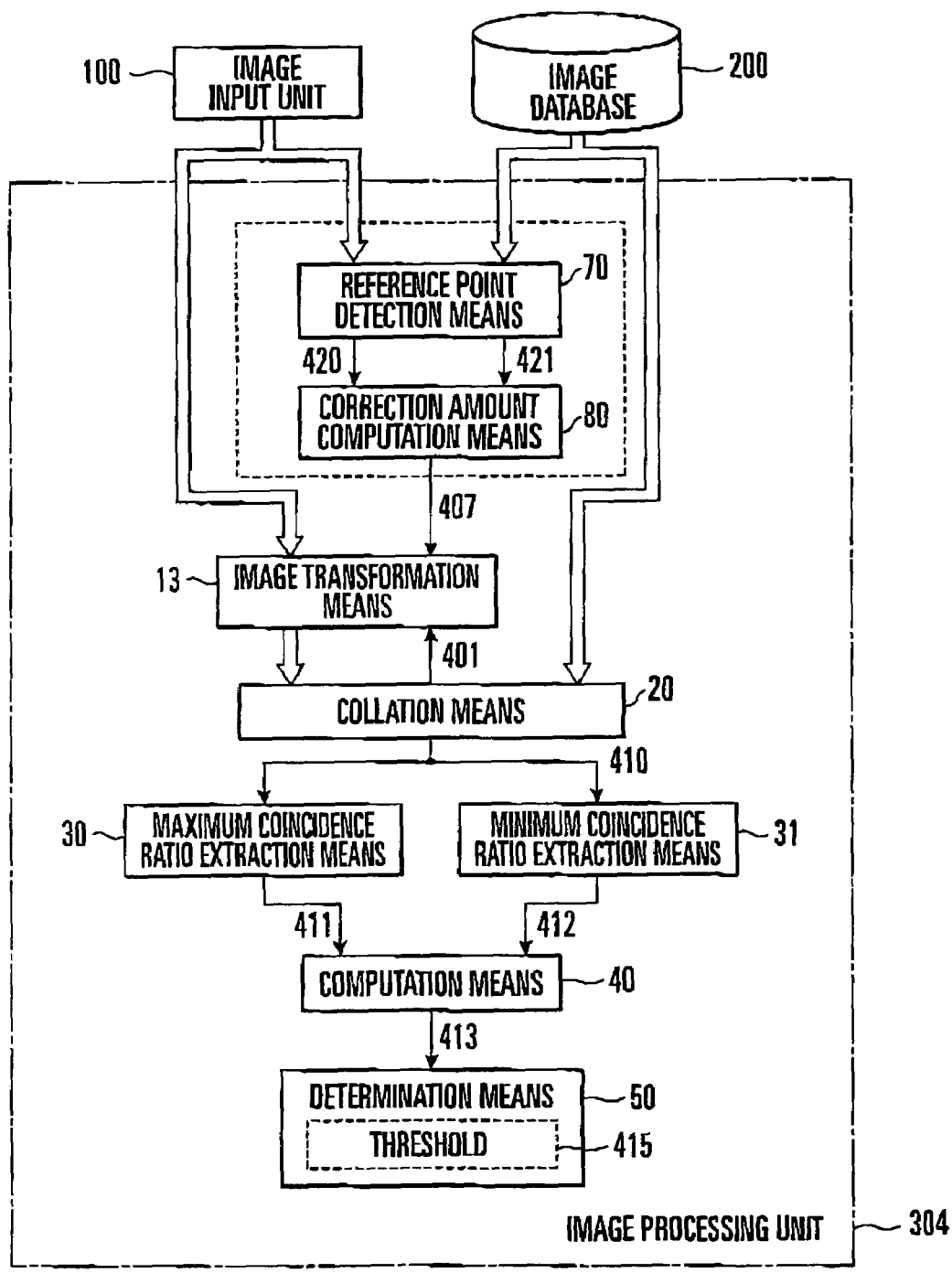
FIG. 13 is a block diagram showing the arrangement of an image collation apparatus according to the eighth embodiment of the present invention.

FIG. 13 shows the arrangement of an image collation apparatus according to the eighth embodiment of the present invention. The same reference numerals as in FIG. 1 denote the same parts in FIG. 13. This embodiment is different from the first embodiment in that an image processing unit 304 includes a reference point detection means 70 and correction amount computation means 80 as means for roughly correcting the relative positional offset between a registered image and a test image, and a movement amount is output from the correction amount computation means 80 to an image transformation means 13 corresponding to the image transformation means 10 in the first embodiment to make the image transformation means 13 start translating the test image from the second initial position based on the movement amount and first initial position.

The reference point detection means 70 detects reference points, e.g., approximate central points, of the test image output from the image input unit 100 and the registered image output from an image database 200, and outputs coordinates 420 of the reference point of the test image and coordinates 421 of the reference point of the registered image. Searches for approximate central points can be implemented by the method of sequentially approaching the central position by using the number of intersections of lines parallel to the respective sides of a rectangle (Ito et al., "A Classification Method for Fingerprint Images with Consideration Given to Central Points", IEICE Report. PRU89-79, pp. 15–22, 1989) or the like. In a fingerprint image, an approximate central point is located at a position where the curvature of a fingerprint is large.

The correction amount computation means 80 obtains the translation amount of the test image which is required to make the position of the reference point of the test image, detected by the reference point detection means 70, coincide with the position of the reference point of the registered image, and outputs a movement amount signal 407 representing this translation amount. The correction amount computation means 80 can be implemented by a method of obtaining a translation amount by calculating the difference between the position vector of the reference point of the test image and the position vector of the reference point of the registered image.

The image transformation means 13 moves the test image input from an image input unit 100 to the second initial position set by adding the movement amount represented by the movement amount signal 407 to the first initial position, and outputs the test image obtained by translating each pixel of the test image by a predetermined amount in accordance with a translation amount designation signal 401.

Figure 14A:
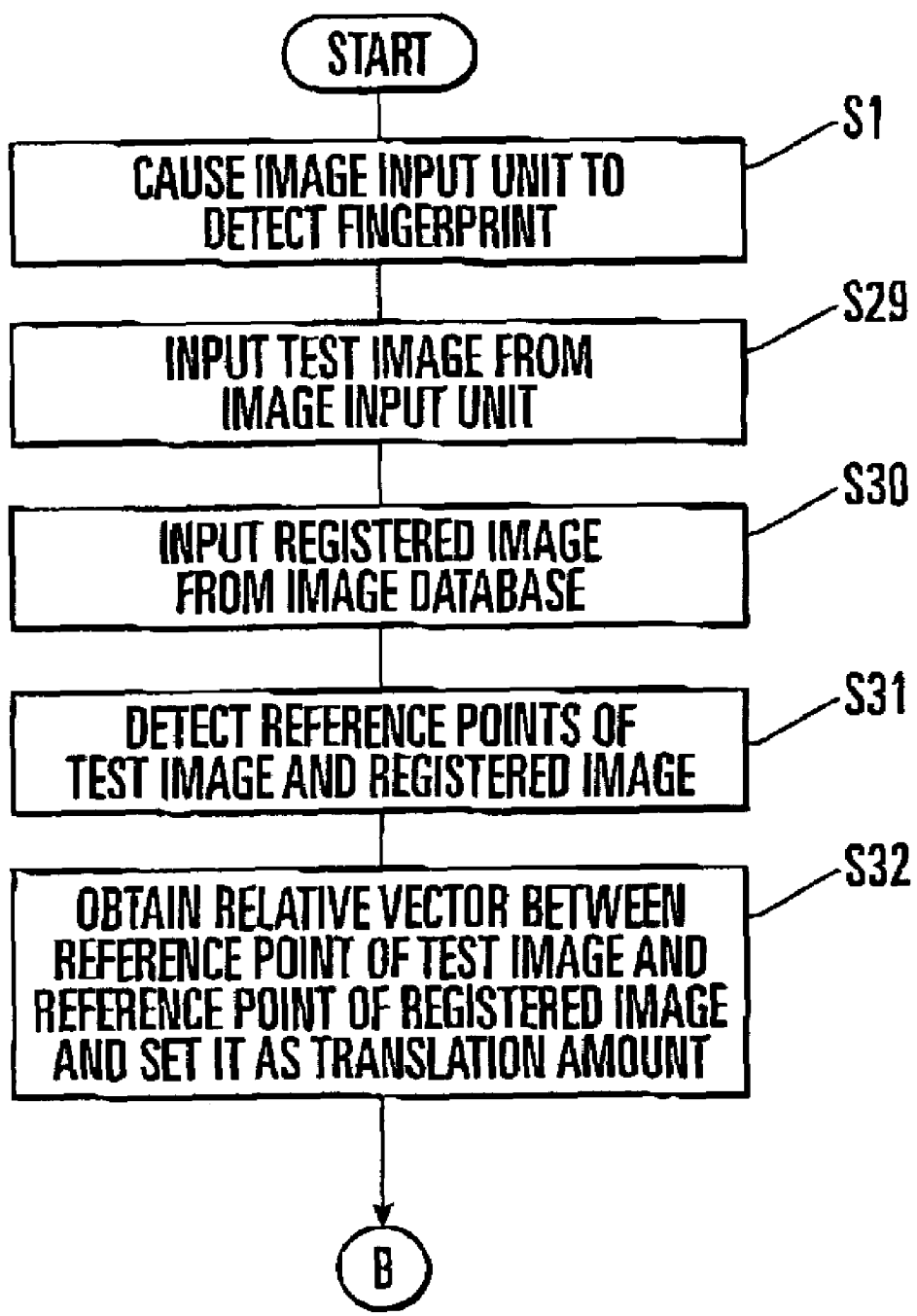
FIGS. 14A and 14B are flow charts showing the collating operation of the image collation apparatus in FIG. 13.
Figure 14B:
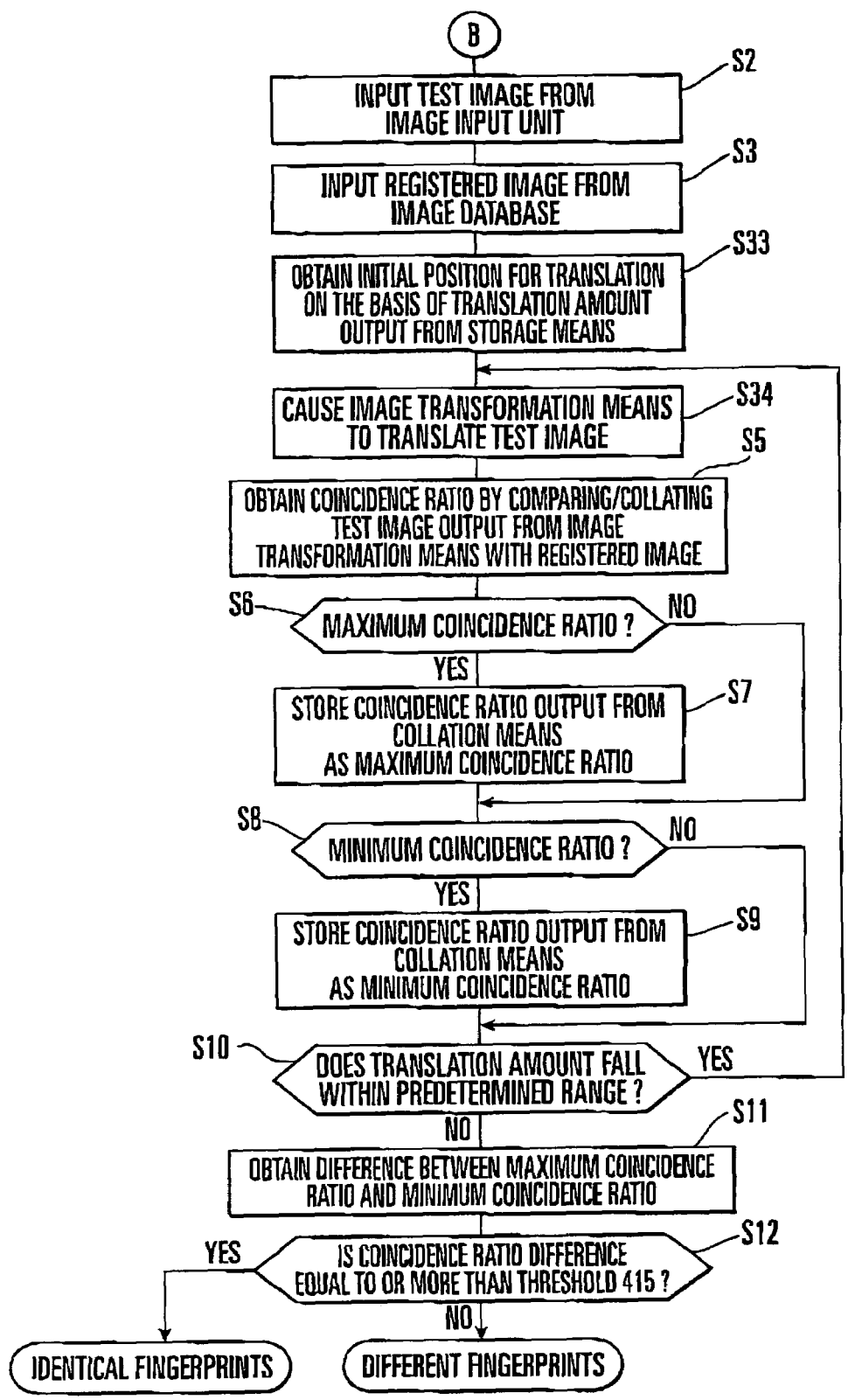

FIG. 14 shows the collating operation of the image collation apparatus according to the eighth embodiment in FIG. 13. The same reference symbols as in FIG. 2 denote the same parts in FIG. 14. First of all, the image input unit 100 detects the fingerprint of a finger placed on the sensor and generates a test image (step S1). Upon reception of the test image from the image input unit 100 (step S29) and a registered image from the image database 200 (step S30), the image processing unit 304 causes the reference point detection means 70 to detect reference points of the test image and registered image (step S31).

The correction amount computation means 80 obtains the translation amount of the test image which is required to make the position of the reference point of the test image coincide with the position of the reference point of the registered image, and outputs the movement amount signal 407 represented by this translation amount (step S32). The image transformation means 13 moves the test image input from the image input unit 100 to the second initial position set by adding the movement amount represented by the movement amount signal 407 to the first initial position (step S33). The image transformation means 13 translates the test image in accordance with the translation amount designation signal 401 (step S34). The processing in steps S5 to S12 is the same as that in the first embodiment.

In this embodiment shown in FIGS. 13 and 14, in order to roughly correct the relative positional offset between the registered image and the test image, the reference point detection means 70 detects the reference points of the test image and registered image, and the processing described in the first embodiment is executed upon setting the position where the reference points coincide with each other as the second initial position. This makes it possible to shorten the image processing time as compared with the first embodiment.

In the eighth embodiment, the arrangement of the image processing unit 300 is used as the basic arrangement of the image processing unit 304. However, the arrangement in each of the second to fourth embodiments may be used. That is, the image transformation means 13 may be used, in place of the image transformation means 10 shown in FIGS. 6 and 9, and the movement amount signal 407 may be supplied from the correction amount computation means 80 to the image transformation means 13.

(Ninth Embodiment)

Figure 15:
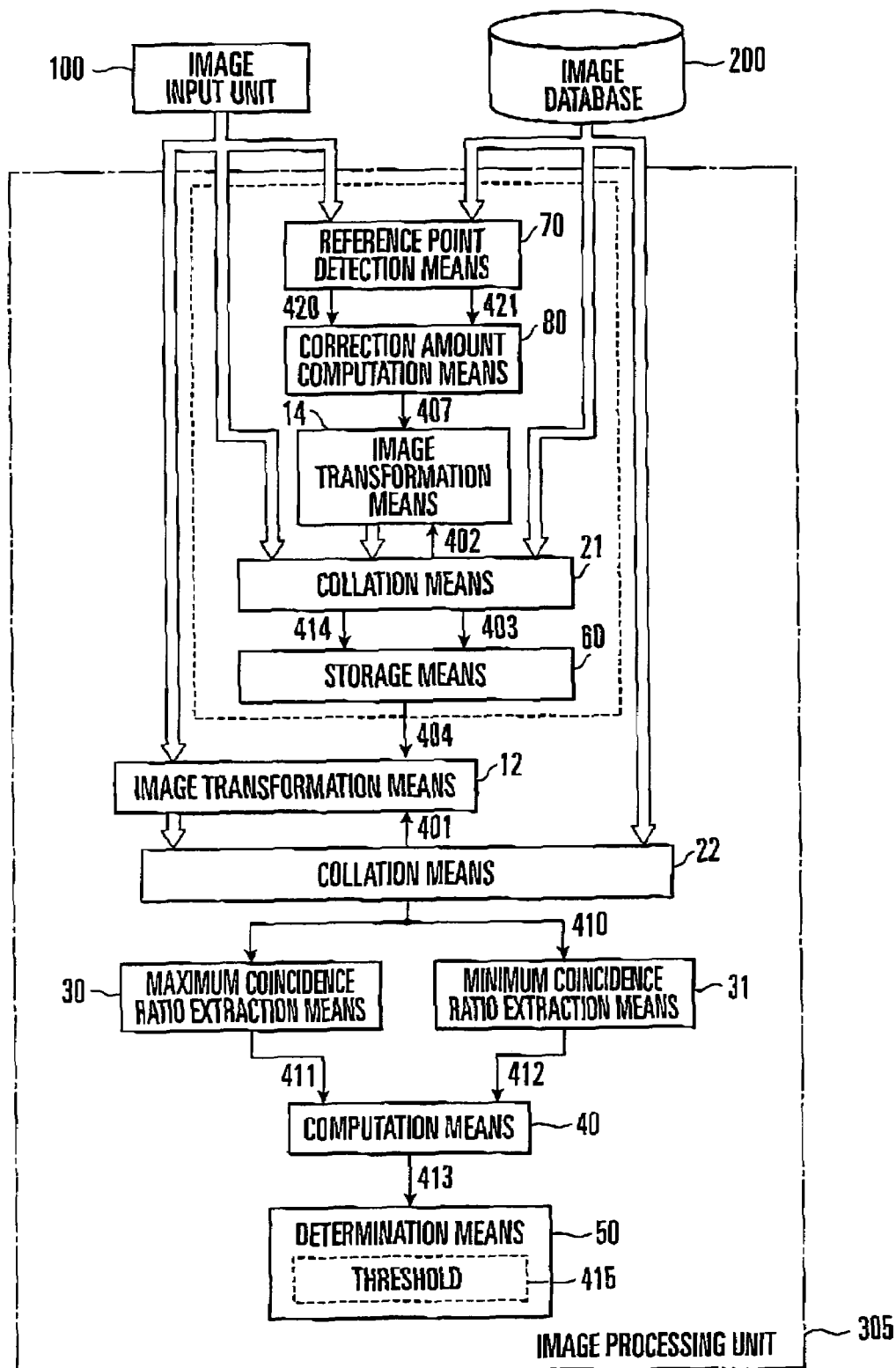
FIG. 15 is a block diagram showing the arrangement of an image collation apparatus according to the ninth embodiment of the present invention.

As shown in FIG. 15, the arrangements of the fifth and eighth embodiments may be combined. The same reference numerals as in FIGS. 11 and 13 denote the same parts in FIG. 15.

An image transformation means 14 adds the movement amount represented by a movement amount signal 407 to the first initial position to set the new first initial position, and moves a test image input from an image input unit 100 to the new first initial position. The image transformation means 14 outputs the test image obtained by translating each pixel of the test image by a predetermined amount in accordance with a translation amount designation signal 402.

Figure 16A:
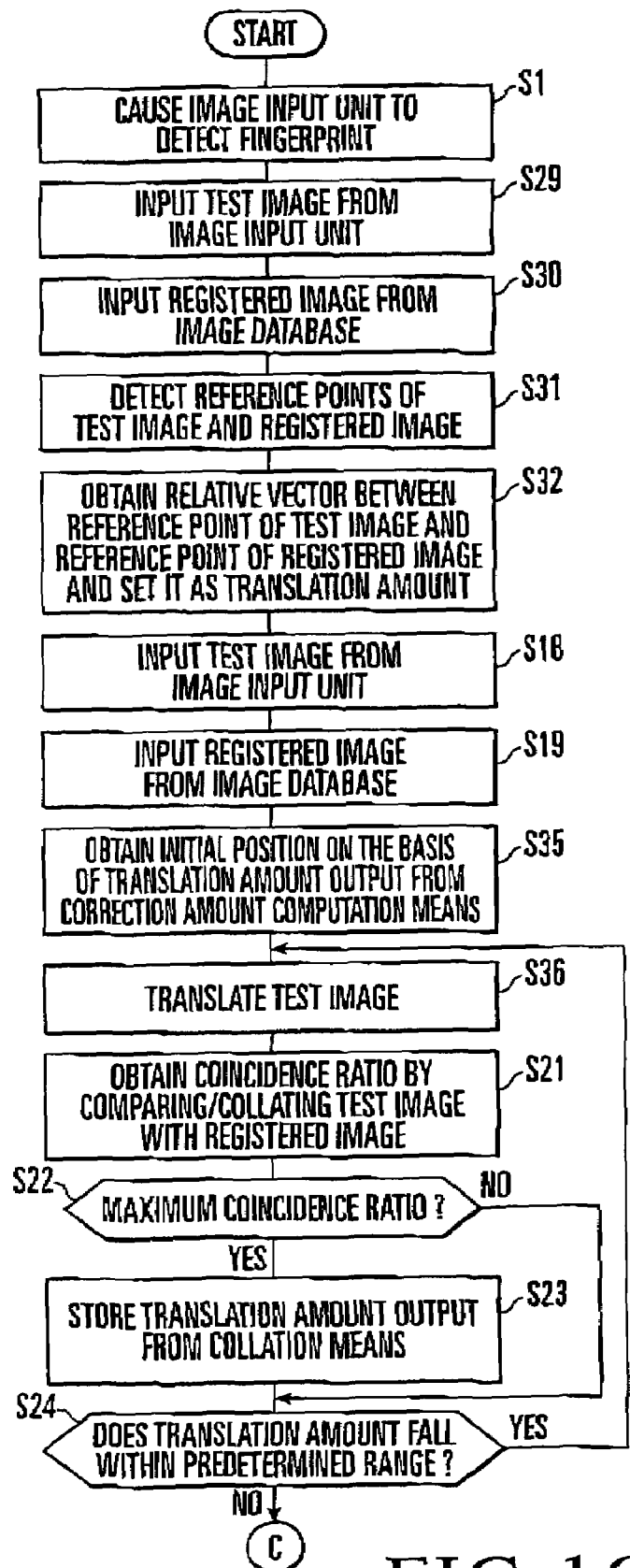
FIGS. 16A and 16B are flow charts showing the collating operation of the image collation apparatus in FIG. 15.
Figure 16B:
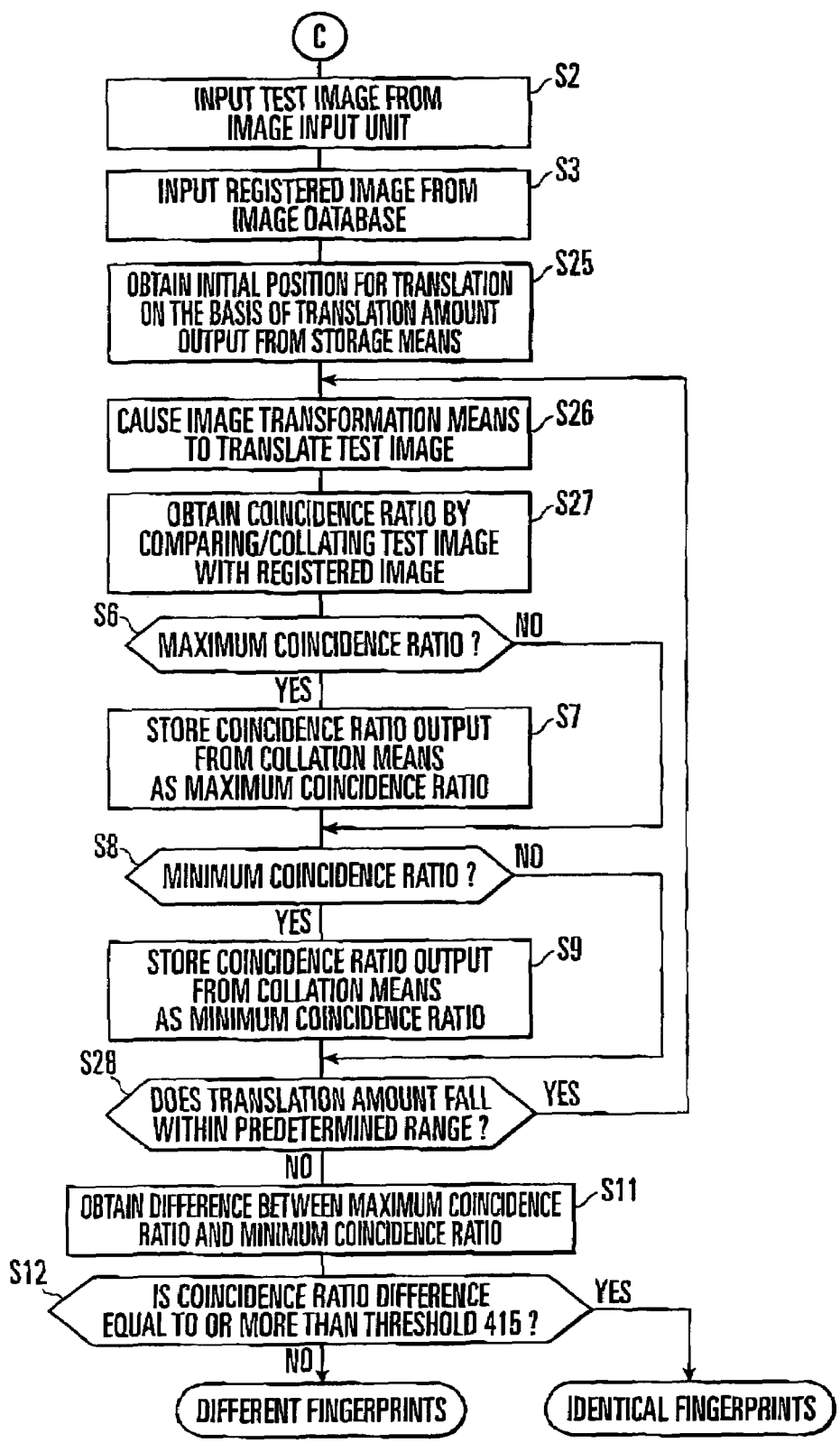

FIG. 16 shows the collating operation of an image collation apparatus according to the ninth embodiment in FIG. 15. The same reference symbols as in FIGS. 2, 12, and 14 denote the same processing in FIG. 16. The processing in steps S1 and S29 to S32 is the same as that in the eighth embodiment. The image transformation means 14 moves the test image input from the image input unit 100 to the new first initial position set by adding the movement amount represented by the movement amount signal 407 to the first initial position (step S35). The image transformation means 14 translates this test image in accordance with the translation amount designation signal 402 (step S36).

The processing in steps S22 to S24, S2, S3, S25 to S27, S6 to S9, S28, S11, and S12 is the same as that in the fifth embodiment.

As described above, this embodiment can obtain both the processing speed increasing effect of the fifth embodiment and the processing speed increasing effect of the eighth embodiment.

(10th Embodiment)

Figure 17:
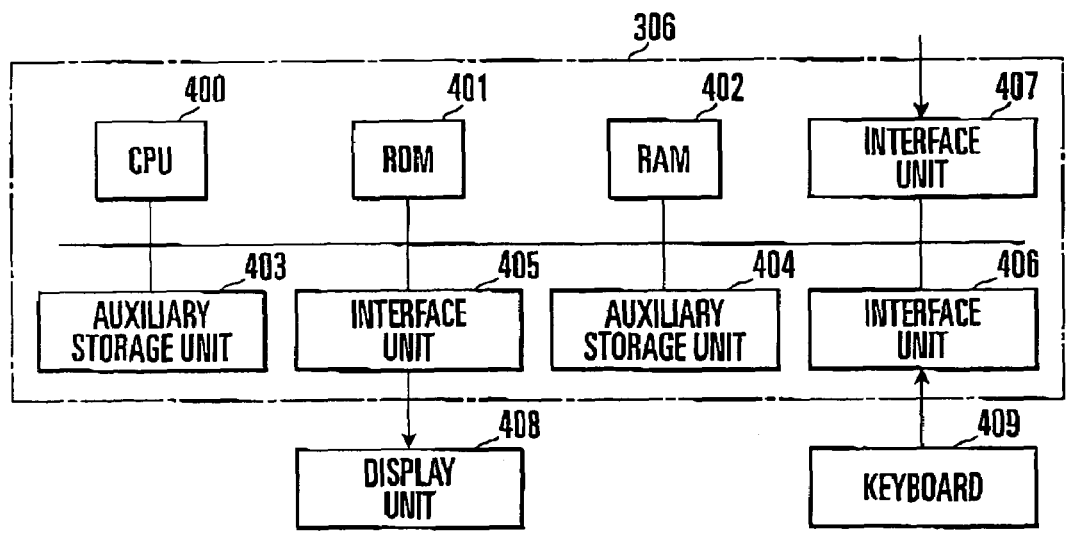
FIG. 17 is a block diagram showing the arrangement of an image collation apparatus according to the 10th embodiment of the present invention.

FIG. 17 shows the arrangement of an image collation apparatus according to the 10th embodiment of the present invention. The arrangement of the image collation apparatus according to each of the first to ninth embodiments can be implemented by a computer 306. The computer 306 is comprised of a CPU 400, a ROM (Read Only Memory) 401, a RAM (Random Access Memory) 402, an auxiliary storage unit 403 such as a floppy disk unit, a large-capacity auxiliary storage unit 404 such as a hard disk unit, an interface unit 405 for interfacing with a display unit 408 for outputting video information, an interface unit 406 for interfacing with a keyboard 409, and an interface unit 407 for interfacing with an image input unit 100.

An image database 200 can be implemented by the RAM 402 or auxiliary storage unit 404. In the apparatus shown in FIG. 17, a program for implementing an image collation method according to the present invention is provided in a state where it is recorded on a recording medium such as a floppy disk, CD-ROM, or memory card.

When this recording medium is inserted into the auxiliary storage unit 403 of the computer 306, the program recorded on the medium is read. The CPU 400 writes the read program on the RAM 402 or auxiliary storage unit 404, and executes processing like that described in the first to ninth embodiments in accordance with this program. In this manner, processing like that in the first to ninth embodiments can be realized.

Note that each of the first to 10th embodiments described above has exemplified the case where images to be collated are fingerprint images. However, the present invention can be applied to any images having periodicity such as animal noseprint, iris, and texture pattern images.

Each of the collation means 20 to 22 determines black pixels in a test image and registered image which have luminance values that perfectly coincide with each other as coincident pixels. However, white pixels whose luminance values perfectly coincide with each other may be determined as coincident pixels, and the number of coincident pixels/the number of white pixels of a registered image or the number of coincident pixels×2/(the number of white pixels of a registered image+the number of white pixels of a test image) may be set as a coincidence ratio.

In each embodiment described above, binary images are used as a registered image and test image. However, for example, 256-level grayscale images before binarization may be used. In this case, pixels of a test image and registered image which have luminance value differences within a predetermined range may be determined as coincident pixels.

Each of the image transformation means 10 to 14 translates a test image to correct the positional offset between the test image and a registered image. However, the test image may be rotated or may be translated and rotated. When the test image is to be translated and rotated, not only a positional offset but also an angular offset can be corrected. Both translation and rotation may be executed in the following manner. For example, a test image is rotated through a predetermined angle first, and then repeatedly translated, as described above. When the total translation amount exceeds a predetermined range, the test image is rotated through a predetermined angle again, and translation of the test image is repeated.

When both translation and rotation are to be executed, however, both a translation amount range and a rotational angle range must be set for each of the collation means 20 to 22. If the movement amount of a test image from the first or second initial position to the current position falls within a predetermined translation amount range, each of the collation means 20 to 22 outputs the translation amount designation signal 401 or 402 for designating the movement amount of the test image for each moving operation. If the rotational angle of the test image from the first or second initial position to the current position falls within a predetermined rotational angle range, each of the collation means 20 to 22 outputs a rotational angle designation signal for designating the rotational angle of the test image for each rotating operation. When only rotating operation is to be performed, a rotational angle designation signal is output.

Each of the image transformation means 10 to 14 translates the test image in accordance with the translation amount designation signal 401 or 402, and rotates the test image in accordance with the rotational angle designation signal.

When both translation and rotation are to be executed, the collation means 21 outputs a movement amount signal 403 representing the movement amount of the test image from the first initial position to the current position and an angle signal representing the rotational angle of the test image from the first initial position to the current position. A storage means 60 stores the movement amount signal 403 and angle signal output from the collation means 21 when a coincidence ratio 414 becomes maximum, and outputs them to the image transformation means 12.

In addition, when both translation and rotation to be executed, a reference point detection means 70 obtains a plurality of reference points of each of registered and test images. A correction amount computation means 80 then obtains the rotational angle of the test image which is required to make the positions of the reference points of the test image coincide with the positions of the reference points of the registered image, and outputs the angle signal representing this rotational angle. Each of the image transformation means 12 to 14 sets a new first or second initial position by adding the rotational angle represented by the angle signal output from the storage means 60 or correction amount computation means 80 to the first initial position.

In addition, each of the image transformation means 10 to 14 may execute processing for a registered image instead of a test image.

According to the first to 10th embodiments of the present invention described above, by using at least the minimum coincidence ratio extraction means, the difference in determination index (coincidence ratio difference) between user-to-user collation and user-to-others collation can be increased as compared with the prior art, and hence the collation precision can be improved. In addition, the difference in determination index (coincidence ratio difference) between user-to-user collation and user-to-others collation can be further increased, and the collation precision can be further improved by using the image transformation means, the collation means, the maximum coincidence ratio extraction means, minimum coincidence ratio extraction means, the computation means for obtaining the difference between the maximum coincidence ratio output from the maximum coincidence ratio extraction means and the minimum coincidence ratio output from the minimum coincidence ratio extraction means, and the determination means for determining that the first and second images are identical images, if the difference output from the computation means is equal to or more than a predetermined threshold.

When the minimum coincidence ratio between the first and second images is smaller than the maximum coincidence ratio by two or more orders of magnitude, the difference in determination index (coincidence ratio difference) between user-to-user collation and user-to-others collation can be increased, and the collation precision can be improved by using the image transformation means, the collation means, the maximum coincidence ratio extraction means, minimum coincidence ratio extraction means, the computation means for obtaining the quotient calculated by dividing the maximum coincidence ratio output from the maximum coincidence ratio extraction means by the minimum coincidence ratio output from the minimum coincidence ratio extraction means, and the determination means for determining that the first and second images are identical images, if the quotient output from the computation means is equal to or more than a predetermined threshold.

The coincidence ratio range in which a threshold can be set can be broadened, and the collation precision can be improved by using the image transformation means, the collation means, the maximum coincidence ratio extraction means, the minimum coincidence ratio extraction moans, and the determination means for determining that the first and second images are identical images, if the maximum coincidence ratio output from the maximum coincidence ratio extraction means is equal to or more than a predetermined first threshold, and the minimum coincidence ratio output from the minimum coincidence ratio extraction means is smaller than a predetermined second threshold (first threshold $\geq$ second threshold).

The processing can be simplified by using the image transformation means, the collation means, the minimum coincidence ratio extraction means, and the determination means for determining the first and second images are identical images, if the minimum coincidence ratio output from the minimum coincidence ratio extraction means is smaller than a predetermined threshold, and omitting the maximum coincidence ratio extraction. This makes it possible to shorten the processing time.

In addition, this apparatus includes the second image transformation means, second collation means, and storage means. The range preset in the image transformation means is set to be narrower than the range preset in the second image transformation means. The image transformation means moves the first image to the second initial position set by adding the translation amount, rotational angle, or translation amount and rotational angle stored in the storage means to the first initial position. Thereafter, at least one image processing of translation processing and rotation processing is executed for the first image. With this operation, the second image transformation means, second collation means, and storage means, which are used to roughly correct the relative positional offset between the registered image and the test image, are only required to obtain a maximum coincidence ratio. Therefore, the processing time can be shortened.

By making the collation region in which the second collation means obtains coincidence ratios narrower than the collation region in which the collation means obtained coincidence ratios, the number of pixels to be compared/collated can be decreased when the relative positional offset between a registered image and a test image can be roughly corrected. This makes it possible to shorten the processing time.

The translation amount, rotational angle, or translation amount and rotational angle for each moving operation for the first image which is executed by the second image transformation means are set to be larger than the translation amount, rotational angle, or translation amount and rotational angle for each moving operation for the first image which is executed by the image transformation means, thereby increasing the movement amount for each moving operation for the test image which is executed to roughly correct the positional offset between the registered image and the test image. This makes it possible to decrease the number of times the second image transformation means performs translation processing and the number of times the second collation means performs comparison/collation, and hence shorten the processing time.

Furthermore, this apparatus includes the reference point detection means and correction amount computation means. The image transformation means moves the first image to the second initial position set by adding the translation amount, rotational angle, or translation amount and rotational angle obtained by the correction amount computation means to the first initial position. Thereafter, at least one image processing of translation processing and rotation processing is executed for the first image. This allows the reference point detection means to detect reference points of the test image and registered image to roughly correct the positional offset between the registered image and the test image. The position where these reference points coincide with each other is set as the second initial position. This makes it possible to shorten the image processing time.

Moreover, this apparatus includes the reference point detection means and correction amount computation means. The second image transformation means moves the first image to the new first initial position set by adding the translation amount, rotational angle, or translation amount and rotational angle obtained by the correction amount computation means to the first initial position. Thereafter, at least one image processing of translation processing and rotation processing is executed for the first image. This makes it possible to simultaneously obtain both the processing speed increasing effect based on the second image transformation means, second collation means, and storage means and the processing speed increasing effect based on the reference point detection means and correction amount computation means.

(11th Embodiment)

Figure 18:
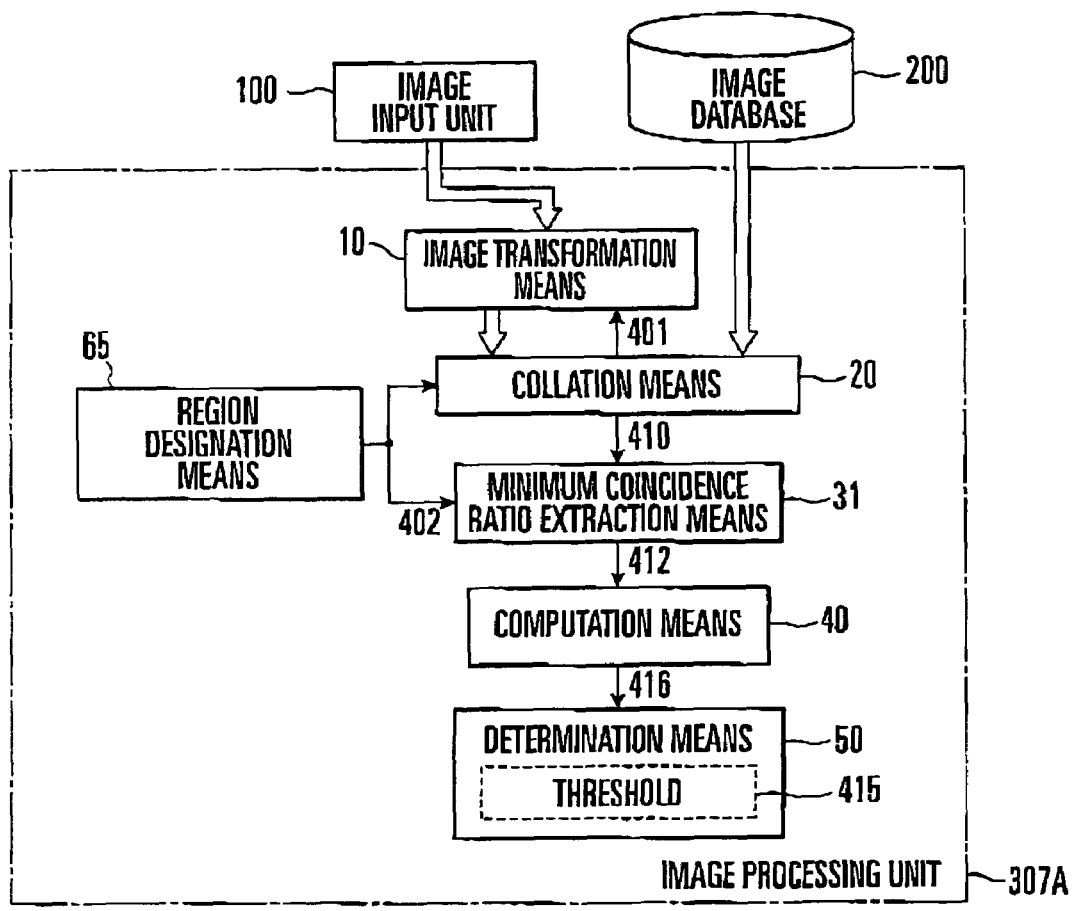
FIG. 18 is a block diagram showing the arrangement of an image collation apparatus according to the 11th embodiment of the present invention.

FIG. 18 shows the arrangement of an image collation apparatus according to the 11th embodiment of the present invention. The same reference numerals as in FIG. 9 denote the same parts in FIG. 18. This embodiment is different from the fourth embodiment in that an image processing unit 307A includes a region designation means 65.

This image collation apparatus is comprised of an image input unit 100, an image database 200, and the image processing unit 307A, as shown in FIG. 18.

The image input unit 100 detects the ridges/valleys of the skin of a finger placed on the sensor by using the sensor, and performs image processing such as analog/digital conversion and binarization for the signal output from the sensor. An output from the image input unit 100 is a binary image representing a ridge of the finger skin by a pixel having a luminance corresponding to black (black pixel) and representing a valley of the finger skin by a pixel having a luminance corresponding to white (white pixel). In the following description, this image will be referred to as a test image.

The image database 200 stores fingerprint image acquired in advance as registered data (registered images).

The image processing unit 307A compares/collates the test image input from the image input unit 100 with the registered image input from the image database 200, and determines whether the two images are identical fingerprint images or different fingerprint images. To improve the determination precision (collation precision), the image processing unit 307A includes a first image transformation means 10, the region designation means 65, a first collation means 20, a minimum coincidence ratio extraction means 31, a computation means 40, and a determination means 50.

The image transformation means 10 receives a test image, translates (shifts) each pixel of the input test image by a predetermined change amount, and outputs the resultant test image. The region designation means 65 sequentially outputs a plurality of predetermined partial collation regions of a region in which a registered image and a reference image are collated to the collation means 20.

The collation means 20 compares/collates the respective pixels at corresponding positions in the test image input from the image transformation means 10 and the registered image input from the image database 200, and totals the number of pixels whose luminance values coincide with each other in the partial collation region output from the region designation means 65. The collation means 20 then obtains the degree of similarity (coincidence ratio) between the two images from the number of coincident pixels and the number of black pixels of the registered image. In addition, the collation means 20 outputs a translation amount 401 to the image transformation means 10 to repeat translation by the image transformation means 10 and comparison/collation by the collation means 20 until the translation amount falls outside a predetermined range.

The minimum coincidence ratio extraction means 31 obtains a minimum coincidence ratio 412 from coincidence ratios 410 output from the collation means 20. The computation means 40 calculates the average of the minimum coincidence ratios 412 (minimum coincidence ratio average 416) in the respective partial collation regions which are output from the minimum coincidence ratio extraction means 31.

The determination means 50 compares the minimum coincidence ratio average 416 with a predetermined threshold. If the minimum coincidence ratio average 416 is equal to or less than the threshold, the determination means 50 determines that "the two fingerprints are identical". If the minimum coincidence ratio average 416 is larger than the threshold, the determination means 50 determines that "the two fingerprints are different".

Figure 19:
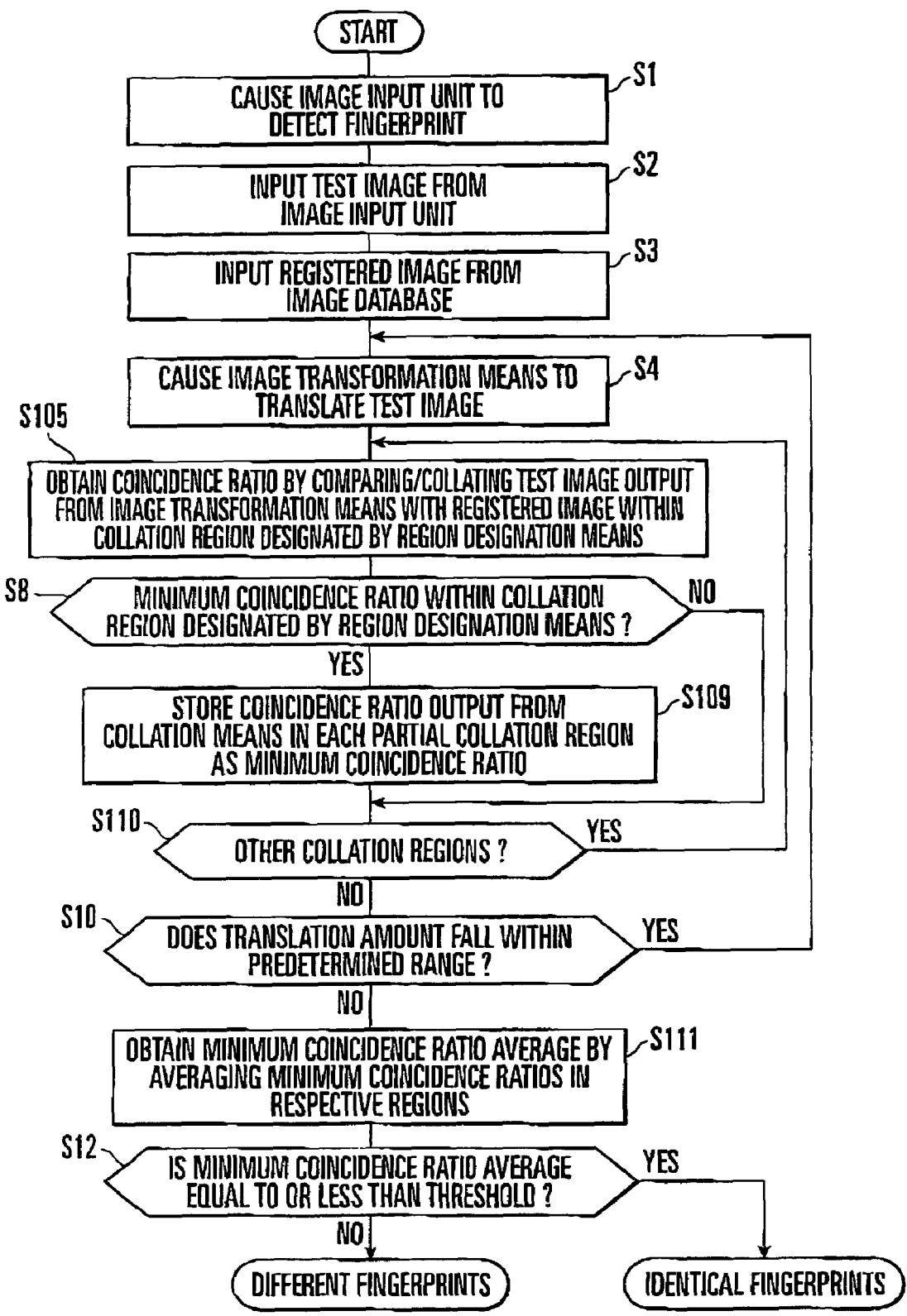
FIG. 19 is a flow chart showing the collating operation of the 11th embodiment of the present invention.

FIG. 19 shows the collating operation of the fingerprint collation apparatus according to the 11th embodiment. In step S1, the image input unit 100 detects the fingerprint of a finger placed on the sensor and generates a test image. In step S2, the test image generated by the image input unit 100 is sent to the image processing unit 307A. A registered image stored in the image database 200 is also sent to the image processing unit 307A (step S3).

The image processing unit 307A transforms the test image output from the image input unit 100 into image data by using the image transformation means 10, and compares/collates the transformed test image with the registered image output from the image database 200 to check whether the two images are identical fingerprint images or different fingerprint images.

The image transformation means 10 outputs the test image while translating it by a predetermined amount (for each collation unit) in accordance with the translation amount designation signal 401 and changing the translation amount within a predetermined range to improve the determination precision (collation precision).

The collation means 20 compares/collates the output (test image) from the image transformation means 10 with the registered image to obtain the degree of similarity (coincidence ratio) between the test image and the registered image (step S105). In this case, while the collation means 20 repeatedly executes collating operation in the respective partial collation regions output from the region designation means 65, which is a characteristic feature of this embodiment, the minimum coincidence ratio extraction means 31 extracts minimum coincidence ratios corresponding to the respective collation regions (step S8), and the minimum coincidence ratios are stored (step S109).

The flow then advances to step S110 to check whether there is any other region for collation. If YES in step S110, the flow returns to step S105. If NO in step S110, the flow advances to step S111 to average the minimum coincidence ratios 412 corresponding to the respective partial collation regions, output from the minimum coincidence ratio extraction means 31, by using the computation means 40, thereby obtaining a minimum coincidence ratio average.

If the minimum coincidence ratio average 416 output from the computation means 40 is equal to or less than the threshold, it is determined that "the two fingerprints are identical". If the minimum coincidence ratio average 416 is larger than the threshold, it is determined that "the fingerprints are different".

This embodiment is different from each embodiment described above in that while the collation means 20 of the image processing unit 307A repeats comparison/collation in the respective partial collation regions designated by the region designation means 65 and the image transformation means 10 repeats translation, minimum coincidence ratios are obtained with optimal translation amounts in the respective partial collation regions, and the results are averaged.

The image input unit 100 is comprised of a capacitance detection type fingerprint sensor for sensing a fingerprint ridge/valley pattern by detecting the capacitances formed between the electrodes of small sense units two-dimensionally arranged on an LSI chip and the skin of a finger that touches the electrodes through an insulating film (disclosed in, for example, M. Tartagni and R. Guerrieri, "A fingerprint sensor based on the feedback capacitive sensing scheme", IEEE J. Solid-State Circuits, Vol. 33, pp. 133–142, January 1998), an analog/digital converter, a processor for executing image processing such as binarization, and a storage unit such as a semiconductor memory.

The image database 200 can be realized by a storage unit such as a hard disk unit or nonvolatile memory. The image processing unit 307A can be implemented by a processor and a storage unit such as a semiconductor memory.

A method of implementing the image transformation means 10 will be described below. First of all, a coordinate system is set for a test image in advance. Linear transformation is then performed to translate the coordinates of each pixel determined by this coordinate system. Finally, an image is reconstructed on the basis of the coordinates of each pixel after the linear transformation. Note that the image transformation means 10 may execute the above processing for a registered image instead of a test image. In linear transformation executed by the image transformation means 10, an angular offset can also be corrected by performing rotational transformation as well as translation.

The region designation means 65 can be implemented by a method of outputting the coordinates of the lower left vertex and upper right vertex of each partial collation region to the collation means 20 and designating a region in which the minimum coincidence ratio in each partial collation region is stored with respect to the minimum coincidence ratio extraction means 31.

Figure 20B:
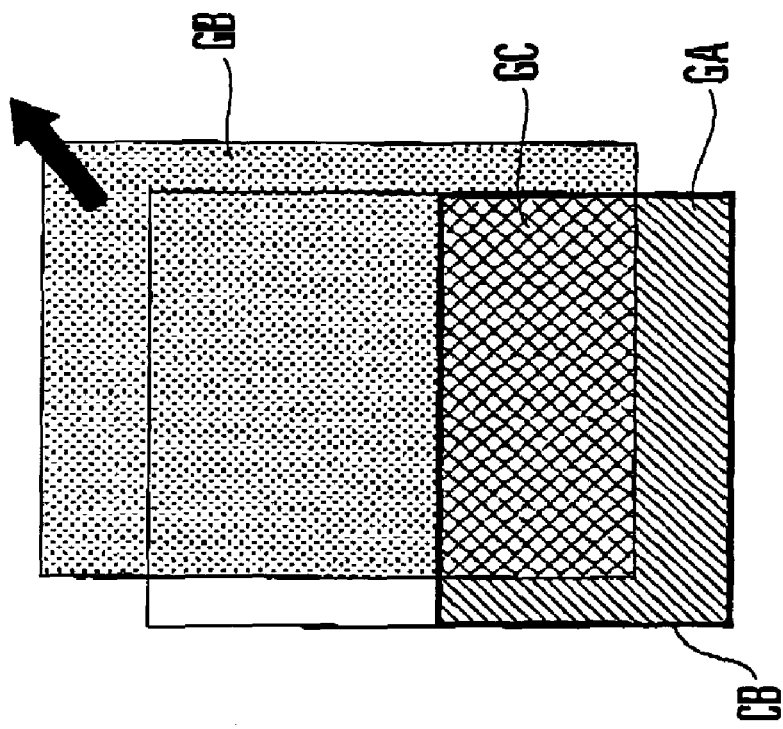
FIGS. 20A and 20B are views showing collation in a plurality of collation regions with optimal correction amounts to explain the 11th embodiment.
Figure 20A:
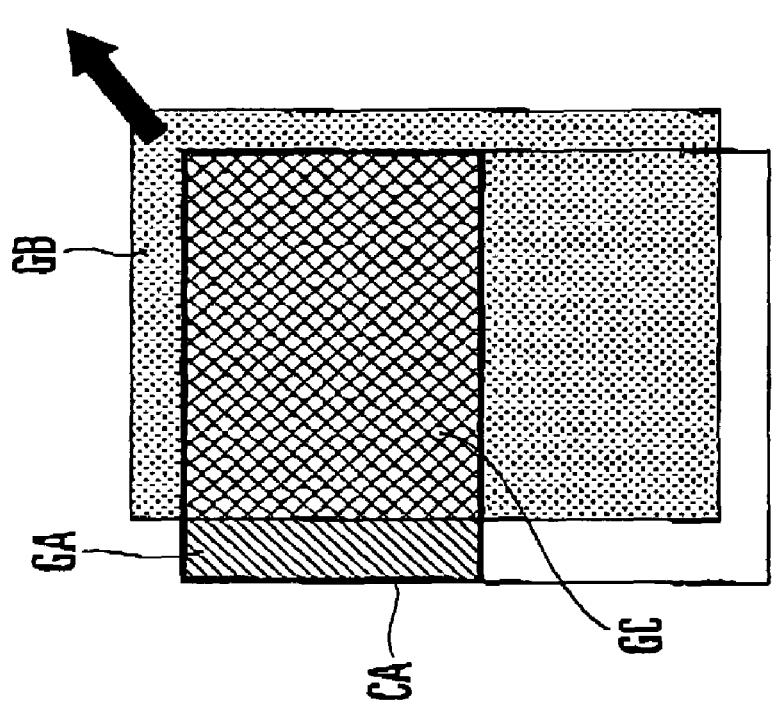

FIGS. 20A and 20B show how the position of a reference image is corrected by an optimal translation amount for each of partial collation regions CA and CB, and then the resultant image is collated with a registered image in the 11th embodiment.

Referring to FIGS. 20A and 20B, a hatched portion GA represents a registered image, and a gray portion GB represents a reference image after position correction with optimal translation amounts. A check pattern portion GC represents a region for comparison/collation. Referring to FIGS. 20A and 20B, the collation region is divided into the upper and lower partial collation regions CA and CB. In collation, the optimal translation amount for the upper half region differs from that for the lower half region. Each of FIGS. 21A and 21B shows the result obtained by collation upon translating an actual fingerprint image in the direction indicated by the arrow with respect to a registered image.

Referring to FIGS. 21A and 21B, the reference image is indicated by relatively wide gray portions (GB), and the registered image is indicated by the black lines (GA). The circled portions indicate how partial incoincident portions caused by the distortion of the skin of a finger are corrected. By performing collation with different translation amounts for the upper and lower half regions respectively shown in FIGS. 21A and 21B, the images in the circled portions, which do not coincide with each other in the prior art, can be made to coincide with each other. That is, according to this embodiment, the maximum coincidence ratio average in user-to-user collation can be increased by correcting partial incoincident portions caused by the distortion of the skin of a finger. The collation precision can be improved by increasing the maximum coincidence ratio average.

(12th Embodiment)

Figure 22:
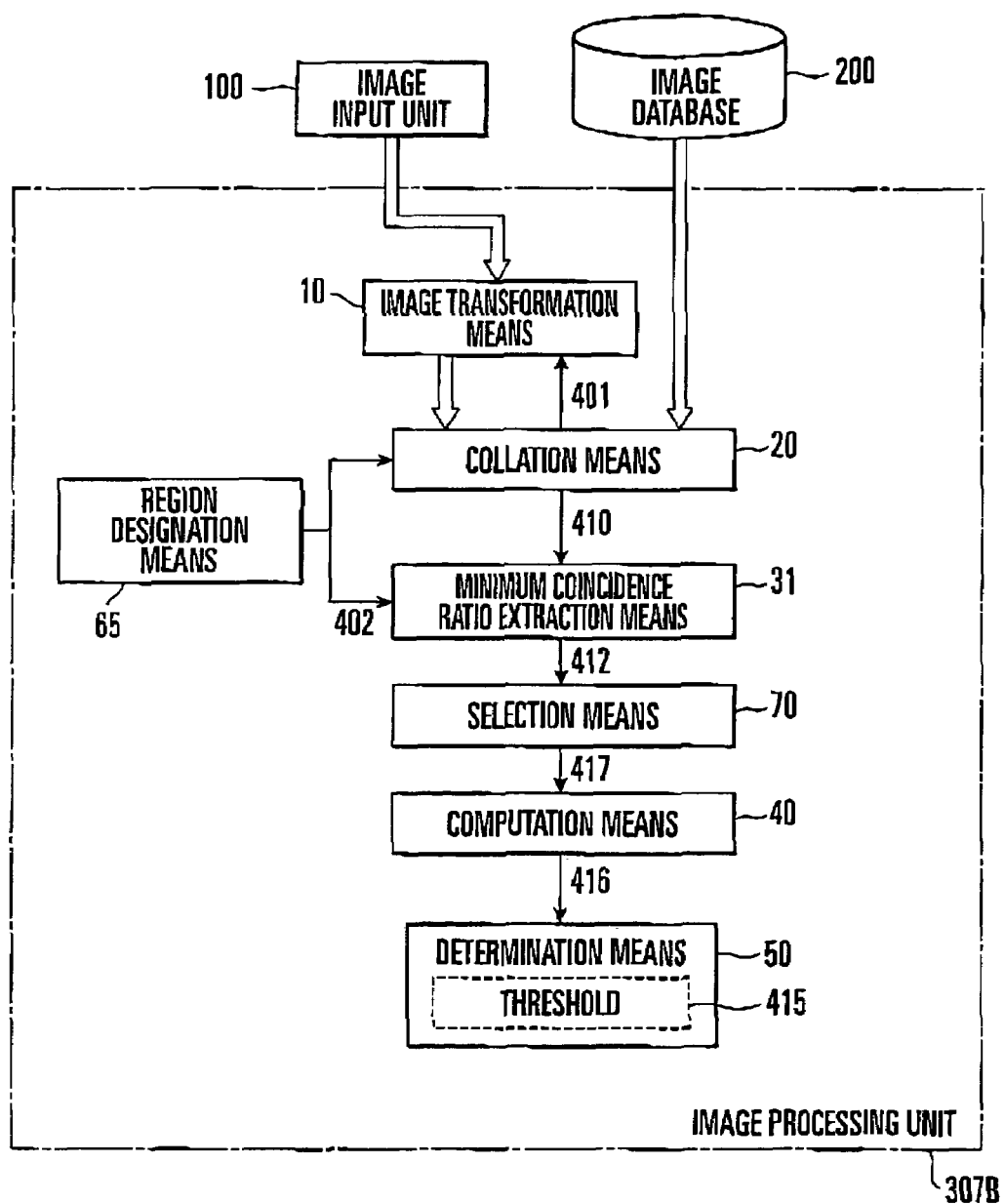
FIG. 22 is a block diagram showing the arrangement of an image collation apparatus according to the 12th embodiment of the present invention.

FIG. 22 shows the arrangement of an image collation apparatus according to the 12th embodiment of the present invention, This embodiment is different from the 11th embodiment in that an image processing unit 307B includes a selection means 70.

Figure 23:
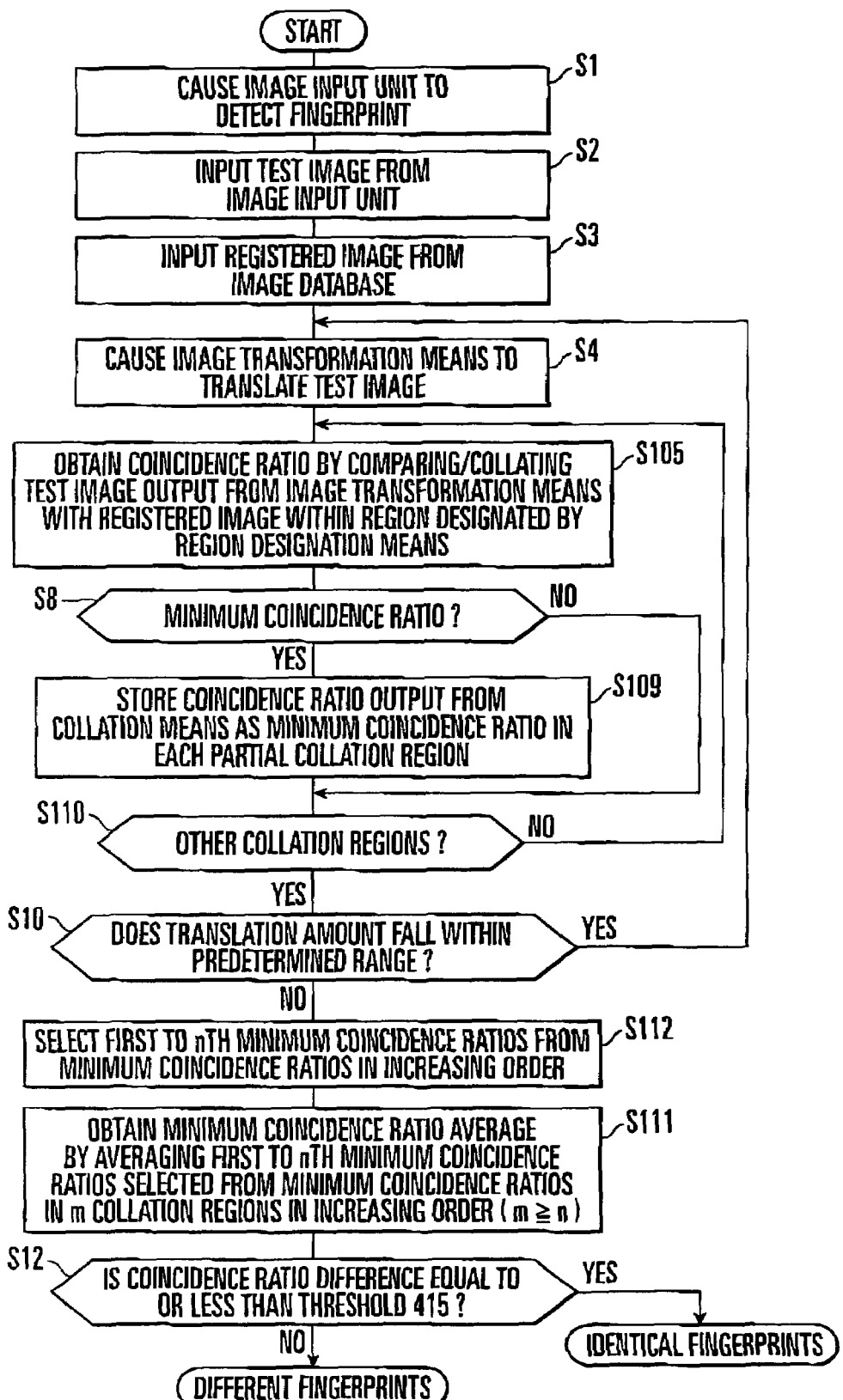
FIG. 23 is a flow chart showing the collating operation of the 12th embodiment of the present invention.

FIG. 23 shows a collation procedure in the 12th embodiment. This procedure is different from that in the 11th embodiment in that the selection means 70 is connected to the output stage of a minimum coincidence ratio extraction means 31 to compare minimum coincidence ratios 412 in the respective partial collation regions (m regions), extracted by the minimum coincidence ratio extraction means 31, with each other and sequentially output the n (n<m) minimum coincidence ratios in increasing order (step S112).

The computation means 40 averages only minimum coincidence ratios 417 output from the selection means 70 up to the nth minimum coincidence ratio in increasing order and outputs the resultant minimum coincidence ratio average (step S111).

In this embodiment, the minimum coincidence ratio average in user-to-user collation can be further reduced by excluding a partial collation region which has greatly deformed to result in difficulty in making a correction from targets for which minimum coincidence ratios are averaged. The collation precision can be improved by reducing the minimum coincidence ratio.

(13th Embodiment)

Figure 24:
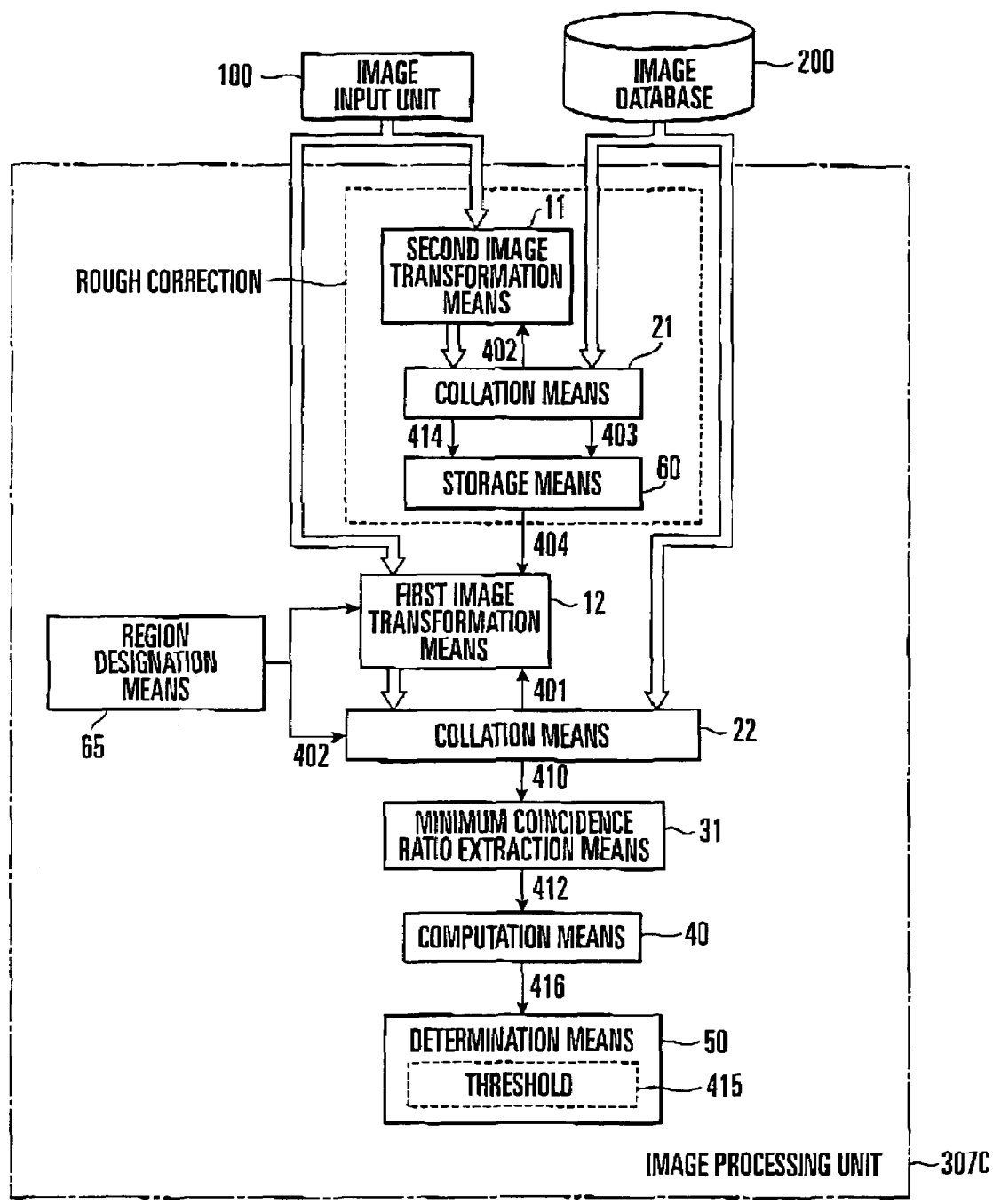
FIG. 24 is a block diagram showing an image collation apparatus according to the 13th embodiment of the present invention.

FIG. 24 shows an image collation apparatus according to the 13th embodiment of the present invention, which is an application example of the 11th embodiment shown in FIG. 18. This embodiment differs from the fifth embodiment in the following points. First, an image processing unit 307C includes a second image transformation means 11, collation means 21, and storage means 60 as means for roughly correcting the relative positional offset between a registered image and a test image, and causes the storage means 60 to store the translation amount set when a maximum coincidence ratio is obtained during execution of translation by the second image transformation means 11 and comparison/collation by the collation means 21. Second, a translation amount 404 is output from the storage means 60 to an image transformation means 12 corresponding to the image transformation means 10 in the 11th embodiment to start translating the test image from the second initial position set by adding the translation amount to the first initial position. The same reference numerals as in FIG. 11 denote the same parts in FIG. 24.

The second image transformation means 11 receives a test image, translates (shifts) each pixel of the received image by a predetermined change amount, and outputs the resultant test image.

The collation means 21 totals the number of pixels whose luminance values coincide with each other in a predetermined collation region in the test image input from the second image transformation means 11 and the registered image input from an image database 200, and obtains a coincidence ratio between the two images on the basis of the number of coincident pixels and the number of black pixels of the registered image.

The collation means 21 outputs a translation amount to the second image transformation means 11 to repeat translation by the second image transformation means 11 and comparison/collation by the collation means 21 until the translation amount and rotational angle fall outside a first set range. The first set range corresponds to the translation range in the 11th embodiment. P The storage means 60 stores a translation amount 414 when a coincidence ratio 403 output from the collation means 21 is a maximum value.

The image transformation means 12 moves the test image input from an image input unit 100 to the second initial position set by adding the translation amount output from the correction amount computation means 80 to the first initial position, then changes the test image by a predetermined amount in accordance with a translation amount designation signal 401, and outputs the resultant test image.

Figure 25A:
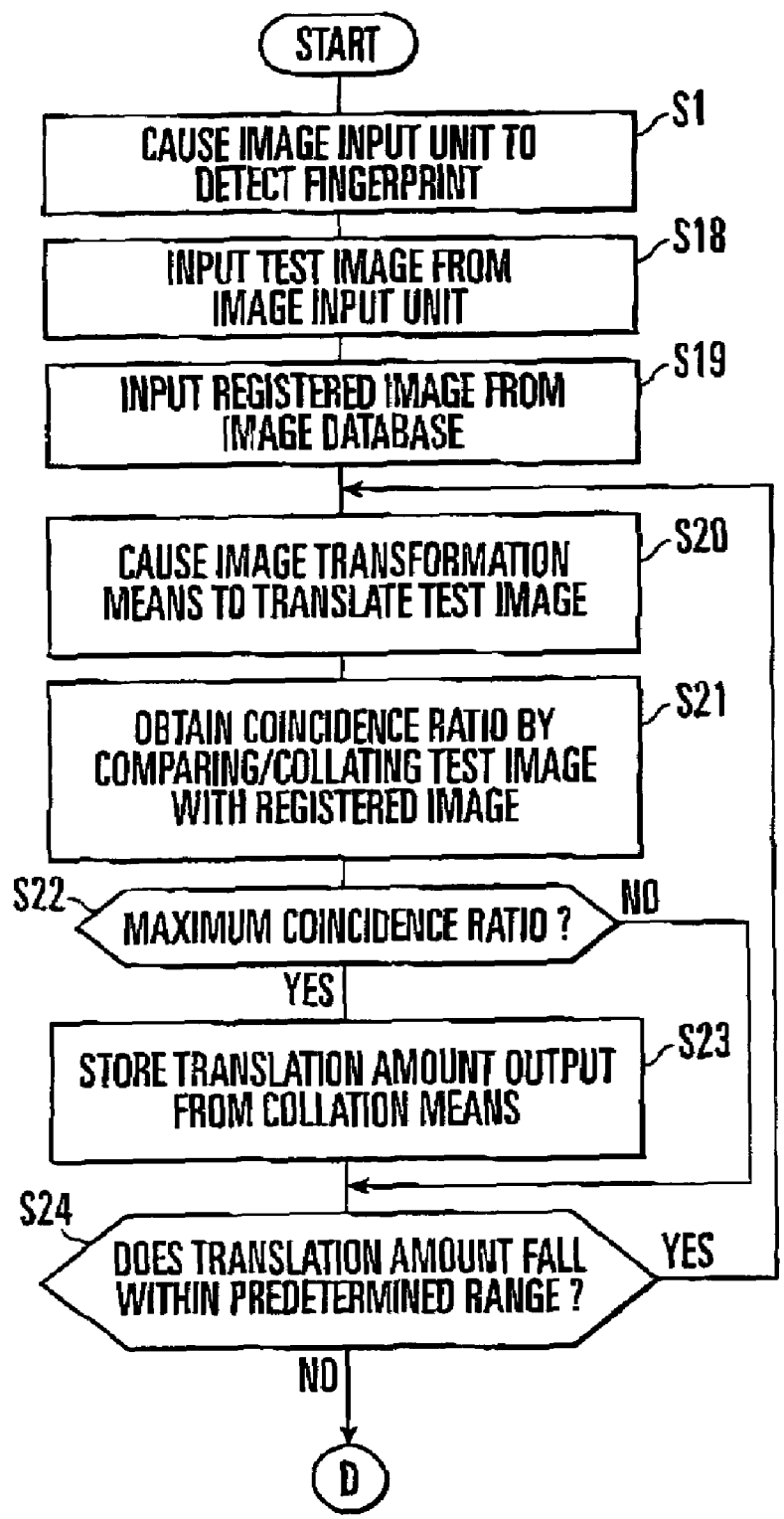
FIGS. 25A and 25B are flow charts showing the collating operation of the 13th embodiment of the present invention.
Figure 25B:
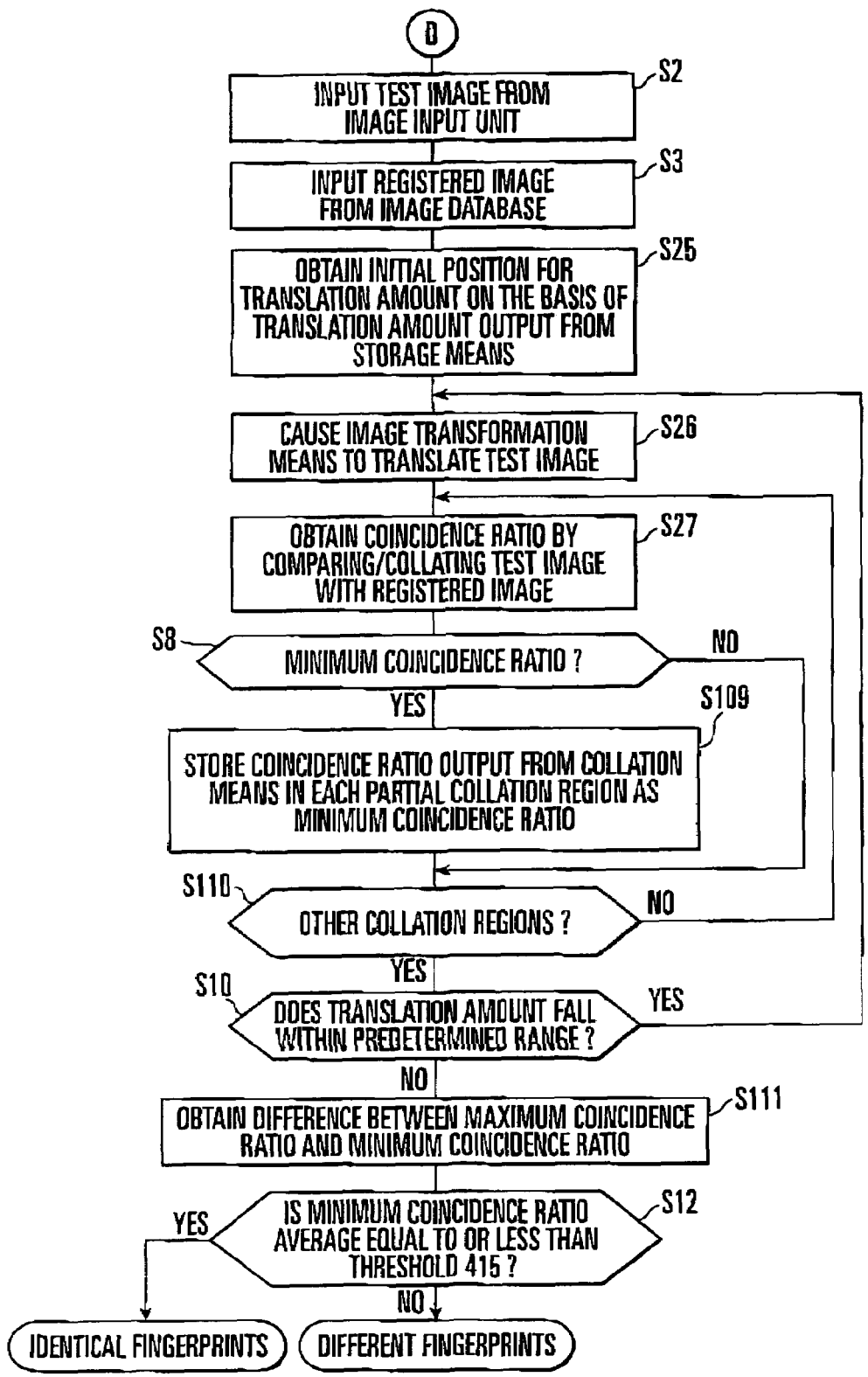

FIGS. 25A and 25B show a collation procedure in the 13th embodiment. The same reference symbols as in FIGS. 12 and 18 denote the same processing in FIGS. 23A and 25B.

In step S1, the image input unit 100 detects the fingerprint of a finger placed on the sensor and generate a test image. The image processing unit 307C receives the test image from the image input unit 100 (step S18) and a registered image from the image database 200 (step S19), and translates the test image by using the second image transformation means 11 (step S20).

The collation means 21 obtains a coincidence ratio by comparing/collating the test image output from the second image transformation means 11 with the registered image output from the image database 200 (step S21). The storage means 60 checks whether the coincidence ratio output from the collation means 21 is a maximum value (step S22), and if it is a maximum value, stores the translation amount signal 414 output from the collation means 21 at this time (step S23).

If the movement amount with respect to the first initial position falls within a set range, the collation means 21 outputs the translation amount designation signal 402 (step S24). If the movement amount of the test image exceeds the first set range, the storage means 60 outputs the stored translation amount 414 as the movement amount signal 404 to the image transformation means 12.

When the movement amount of the test image exceeds the first range, the image transformation means 12 moves the test image input from the image input unit 100 to the second initial position (step S26) set by adding the movement amount represented by the movement amount signal 404 to the first initial position (steps S2, S3, and S25). The test image moved to the second initial position in accordance with the translation amount signal 401 output from the collation means 22 is compared/collated with the registered image. The subsequent processing is the same as that in the 11th embodiment, and hence a description thereof will be omitted.

The image transformation means 12 can be implemented by the same method as that for the second image transformation means 11. The image transformation means 12 may perform image processing for a registered image instead of a test image. Although the method of translating (shifting) a test image has been described above, an angular offset can also be corrected by performing rotation processing as well as translation by linear transformation performed by the second image transformation means 11. The storage means 60 can be implemented by a method of storing the translation amount when a maximum coincidence ratio is obtained.

In this embodiment, by setting the second set range of translation amounts output from the collation means 22 to be narrower than the second set range of translation amounts output from the collation means 21, the processing of extracting a maximum coincidence ratio by totaling the number of coincident pixels in a plurality of partial collation regions can be reduced. This makes it possible to shorten the processing time.

(14th Embodiment)

An illustration of the arrangement of the 14th embodiment of the present invention will be omitted because it is the same as that of the 13th embodiment shown in FIG. 24. An illustration of a collation procedure in the 14th embodiment will be omitted because it is substantially the same as that in the 13th embodiment shown in FIG. 25.

The 14th embodiment is different from the 13th embodiment in that the change amount of translation amount for each moving operation which is output from a collation means 21 is set to be larger than the change amount of translation amount and rotational angle for each moving operation which is output from a collation means 22 in order to roughly correct a positional offset.

In this embodiment, the number of times a second image transformation means 11 performs translation for rough correction and the number of times the collation means 21 performs comparison/collation can be reduced, and hence the processing time can be shortened.

(15th Embodiment)

An illustration of the arrangement of the 15th embodiment of the present invention will be omitted because it is the same as that of the 13th embodiment shown in FIG. 24. An illustration of a collation procedure in the 15th embodiment will be omitted because it is substantially the same as that in the 13th embodiment shown in FIG. 25.

The 15th embodiment is different from the 13th embodiment in that the area of a collation region set from a collation means 21 in advance is set to be smaller than the total area of partial collation regions set for a region designation means 65 in advance in order to perform rough position correction.

In this embodiment, in roughly correcting the relative positional error between a registered image and an test image, the number of pixels to be compared/collated can be reduced, thus shortening the image processing time.

In the 11th to 15th embodiments, images to be collated are fingerprint images. When, however an image deforms because the shape of a soft object such as an animal noseprint is detected by a contact type detection unit, the collation precision can be improved by applying this embodiment.

Note that image collation apparatuses configured to cope with image deformation due to distortion are disclosed in Japanese Patent Laid-open Nos. 5-242222 and 9-282458.

According to Japanese Patent Laid-Open No. 5-242222, a test image is divided into partial collation regions, and determination is performed on the basis of the number of partial collation regions that exceed a threshold upon feature collation. In this method, feature collation is performed for each partial region to check whether the two fingerprints are identical or not. This method is essentially different from a method according to the present invention in that no determination of coincidence/incoincidence is performed in each partial collation region unit, and determination of coincidence/incoincidence is performed by using the average of maximum coincidence ratios in the respective partial collation regions as an index.

According to Japanese Patent Laid-Open No. 9-282458, a test image is divided into partial collation regions, and the partial collation regions of a test image are associated with the partial collation regions of the registered image on the basis of relative positions from the central positions to obtain the correlation values between the corresponding partial collation regions, thereby determining coincidence/incoincidence. The present invention is essentially different from this prior art in that one of registered and test images is divided into partial collation regions, and the other image is entirely used as a collation region, thereby obtaining a maximum coincidence ratio.

An image collation apparatus for performing collation upon cutting one image into a plurality of images is disclosed in Japanese Patent Laid-Open No. 10-214343. According to Japanese Patent Laid-Open No. 10-214343, the distribution of coincidence ratios obtained by performing comparison/collation while scanning each cut image on the other image is stored, and coincidence/incoincidence is determined from the totaling result of coincidence ratio distributions. According to this technique, coincidence ratio distributions are stored in a storage unit, and the positional relationship between the coincidence ratio distributions must be stored in advance. The present invention is essentially different from this prior art in that images are compared/collated with each other, and only maximum coincidence ratios corresponding to the respective partial collation regions are stored, thereby determining coincidence/incoincidence with simple image processing.

Each embodiment of the present invention which will be described below differs from the image collation apparatus according to each embodiment described above in the following point. To correct a positional offset and angular offset, at least one of translation and rotation is performed for the first image. In the process of repeatedly obtaining the degrees of similarity (coincidence ratios) by comparing/collating the first and second images, collation is performed while the line width of the second image is reduced or increased by image processing. The coincidence ratios obtained by collation are averaged.

(16th Embodiment)

Figure 26:
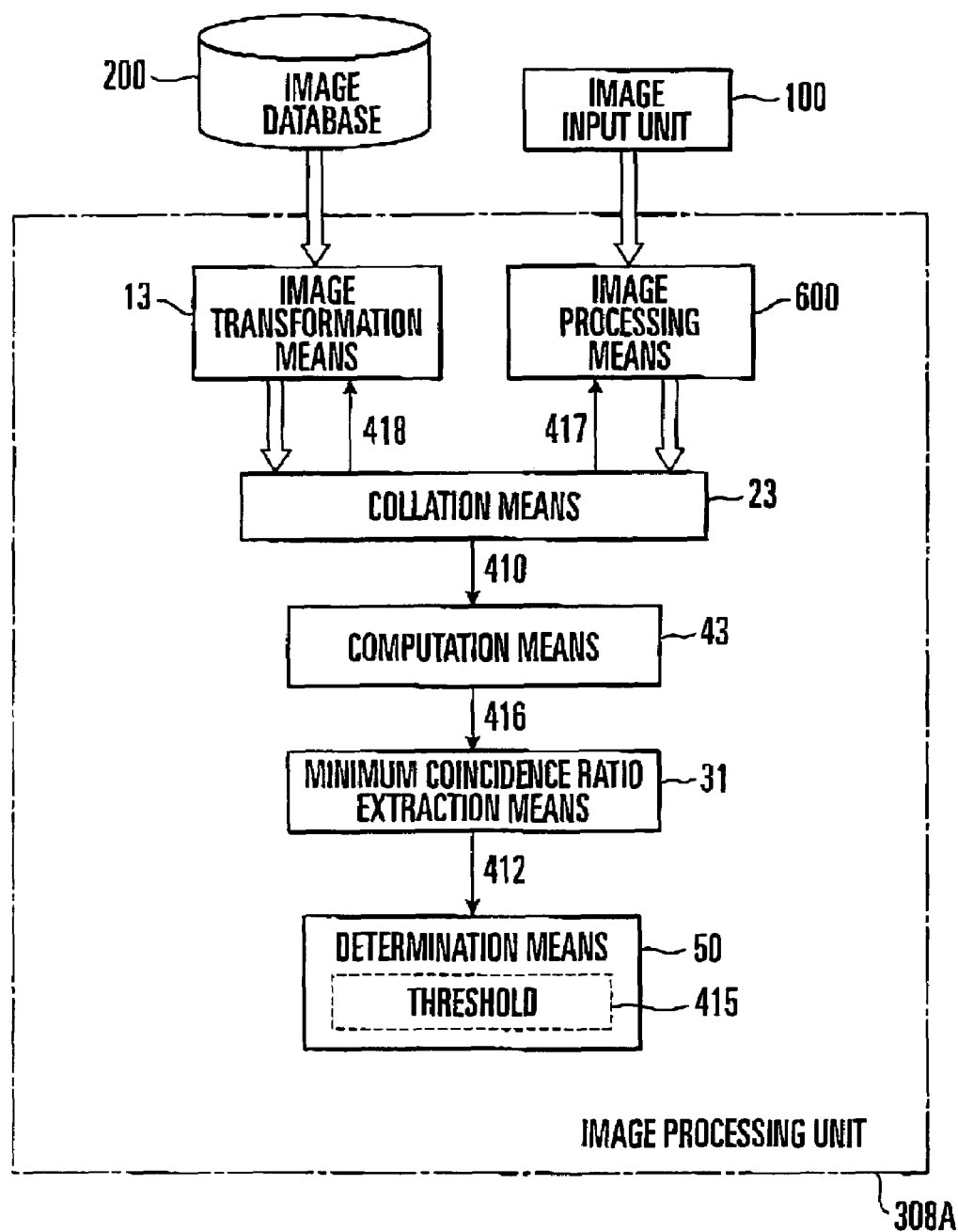
FIG. 26 is a block diagram showing the arrangement of an image collation apparatus according to the 16th embodiment.

FIG. 26 shows an image collation apparatus according to the 16th embodiment of the present invention. This image collation apparatus is comprised of an image input unit 100, image database 200, and image processing unit 308A.

As in the above embodiments the image input unit 100 detects the ridges/valleys of the skin of a finger placed on the sensor by using the sensor, and performs image processing such as analog/digital image conversion and binarization for a signal output from the sensor. An output from the image input unit 100 is a binary image representing a ridge of the finger skin by a pixel having a luminance corresponding to black (black pixel) and representing a valley of the finger skin by a pixel having a luminance corresponding to white (white pixel). An image output from the image input unit 100 will be referred to as a test image hereinafter.

The image database 200 stores fingerprint images acquired in advance as registered data. The images stored in the image database 200 will be referred to as registered images.

The image processing unit 308A compares/collates the test image input from the image input unit 100 with the registered image input from the image database 200 to check whether the two image are identical fingerprint images or different fingerprint images. To improve the determination precision (collation precision), the image processing unit 308A includes an image processing means 600, image transformation means 13, collation means 23, computation means 43, minimum coincidence ratio extraction means 31, and determination means 50. The 16th embodiment is different from the first embodiment in that the image processing unit 308A has the image processing means 600 and computation means 43.

The image processing means 600 cuts away an edge portion of a ridge to output a second test image whose ridge width is decreased. The image transformation means 13 receives a registered image, translates (shifts) each pixel of the received registered image by a predetermined change amount, and output the resultant registered image. The collation means 23 compares/collates pixels at corresponding positions in the test image input from the image processing means 600 and the registered image input from the image transformation means 13, and totals the number of pixels whose luminance values coincide with each other in a predetermined collation region, thereby obtaining the degree of similarity (coincidence ratio) between the two images on the basis of the number of coincident pixels and the number of black pixels of the registered image.

The collation means 23 outputs a test image prompting signal 417 to the image processing means 600 to repeatedly make the image processing means 600 cut away an edge portion and also perform comparison/collation by itself until the ridge width become almost equal to one pixel. In addition, the collation means 23 outputs a translation amount 418 to the image transformation means 13 to repeat translation by the image transformation means 13 and comparison/collation by the collation means 23 until the translation amount and rotational angle fall outside a predetermined range. This comparison/collation processing is repeated until no collation region is left.

The computation means 43 calculates and outputs the average (coincidence ratio average 416) of coincidence ratios 410 with respect to test images having different line widths output from the collation means 23. The minimum coincidence ratio extraction means 31 obtains a minimum coincidence ratio 412 from the coincidence ratios 416 output from the computation means 43. The determination means 50 compares the minimum coincidence ratio 412 with a predetermined threshold 415. If the minimum coincidence ratio 412 is equal to or less than the threshold, the determination means 50 determines that "the two fingerprints are identical". If the minimum coincidence ratio 412 is larger than the threshold, the determination means 50 determines that "the two fingerprints are different".

Figure 27:
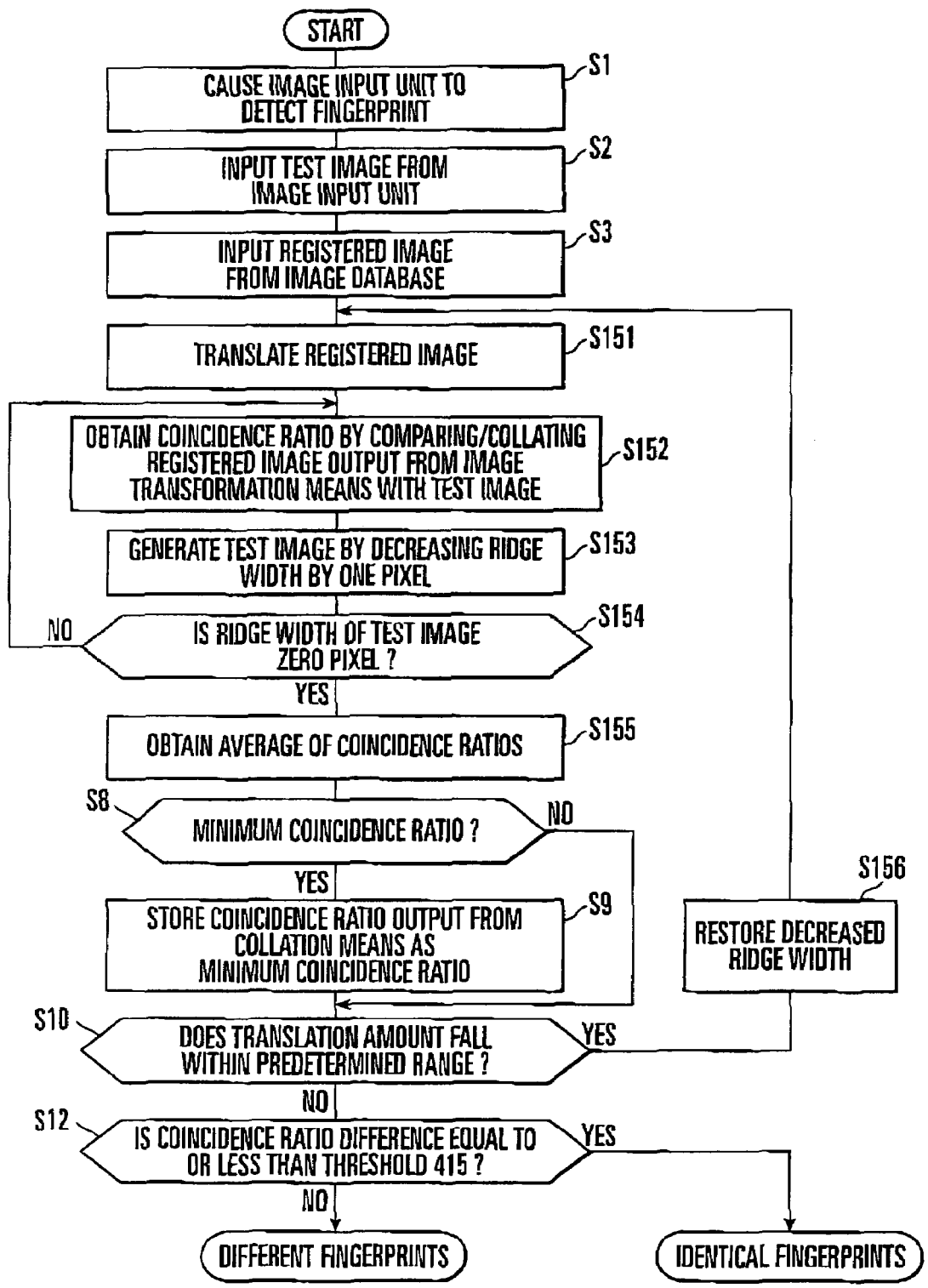
FIG. 27 is a flow chart showing the collating operation of the 16th embodiment of the present invention.

FIG. 27 shows collating operation in the 16th embodiment.

First of all, the image input unit 100 detects the fingerprint of a finger placed on the sensor (step S1) and generates a test image. In steps S2 and S3, the test image generated by the image input unit 100 and a registered image stored in the image database 200 are sent to the image processing unit 308A.

In the image processing unit 308A, the image transformation means 13 translates (shifts) the registered image input from the image database 200 and outputs the resultant image (step S151). In step S152, the collation means 23 repeatedly compares/collates the test image output from the image processing means 600 with the registered image output from the image transformation means 13 to output coincidence ratios.

In step S153, the image processing means 600 cuts away an edge portion of a ridge of the test image input from the image input unit 100 to generate a second test image whose ridge width is decreased (for example, by one pixel), and sends it to the computation means 43.

In step S154, if the ridge of the test image is no 0 pixel, the collation means 23 outputs the test image prompting signal 417 to the image processing means 600. The flow then returns to step S152, in which the collation means 23 compares/collates the test image output from the image processing means 600 with the registered image output from the image transformation means 13 and outputs a coincidence ratio. In step S153, the width of the ridge of the test image is decreased (for example, by one pixel). The flow then advances to step S154.

Comparison/collation by the collation means 23 and cutting of the edge portion by the image processing means 600 are repeated until it is determined in step S154 that the width of the ridge of the test image becomes 0 pixel.

When the width of the ridge of the test image becomes 0 pixel, the computation means 43 average the coincidence ratios output from the collation means 23 for the respective test images in step S155. This coincidence ratio average is sent to the minimum coincidence ratio extraction means 31.

In step S8, the minimum coincidence ratio extraction means 31 checks whether the coincidence ratio average output from the computation means 43 in the process of repetitive processing performed by the image processing means 600 and collation means 23 is a minimum value. If YES in step S8, the minimum coincidence ratio extraction means 31 stores this value as the minimum coincidence ratio 412 (step S9).

If the above translation amount falls within the set range, the reduced ridge width of the test image is restored in step S156, and the flow returns to step S151 to translate the registered image again. If the translation amount exceeds a set value, the flow returns to step S12 to perform determination processing.

If it is determined in step S12 that the minimum coincidence ratio 412 output from the minimum coincidence ratio extraction means 31 is equal to or more than the threshold 415, the determination means 50 determines that "the two fingerprints are identical". If the minimum coincidence ratio 412 is smaller than the threshold, the determination means 50 determines that the "two fingerprints are different".

This embodiment is different from the above embodiment in that the image processing means 600 of the image processing unit 308A decreases the width of a ridge, and the computation means 43 averages coincidence ratios with respect to a plurality of test images having different ridge widths, which are obtained by repetitive comparison/collation performed by the collation means 23, and outputs the average.

The image input unit 100 can be implemented by a capacitance detection type fingerprint sensor for sensing a fingerprint ridge/valley pattern by detecting the capacitances formed between the electrodes of small sense units two-dimensionally arranged on an LSI chip and the skin of a finger that touches the electrodes through an insulating film (disclosed in, for example, M. Tartagni and R. Guerrieri, "A fingerprint sensor based on the feedback capacitive sensing scheme", IEEE J. Solid-State Circuits, Vol. 33, pp. 133–142, January 1998), an analog/digital converter, a processor for executing image processing such as binarization, and a storage unit such as a semiconductor memory. The image database 200 can be realized by a storage unit such as a hard disk unit or nonvolatile memory.

The image processing unit 308A can be implemented by a processor and a storage unit such as a semiconductor memory. An image transformation means 10 can be implemented by executing contraction in which if at least one white pixel exists among neighboring pixels (four or eight neighboring pixels) around a target pixel, the white pixel is set as a target pixel. Note that the image processing means 600 may execute processing for the registered image after the processing executed by the image transformation means 13 instead of the registered image. A method of implementing the image transformation means 13 will be described below.

First of all, a coordinate system is set for a test image. The coordinates of each pixel which are determined by the set coordinate system are linearly transformed to be translated. Finally, an image is reconstructed on the basis of the coordinates of each pixel after linear transformation. In the linear transformation performed by the image transformation means 13, an angular offset can also be corrected by adding rotational transformation. In this embodiment, the image processing means 600 executes processing for a registered image, and the image transformation means 13 executes processing for a test image. However, the image transformation means 13 may execute processing for a registered image, and the image processing means 600 may execute processing for a test image.

FIGS. 28A to 28C show a plurality of test images having different ridge widths which are output from the image processing means 600 in the 16th embodiment. FIG. 29 summarizes a plurality of number of times of collation between test images having different line widths and a registered image to indicate that collation between the images having different line widths and the registered image exhibits a weighting effect.

FIG. 28A shows the test image output from the image input unit 100 itself. FIGS. 28B and 28C sequentially show a decrease in the ridge width of a test image.

If pixels of a registered image and test image which are located near a skeletal portion coincide with each other, the pixels are counted as coincident pixels upon a plurality of number of times of collation. Therefore, the minimum coincidence ratio becomes near 100% only when a test image thinned to near a skeletal portion as shown in FIG. 28C coincides with a registered image. In this embodiment, by weighting coincident pixels near the skeletal portion of the test image more heavily than coincident pixels near an edge portion, the minimum coincidence ratio in user-to-others collation is suppressed low to improve the collation precision.

(17th Embodiment)

Figure 30:
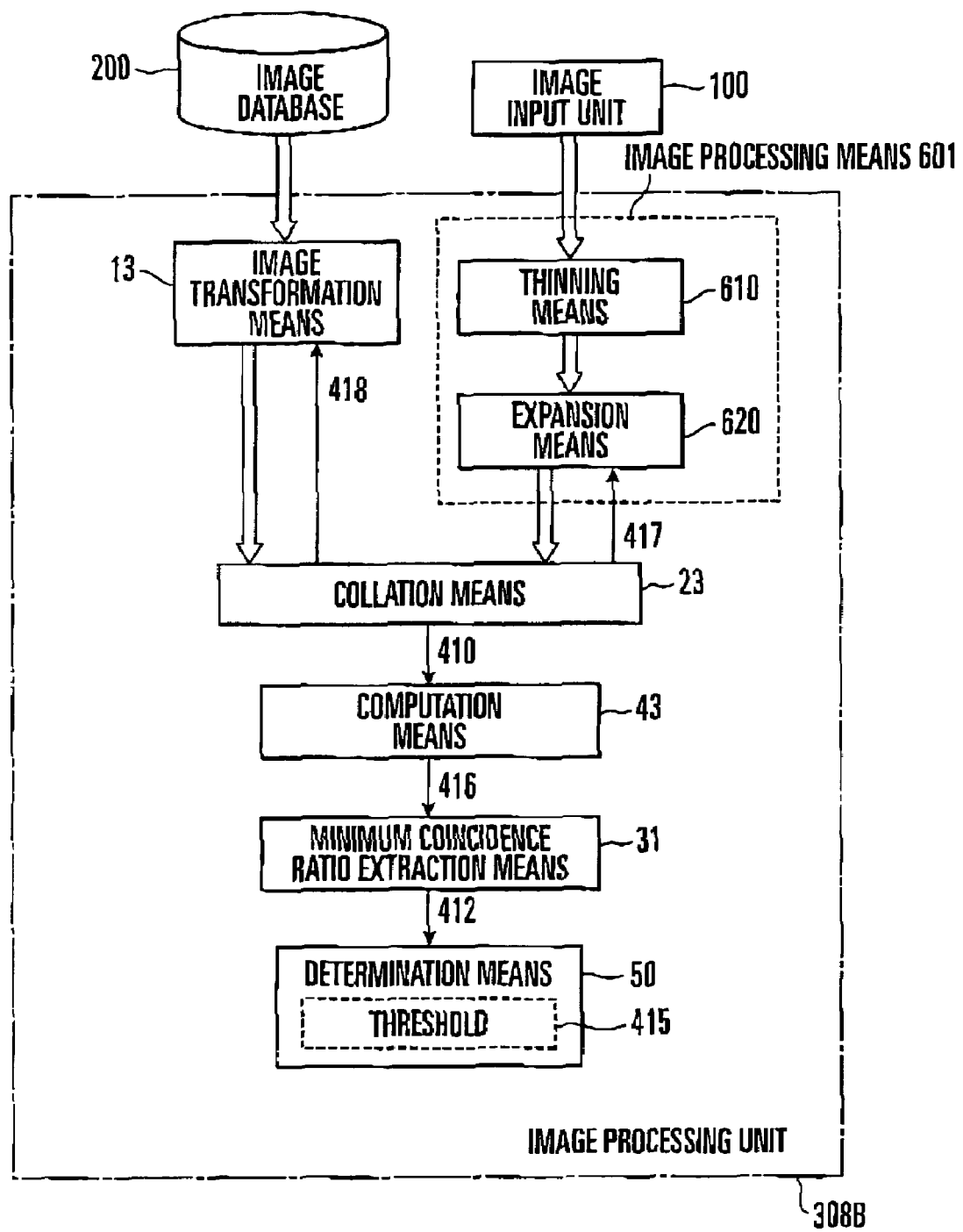
FIG. 30 is a block diagram showing the arrangement or an image collation apparatus according to the 17th embodiment of the present invention.

FIG. 30 shows the 17th embodiment of the present invention, which differs from the 16th embodiment in that an image processing means 601 is comprised of a thinning means 610 and expansion means 620.

Figure 31:
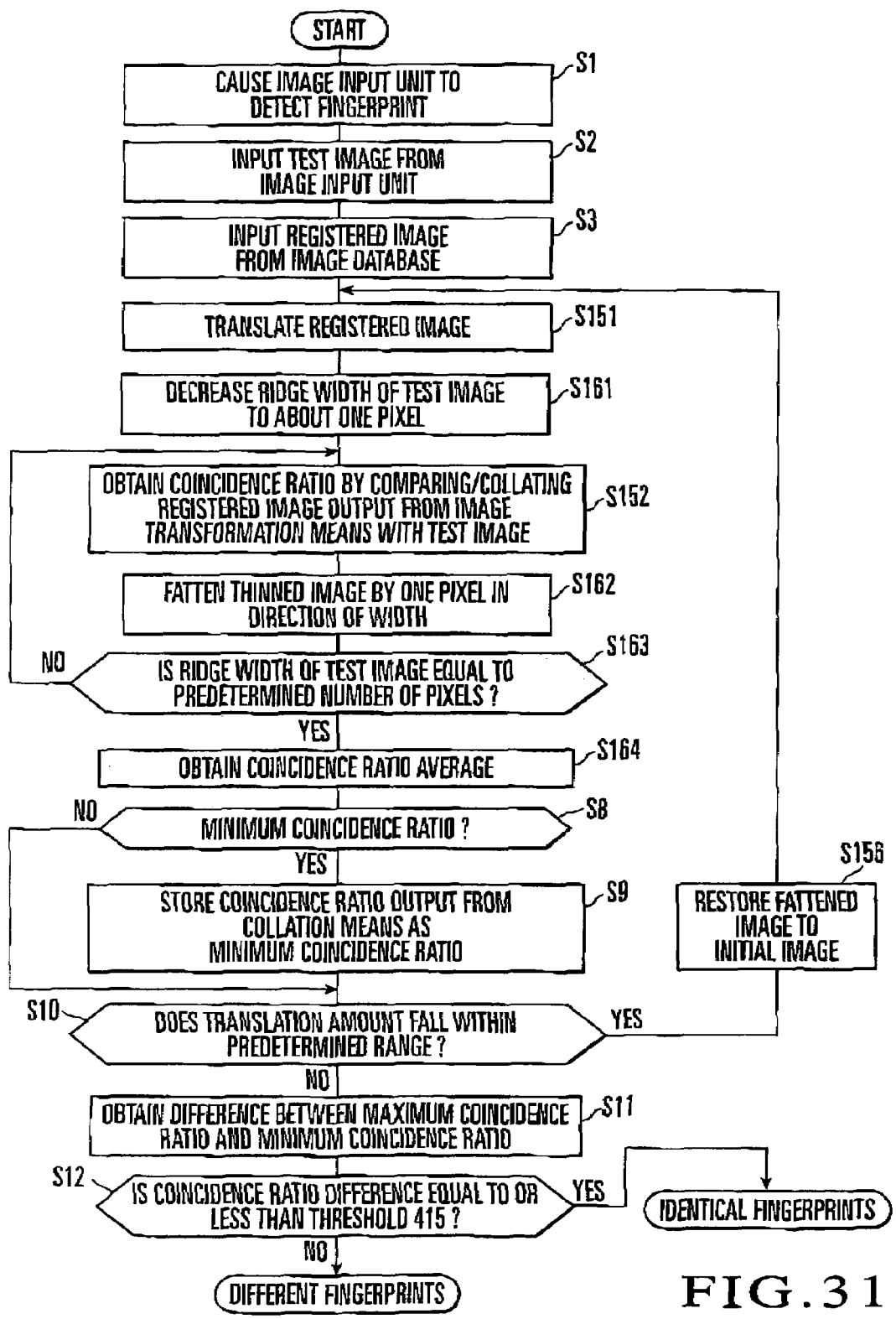
FIG. 31 is a flow chart showing the collating operation of the 17th embodiment of the present invention.

FIG. 31 shows a collation procedure in the 17th embodiment in FIG. 30. This embodiment differs from the 16th embodiment in the following points. First, in the image processing means 601, the thinning means 610 executes thinning processing to uniformly decrease the ridge width of a test image to a width corresponding to one pixel of a skeletal portion, and outputs an image (thinned image) having a line width corresponding to about one pixel (step S161). Second, the expansion means 620 outputs a second test image while fattening the input thinned image input from the thinning means 610 in the direction of width (step S162). In step S152, the collation means 23 obtains a coincidence ratio while comparing/collating the second test image output from the expansion means 620 with the registered image output from the image transformation means 13.

If the width of a ridge of the second test image is smaller than a width corresponding to a predetermined number of pixels (step S163), the flow returns to step S162 to increase the ridge width of the second test image by one pixel. When the ridge width of the second test image becomes equal to a set value (pixel count), the flow advances to step S164, in which a computation means 43 obtains the average of coincidence ratios and outputs it. The subsequent operation is the same as that in the 16th embodiment.

The thinning means 610 can be implemented by a method of sequentially deleting black pixels located outside a set of black pixels while keeping the connectivity (four or eight connections) of black pixels (Hilditch thinning scheme).

The expansion means 620 can be implemented by executing expansion processing in which if at least one black pixel exists among neighboring pixels (four or eight neighboring pixels) around a target pixel, the black pixel is set as a target pixel.

In this embodiment, by thinning a test image once and then fattening the image by expansion processing, even a test image detected from a person whose ridge width is small can be controlled to have an optimal ridge width. By optimizing the ridge width, the collation precision can be improved.

(18th Embodiment)

Figure 32:
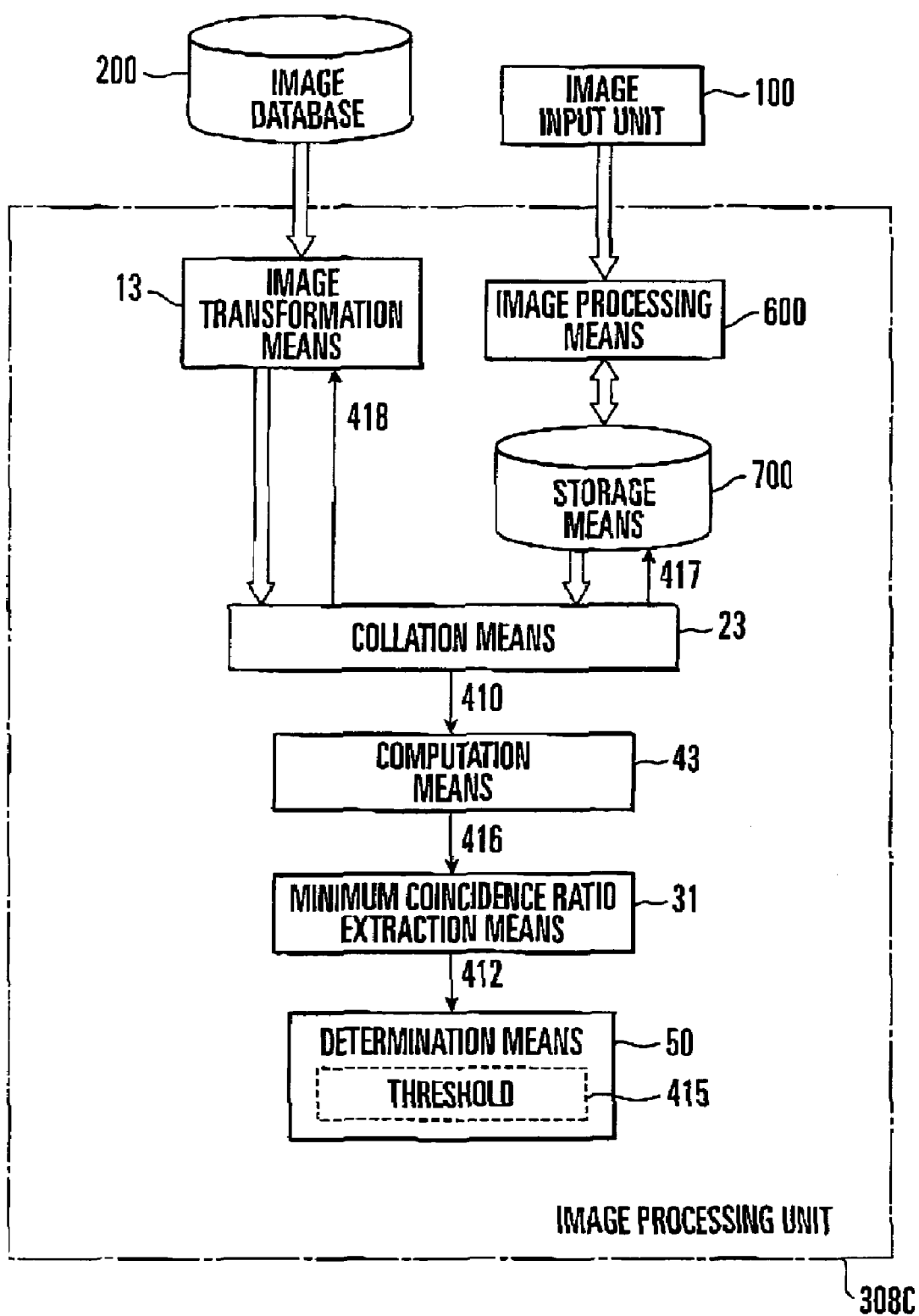
FIG. 32 is a block diagram showing the arrangement of an image collation apparatus according to the 18th embodiment of the present invention.

FIG. 32 shows the 18th embodiment of the present invention. This embodiment differs from the 16th embodiment shown in FIGS. 26 to 29 in that an image processing unit 308C includes a storage means 700. The storage means 700 stores all test images having different ridge widths output from an image processing means 600. A test image is output from the storage means 700 in accordance with a signal 417 for prompting the input of a test image from a collation means 23.

Figure 33:
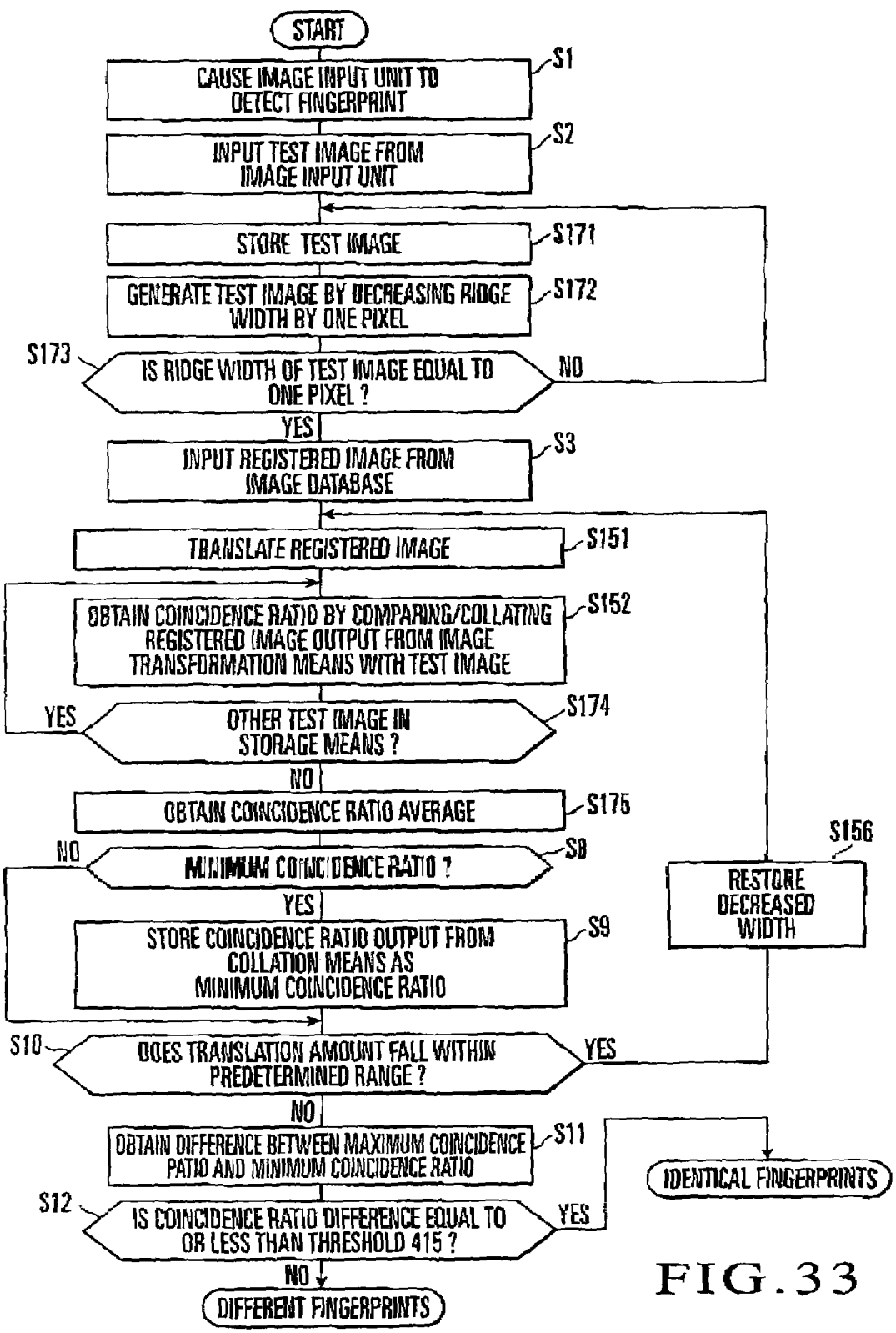
FIG. 33 is a flow chart showing the collating operation of the 18th embodiment of the present invention.

FIG. 33 shows a collation procedure in the 18th embodiment. This embodiment differs from the 16th embodiment shown in FIG. 27 in the following points. First, all test images having different line widths output from an image processing means 600 are stored in a storage means 700. Second, test images having different line widths are sequentially output from the storage means 700 in accordance with a signal for prompting the input of the test images output from a collation means 23.

The fingerprint of a finger placed on the sensor of an image input unit 100 is detected (step S1). The image input unit 100 then sends the test image based on the detected fingerprint to the image processing unit 308C (step S2).

After the test image is stored in the storage means 700 (step S171), the image processing unit 308C outputs the image obtained by decreasing the ridge line width of the test image by one pixel (step S172). In step S173, it is checked whether the ridge line width of the test image is equal to a predetermined value (e.g., one pixel) or not. If the ridge width is not the predetermined value, the flow returns to step S171 to store the test image obtained by decreasing the ridge width. The flow then advances to step S172 to decrease the ridge width of the test image. Subsequently, the above operation is repeated.

If it is determined in step S173 that the width of the test image is equal to the predetermined value, the flow advances to step S3 to input the registered image from an image database 200 to an image transformation means 13 of the image processing unit 308C, and translation is performed.

The flow then advances to step S152. The collation means 23 compares/collates the registered image from the image transformation means 13 with one test image from the storage means 700 to obtain a coincidence ratio, and sends the obtained coincidence ratio to a computation means 43.

If it is determined in step S174 that other test images are left in the storage means 700, the flow returns to step S153 to sequentially perform comparing/collating operation for the next identification target stored in the storage means 700.

If it is determined in step S174 that no other test images are left in the storage means 700, the flow returns to step S175 to obtain a coincidence ratio average by using the computation means 43. Thereafter, the flow advances to step S8 to perform the same operation as that in the 16th embodiment.

In this embodiment, once a test image having the line width preset by the image processing means is generated, since the image processing means can be omitted in the process of repeating the operations performed by the image transformation means 13 and collation means 23, the processing speed can be increased.

(19th Embodiment)

Figure 34:
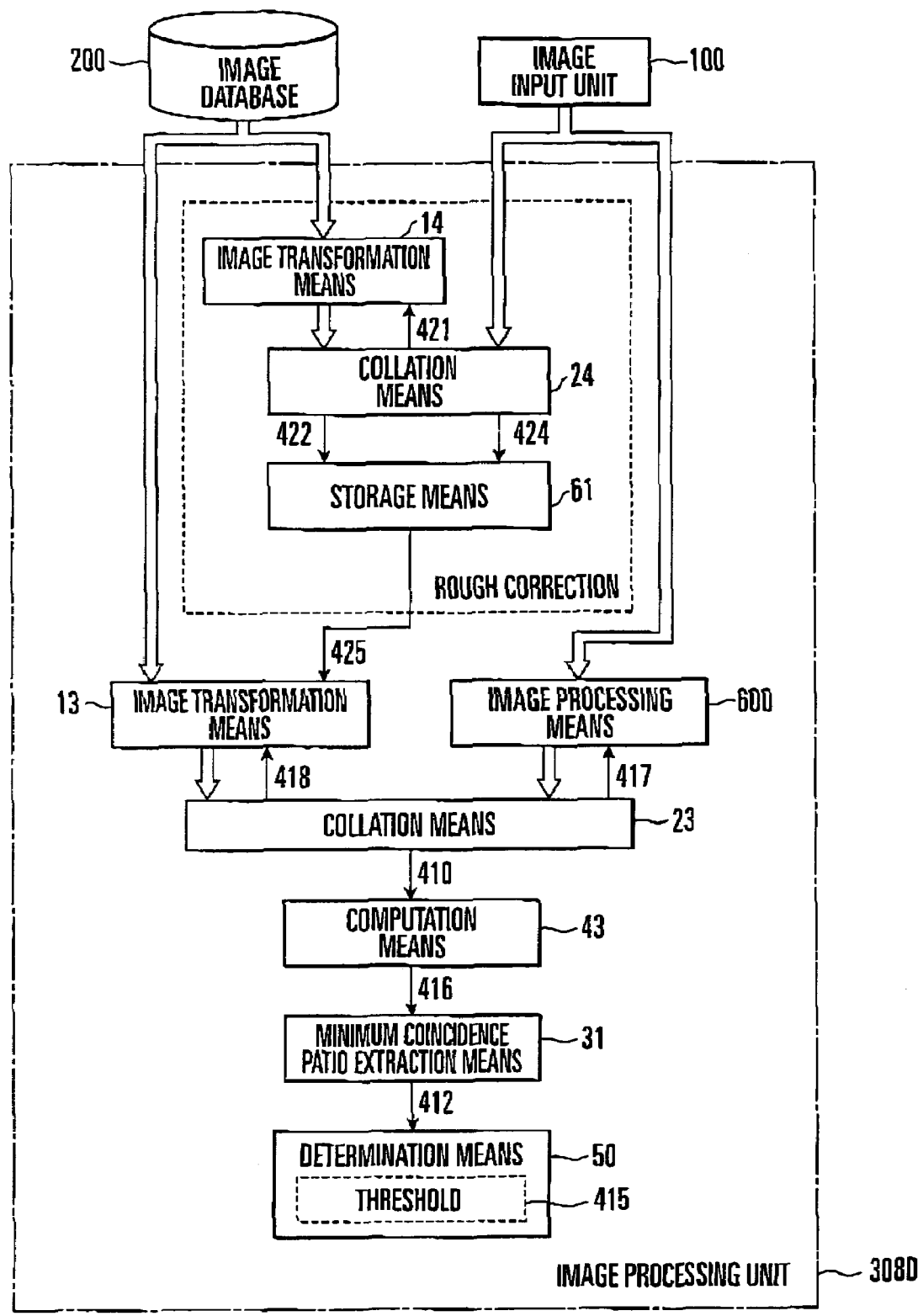
FIG. 34 is a block diagram showing the arrangement of an image collation apparatus according to the 19th embodiment of the present invention.

FIG. 34 shows the 19th embodiment of the present invention. This embodiment differs from the 16th embodiment shown in FIGS. 26 and 27 in the following points. First, an image processing unit 308D includes an image transformation means 14, collation means 24, and storage means 61 as a means for roughly correcting the relative positional offset between a registered image and a test image, and a translation amount set when a maximum coincidence ratio is obtained in the process of repeating translation performed by the image transformation means 14 and comparison/collation performed by the collation means 24 is stored in the storage means 61. Second, a translation amount 425 is output from the storage means 61 to the image transformation means 14 corresponding to the image transformation means 13 in the 16th embodiment to cause the image transformation means 14 to start translating the test image from the second initial position set by adding the translation amount 425 to the first initial position.

The image transformation means 14 receives the test image and outputs the test image obtained by translating (shifting) each pixel of the input image by a predetermined change amount.

The collation means 24 totals the number of pixels whose luminance values coincide with each other, within a predetermined collation region, in the test image input from an image input unit 100 and the registered image input from an image database 200, and obtains a coincidence ratio between the two images from the number of coincident pixels and the number of black pixels of the registered image. In addition, the collation means 24 outputs a translation amount to the image transformation means 14 to repeat translation by the image transformation means 14 and comparison/collation by the collation means 24 until the translation amount falls outside a first set range. The first set range is equal to the translation range in the 16th embodiment.

The storage means 61 stores a translation amount 422 set when a coincidence ratio 424 output from the collation means 24 becomes maximum.

An image transformation means 13 moves the test image input from the image processing means 600 to the second initial position set by adding the translation amount 425 output from the storage means 61 to the first initial position, changes the test image by a predetermined amount in accordance with a translation designation signal 417, and then outputs the resultant test image.

Figure 35A:
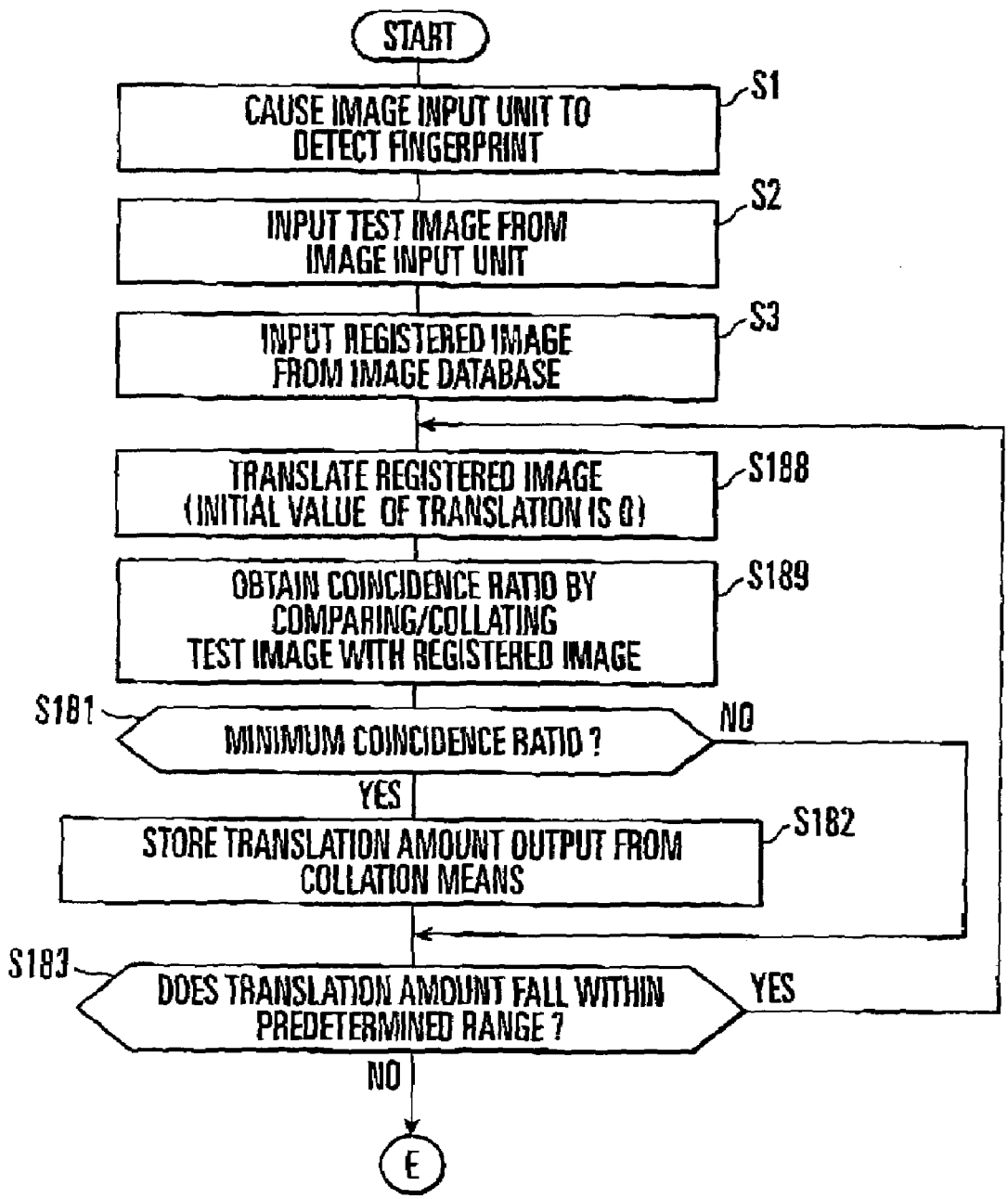
FIG. 35 is a flow chart showing the collating operation of the 19th embodiment of the present invention.
Figure 35B:
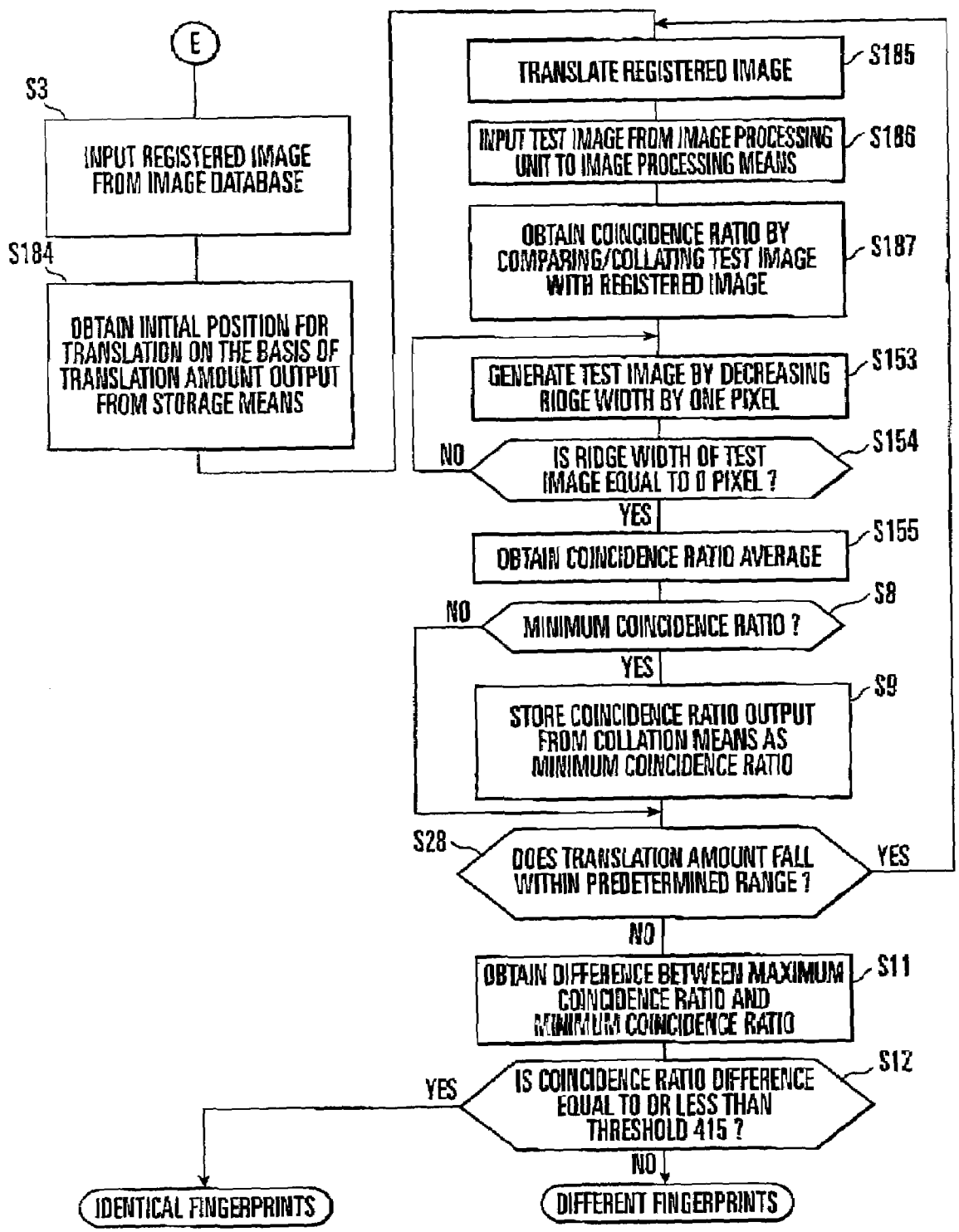

FIG. 35 shows a collation procedure in the 19th embodiment in FIG. 34.

The image input unit 100 detects the fingerprint of a finger placed on the sensor and generates a test image (step S1). The image processing unit 308D receives the test image from the image input unit 100 (step S2) and a registered image from the image database 200 (step S3) and translates the registered image by using the image transformation means 14 (step S188). The collation means 24 compares/collates the registered image output from the image transformation means 14 with the test image output form the image input unit 100 to obtain a coincidence ratio (step S189). If it is determined in step S181 that the coincidence ratio output from the collation means 24 is a maximum value, the storage means 61 stores the translation amount 422 output from the collation means 24 at this time (step S182).

If it is determined in step S183 that the movement amount with respect to the first initial position falls within a set range, the collation means 24 outputs a translation designation signal 421. If the movement amount of the registered image exceeds the first set range, the flow advances to step S3, in which the storage means 61 outputs the stored translation amount 422 as the translation amount signal 425. If the movement amount of the registered image exceeds the first range, the image transformation means 13 sets a second initial position by adding the movement amount signal 425 to the first initial position (step S184), and moves the registered image input from the image database 200 to the second initial position. In accordance with the translation amount signal 417 output from the collation means 23, the registered image moved to the second initial position is translated (step S185).

A collation means 23 compares/collates the test image from the image input unit 100 with the registered image to obtain a coincidence ratio between the two images (step S187). Thereafter, the flow advances to step S153. The subsequent processing is the same as that in the 16th embodiment shown in FIG. 27, and hence a description thereof will be omitted.

The image transformation means 13 can be implemented by a method similar to that for the image transformation means 14. The image transformation means 13 may execute processing for a test image instead of a registered image. The method of translating (shifting) a registered image has been described. An angular offset can also be corrected by adding rotation processing to the linear transformation performed by the image transformation means 14 as well as translation. The storage means 61 can be implemented by a method of storing the translation amount 422 set when the coincidence ratio becomes maximum.

In this embodiment, if the second set range of translation amounts output from the collation means 23 is set to be narrower than the first set range of translation amounts output from the collation means 24, the processing of repeating comparison/collation for a plurality of test images having different ridge widths can be reduced. Hence, the processing time can be shortened.

(20th Embodiment)

Figure 36:
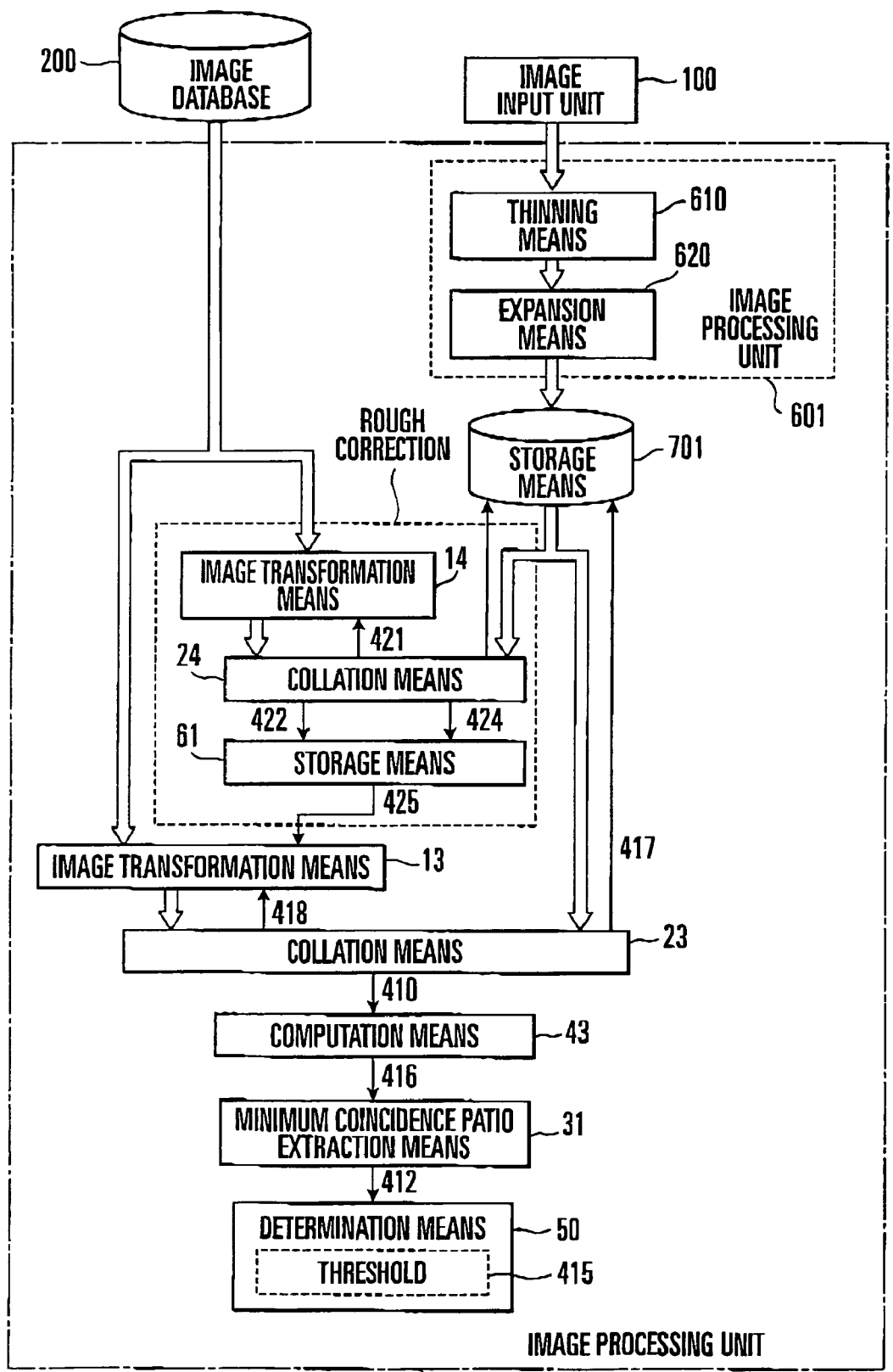
FIG. 36 is a block diagram showing the arrangement of an image collation apparatus according to the 20th embodiment of the present invention.

FIG. 36 shows the 20th embodiment of the present invention. This embodiment is different from the 19th embodiment shown in FIGS. 34 and 35 in that an image processing unit 308E includes a storage means 701, and an image processing means 601 is constituted by a thinning means 610 and expansion means 620. The storage means 701 can be implemented by the same method as that in the 18th embodiment. The thinning means 610 and expansion means 620 can be implemented by the same method as that in the 17th embodiment shown in FIG. 30.

Figure 37A:
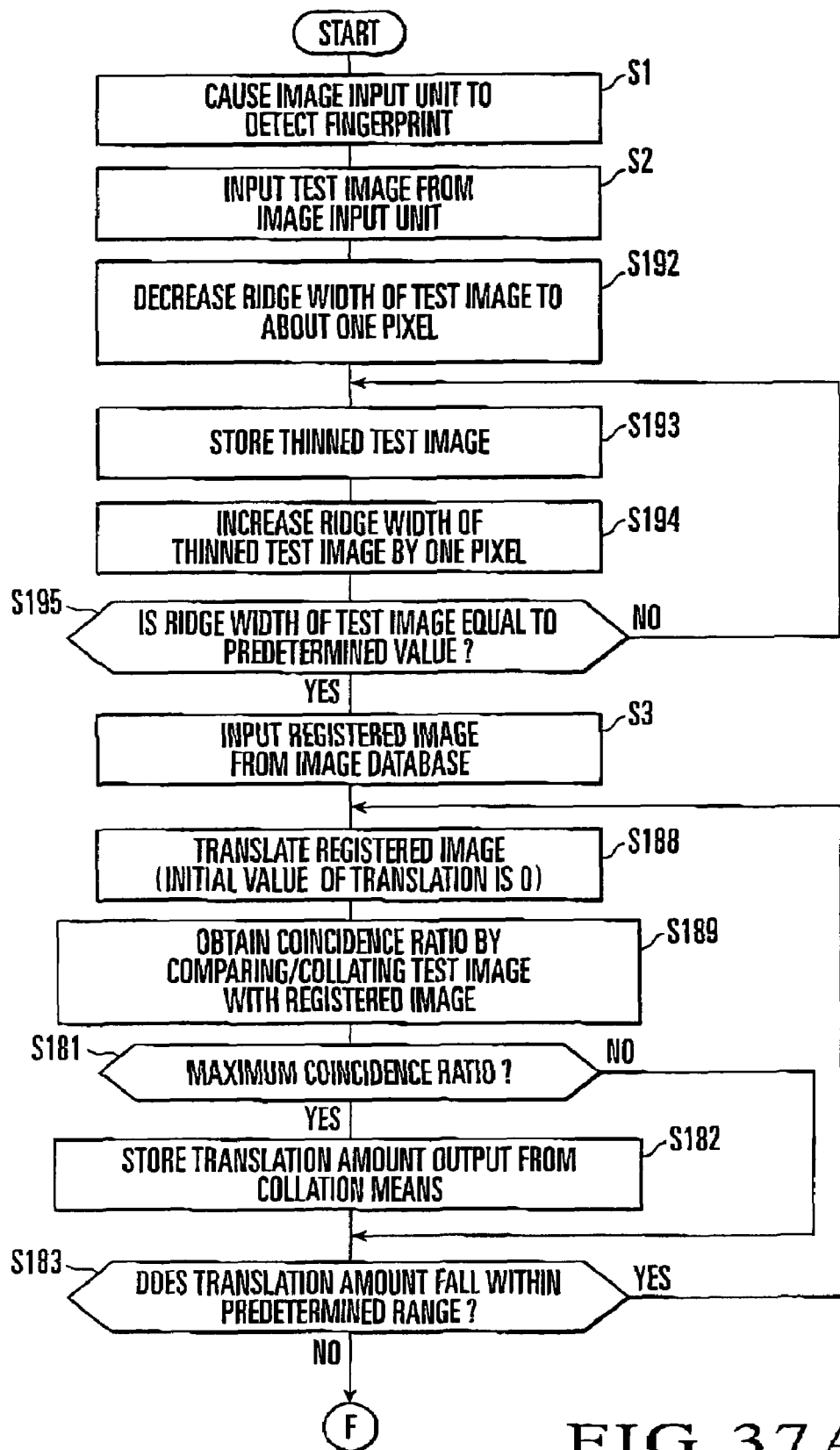
FIG. 37 is a flow chart showing the collating operation of the 20th embodiment of the present invention.
Figure 37B:
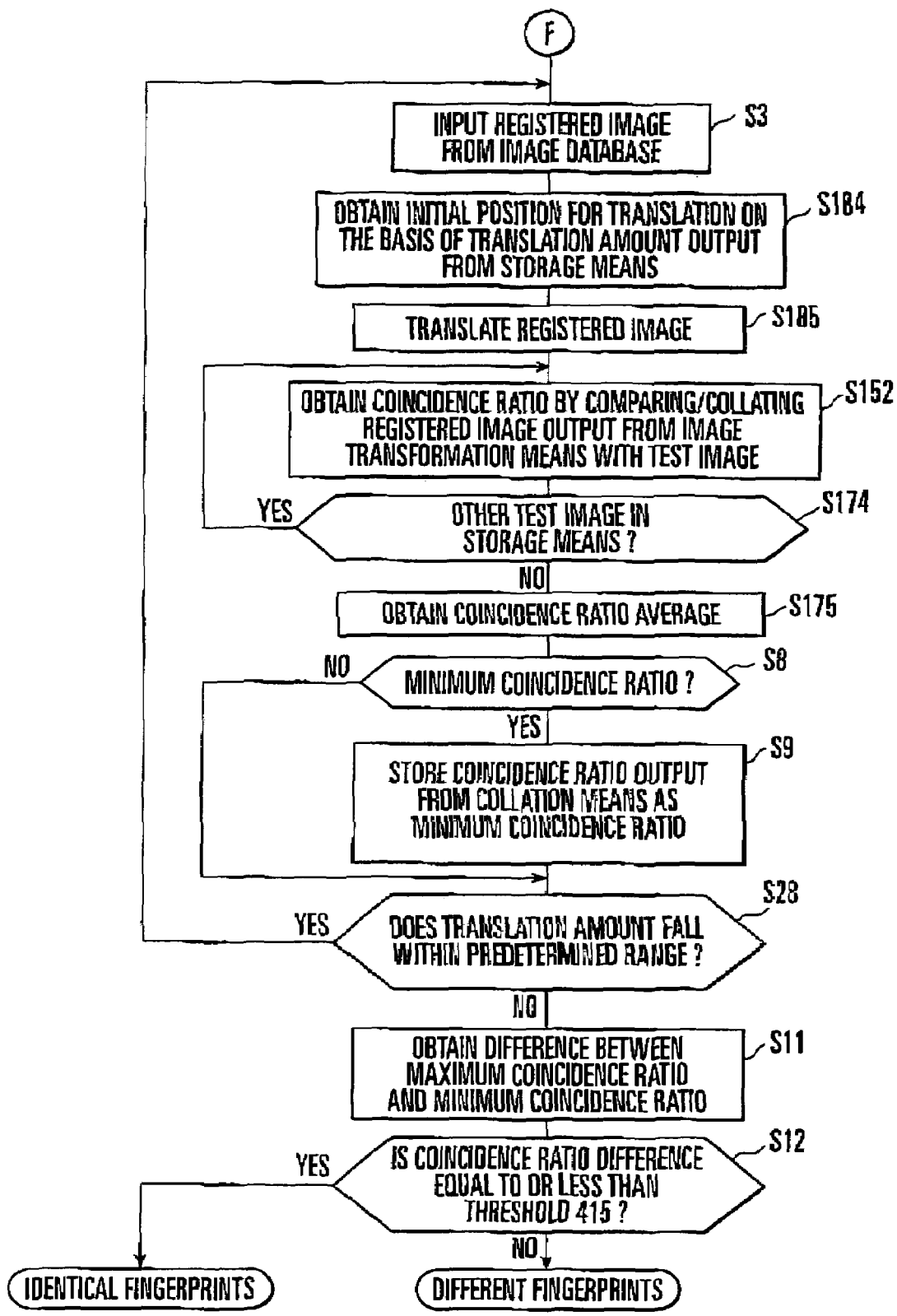

FIG. 37 shows a collation procedure in the 20th embodiment. This procedure differs from that in the 19th embodiment shown in FIG. 35 in the following point. To roughly correct a positional offset, a collation means 24 receives a test image whose ridge width is controlled to an optimal value in advance by thinning the image and fattening it by using the expansion means.

An image input unit 100 detects the fingerprint of a finger placed on the sensor and generates a test image (step S1). The image processing unit 308E receives the test image from the image input unit 100 (step S2).

The image processing unit 308E inputs the test image to the thinning means 610. In step S192, an image processing means 601 causes the thinning means 610 to decrease the ridge width of the test image to a value corresponding to about one pixel, and causes the storage means 701 to store it. In step S194, the thinned test image is fattened by one pixel. In step S195, it is checked whether the ridge width of the test image is equal to a predetermined value. If NO in step S195, the flow returns to step S193 to cause the storage means 701 to store the ridge width. If it is determined in step S195, after the same operation as described above is repeated, that the ridge width of the test image becomes equal to the predetermined value, the flow advances to step S3 to perform the same processing as that in FIG. 33.

In this embodiment, when the collation means 24 performs comparison/collation for rough correction, the image processing means controls the ridge width of a test image to improve the precision of rough position correction, thus improving the collation precision.

(21st Embodiment)

The arrangement of the 21st embodiment is the same as that of the 19th embodiment shown in FIG. 34, and hence a description thereof will be omitted. In addition, the collation procedure in the 21st embodiment is the same as that in the 19th embodiment shown in FIG. 35, and hence a description thereof will be omitted.

The 21st embodiment differs from the 19th embodiment in the following point. In order to roughly correct a positional offset, the change amount of translation amount for each moving operation which is output from a collation means 24 is set to be larger than the change amount of translation amount and rotational angle for each moving operation which is output from a collation means 23 to perform collation upon weighting.

In this embodiment, since the translation and rotation performed by the image transformation means 14 for rough correction and the number of times the collation means 24 repeats comparison/collation can be reduced, the processing time can be shortened.

(22nd Embodiment)

The arrangement of the 22nd embodiment is the same as that of the 19th embodiment shown in FIG. 34, and hence a description thereof will be omitted. In addition, the collation procedure in the 22nd embodiment is the same as that in the 19th embodiment shown in FIG. 35, and hence a description thereof will be omitted.

The 22nd embodiment differs from the 19th embodiment in the following point. The area of a collation region set for a collation means 24 in advance is set to be smaller than the area of a collation region set for a collation means 23 in advance to perform collation upon weighting.

In this embodiment, in roughly correcting the relative positional offset between a registered image and a test image, the number of pixels to be compared/collated with each other can be reduced, thus shortening the processing time.

In the 16th to 22nd embodiments shown in FIGS. 26 to 37, images to be collated are fingerprint image. If, however, this embodiment is applied to a case wherein images having similar shapes, e.g., animal noseprint images, are compared/collated with each other to determine coincidence/incoincidence, the collation precision can be improved.

(23rd Embodiment)

In the 23rd embodiment, as in the first embodiment shown in FIGS. 1 and 2, when the difference between a minimum coincidence ratio and a maximum coincidence ratio is obtained, and the two images are determined as identical fingerprint images if the difference is larger than a threshold, comparing/collating operation may be partially repeated by using the region designation means and procedure in the 11th embodiment shown in FIGS. 18 and 19.

Figure 38:
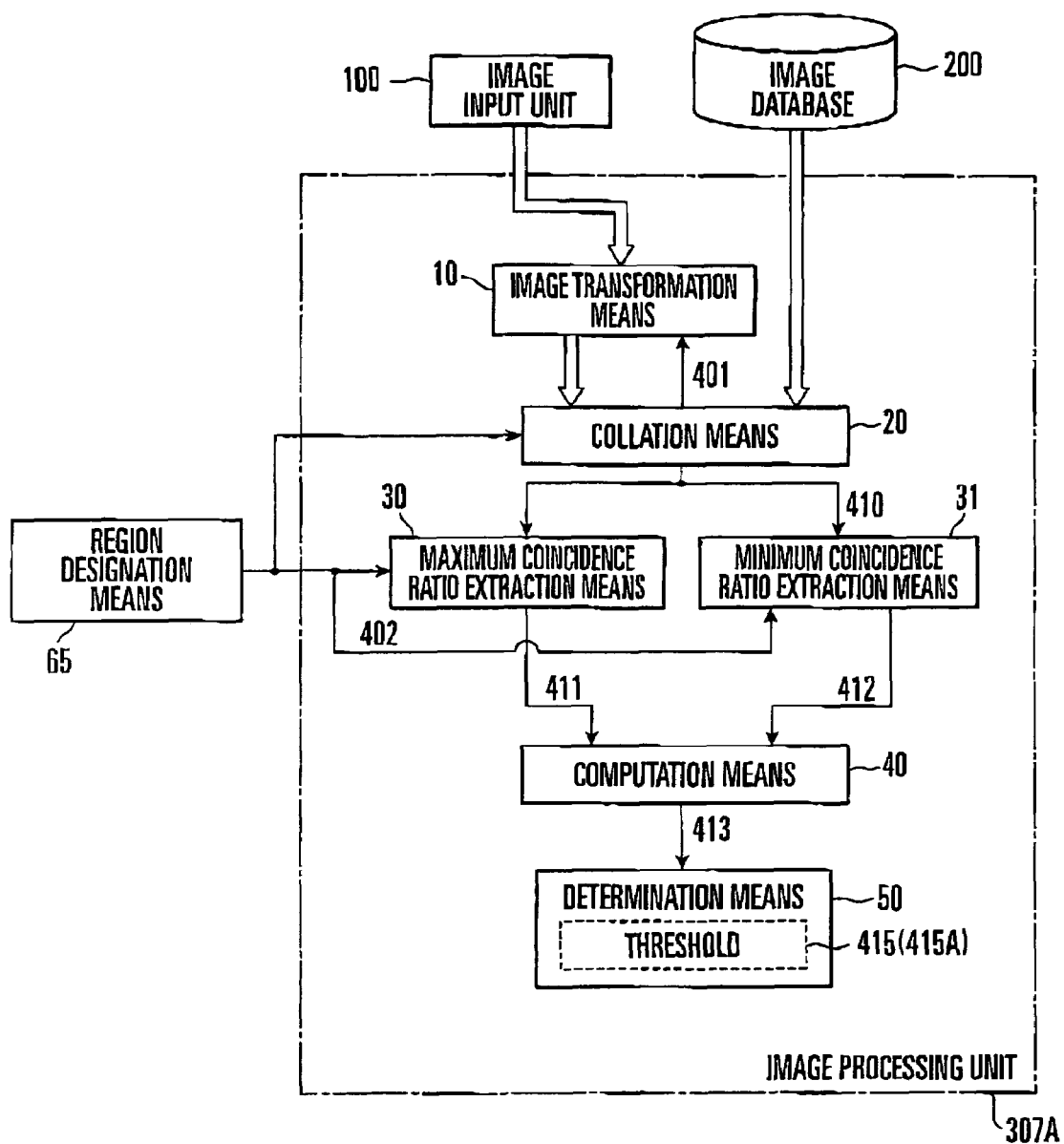
FIG. 38 is a block diagram showing the arrangement of an image collation apparatus according to the 23rd embodiment of the present invention.
Figure 39:
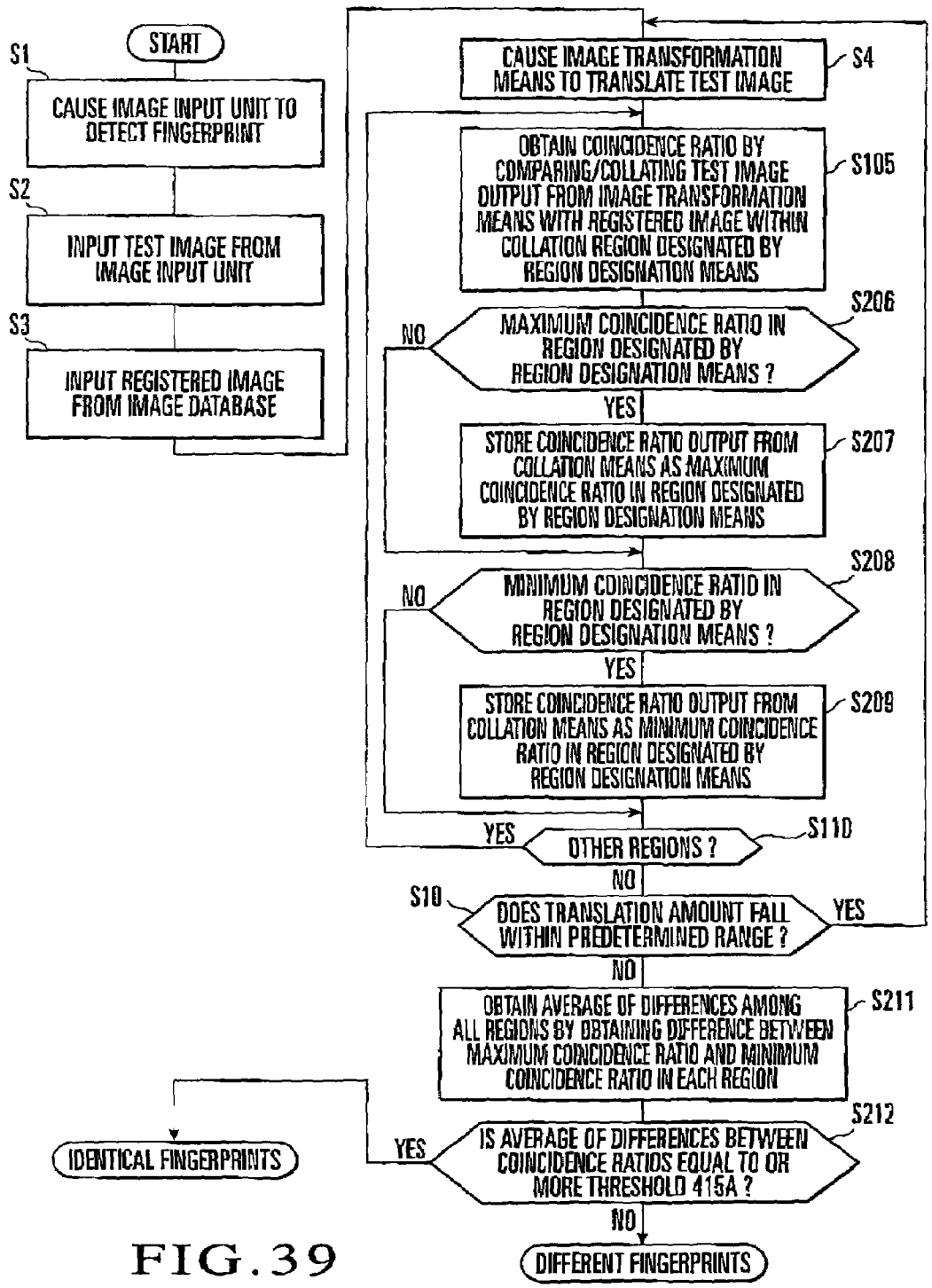
FIG. 39 is a flow chart showing the collating operation of the 23rd embodiment of the present invention.

The arrangement and procedure of this embodiment are shown in FIGS. 38 and 29. Since the respective elements and steps in this embodiment are the same as those in the above embodiment, the same reference numerals and symbols as in the above embodiment denote the same elements and steps in this embodiment. Referring to FIG. 38, an image processing unit 307A' is obtained by adding a circuit for obtaining the difference between a maximum coincidence ratio and a minimum coincidence ratio, which is shown in FIG. 1, to the arrangement shown in FIG. 19. Referring to FIG. 39, steps S206 to S212 are newly added or added upon partial changes to the procedure shown in FIG. 19 to obtain the difference between a maximum coincidence ratio and a minimum coincidence ratio.

(24th Embodiment)

In the 24th embodiment, image thinning and expansion processing are added to the 23rd embodiment shown in FIGS. 38 and 39.

Figure 40:
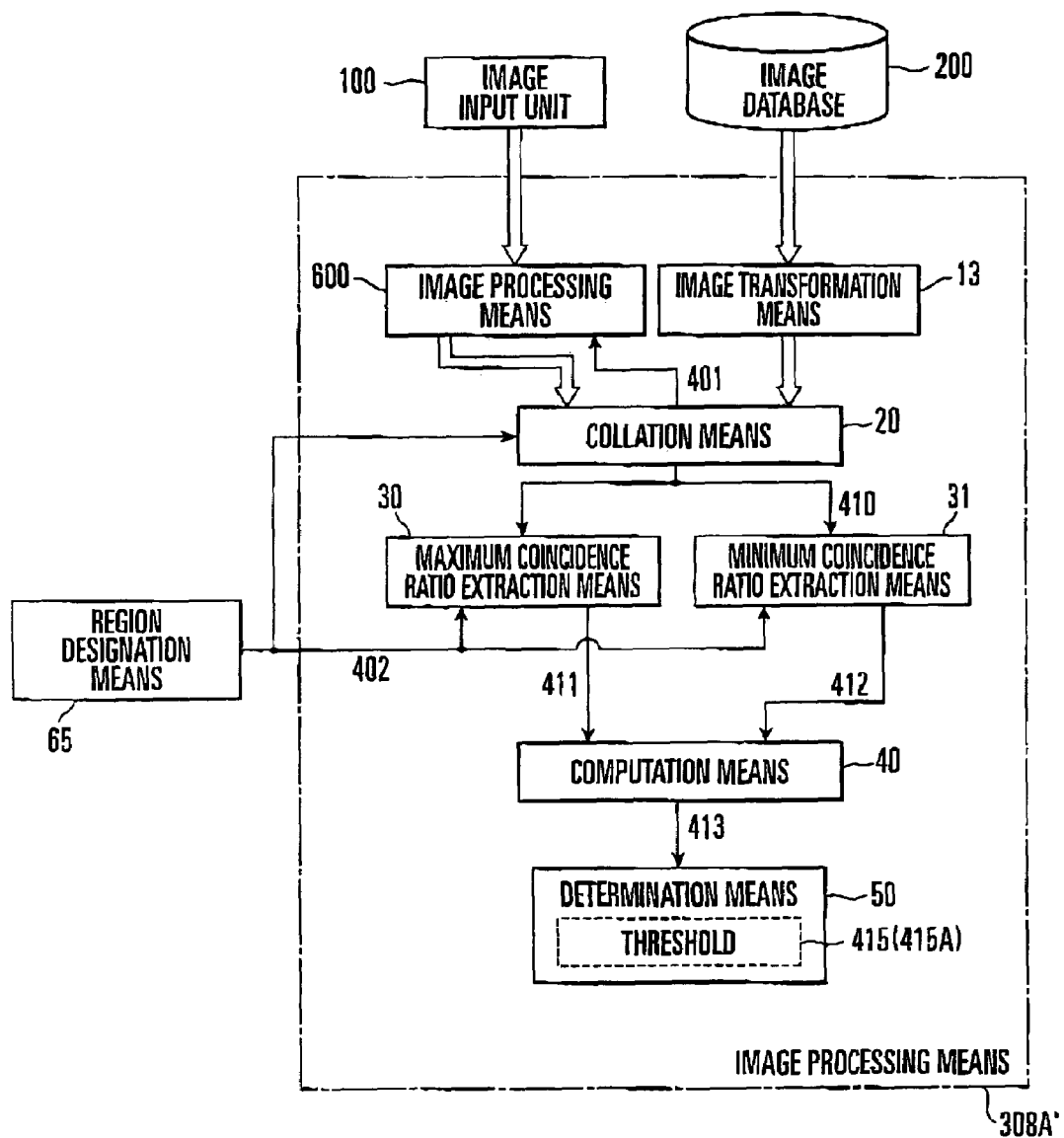
FIG. 40 is a block diagram showing the arrangement of an image collation apparatus according to the 24th embodiment of the present invention.
Figure 41:
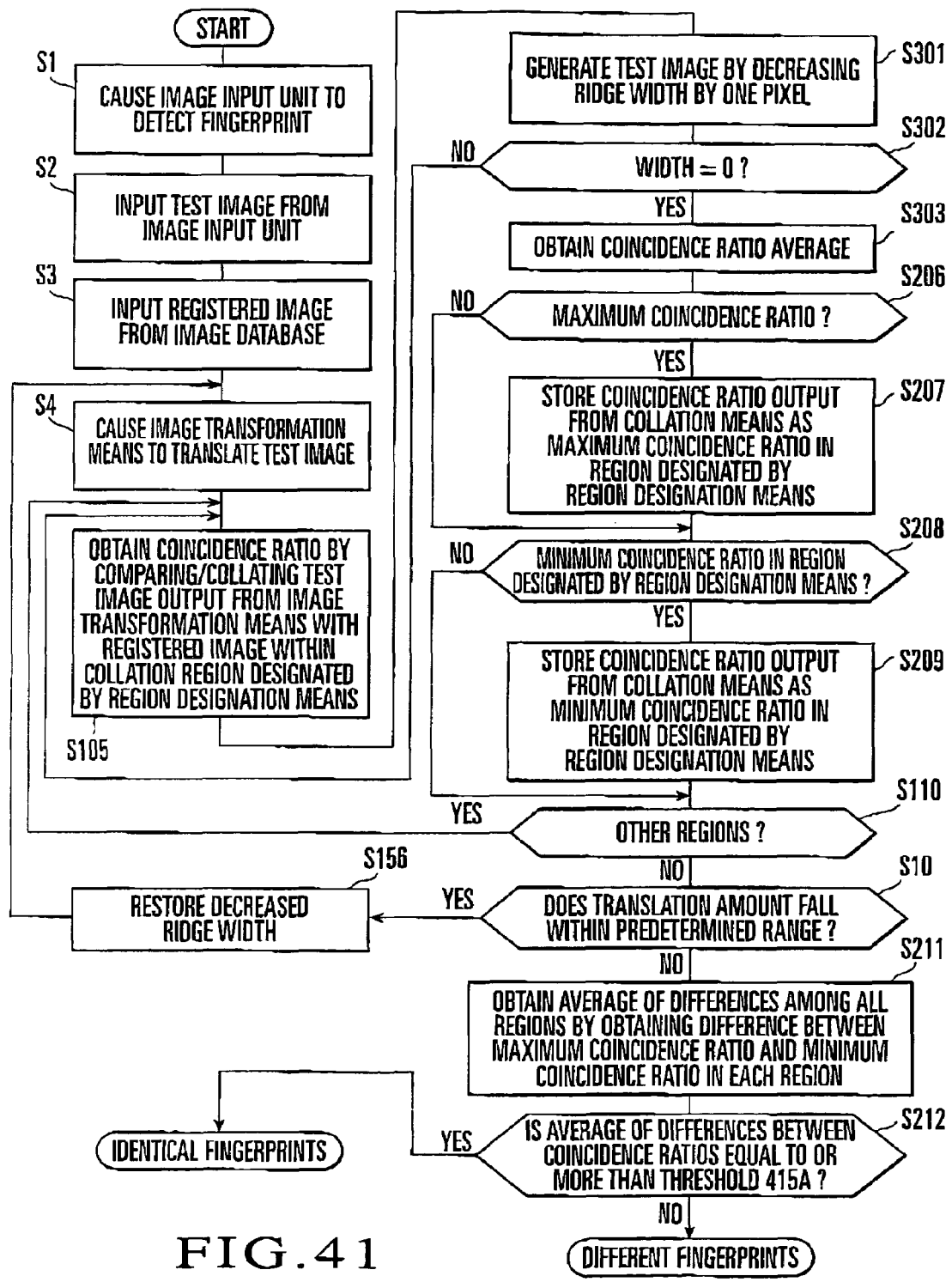
FIG. 41 is a flow chart showing the collating operation of the 24th embodiment of the present invention.

FIGS. 40 and 41 show the arrangement and procedure of the 24th embodiment. Since the respective elements and steps in this embodiment are the same as those in the above embodiment, the same reference numerals and symbols as in the above embodiment denote the same elements and steps in this embodiment. Referring to FIG. 40, an image processing unit 308A' is obtained by adding an image processing means 600 and image transformation means 13 (corresponding to the image transformation means 10) in FIG. 26 to the arrangement shown in FIG. 38. Referring to FIG. 41, steps S301 to S303 are newly added or added upon partial changes to the procedure shown in FIG. 39 to perform image thinning and expansion processing. More specifically, in step S301, the ridge width of a test image is reduced by one pixel to generate a new test image. In step S302, it is checked whether the ridge width is 0. If NO in step S302, the flow advances to step S105. If it is determined in step S105 that the ridge width become 0, the flow returns to step S303 to obtain a coincidence ratio average. The flow then advances to step S206.

The present invention is not limited to the above embodiments, and the embodiments can be variously combined. The combination of embodiments can be changed in accordance with the design specifications of an apparatus or the needs of a user.

What is claimed is:

1. An image collation apparatus comprising:
    an image database for recording a second image as a registered image;
    collation means for obtaining a plurality of coincidence ratios by collating a first image with the registered image,
    minimum coincidence ratio extraction means for obtaining a minimum coincidence ratio from the plurality of coincidence ratios obtained from said collation means;
    maximum coincidence ratio extraction means (30) for obtaining a maximum coincidence ratio from coincidence ratios output from said first collation means (20, 22),
    computation means (40) for obtaining a difference between the maximum coincidence ratio output from said maximum coincidence ratio extraction means (30) and the minimum coincidence ratio output from said minimum coincidence ratio extraction means (31), and
    determination means (50) for determining that the first and second images are identical, if the difference output from said computation means (40) is not less than a predetermined threshold.

2. The image collation apparatus according to claim 1, wherein said apparatus further comprises first image transformation means (10, 12, 13) for repeatedly executing at least one of translation processing and rotation processing for the first image within a predetermined range for each collation unit and outputting the first image after the image processing, and said first collation means (20, 22) obtains the coincidence ratio by collating the first image output from said first image transformation means (10, 12, 13) with the second image every time said first image transformation means (10, 12) performs image processing.

3. The image collation apparatus according to claim 1, further comprising:
    computation means (40) for obtaining a quotient by dividing a maximum coincidence ratio output from said maximum coincidence ratio extraction means by the minimum coincidence ratio output from said minimum coincidence ratio extraction means.

4. The image collation apparatus according to claim 1, wherein said determination means (51) determines that the first and second images are identical, if the maximum coincidence ratio output from said maximum coincidence ratio extraction means (30) is not less than a first predetermined threshold and the minimum coincidence ratio output from said minimum coincidence ratio extraction means is smaller than a second predetermined threshold (first threshold≧second threshold).

5. The image collation apparatus according to claim 2, further comprising:
    second image transformation means (11, 14) for repeatedly executing at least one image processing of translation processing and rotation processing for the first image located at a first initial position by a predetermined amount within a predetermined range, and outputting the first image after image processing,
    second collation means (21) for obtaining a coincidence ratio by collating the first image output from said second image transformation means (11) with the second image every time said second image transformation means (11) performs image processing, and
    storage means (60) for storing a translation amount, rotational angle, or both a translation amount and rotational angle of the first image from the first information position to a current position when the coincidence ratio output from said second collation means becomes maximum, and said first image transformation means (12) moves the first image to a second initial position set by adding the translation, rotational angle, or translation amount and rotational angle stored in said storage means (60) to the first initial position, and executes at least one of translation processing and rotation processing for the first image.

6. The image collation apparatus according to claim 5, wherein the range predetermined for said first image transformation means (12) is narrower than the range predetermined for said second image transformation means (11).

7. The image collation apparatus according to claim 5, wherein a collation region in which said second collation means (21) obtains the coincidence ratio is smaller than a collation region in which said first collation means (22) obtains the coincidence ratio.

8. The image collation apparatus according to claim 5, wherein the translation amount, rotational angle, or translation amount and rotational angle by which said second image transformation means (12) moves the first image for each moving operation are larger than the translation amount, rotational angle, or translation amount and rotational angle by which said first image transformation means moves the first image for each moving operation.

9. The image collation apparatus according to claim 2, further comprising:

reference point detection means (70) for detecting reference points of the first and second images located at the first initial position, and correction amount computation means (80) for obtaining a translation amount, rotational angle, or both translation amount and rotational angle of the first image which is required to make the reference points of the first and second image coincide with each other, and said first image transformation means (13) moves the first image to a second initial position set by adding the translation amount, rotational angle, or translation amount and rotational angle obtained by said correction amount computation means (80) to the first initial position, and executes at least one of translation processing and rotation processing for the first image.

10. The image collation apparatus according to claim 5, further comprising:

reference point detection means (70) for detecting reference points of the first and second images located at the first initial position, and correction amount computation means (80) for obtaining a translation amount, rotational angle, or both translation amount and rotational angle of the first image which is required to make the reference points of the first and second image coincide with each other, and said second image transformation means (14) moves the first image to a new first initial position set by adding the translation amount, rotational angle, or translation amount and rotational angle obtained by said correction amount computation means (80) to the first initial position, and executes at least one of translation processing and rotation processing for the first image.

11. The image collation apparatus according to claim 1, wherein said apparatus further comprises region designation means (65) for sequentially designating a plurality of collation regions predetermined as regions in which the first and second images are collated with each other, and said first collation means (20) obtains coincidence ratios by sequentially collating the first and second images with each other in the collation regions designated by said region designation means (65).

12. The image collation apparatus according to claim 11, further comprising:

computation means (40) for averaging minimum coincidence ratios corresponding to the respective collation regions output from said minimum coincidence ratio extraction means (31), and for averaging maximum coincidence ratios corresponding to the respective collation regions output from said maximum coincidence ratio extraction means (30).

13. The image collation apparatus according to claim 2, further comprising:

region designation means (65) for sequentially designating a plurality of collation regions predetermined as regions in which the first and second images are collated with each other, and said first collation means (20) sequentially obtains a coincidence ratio by collating the first image output from said image transformation means with the second image in each collation region designated by said region designation means (65) every time said first image transformation means performs image processing.

14. The image collation apparatus according to claim 13, further comprising:

computation means (40) for averaging minimum coincidence ratios corresponding to the respective collation regions output from said minimum coincidence ratio extraction means (31), and for averaging maximum coincidence ratios corresponding to the respective collation regions output from said maximum coincidence ratio extraction means (30).

15. The image collation apparatus according to claim 13, further comprising:

selection means for comparing minimum coincidence ratios corresponding to the respective collation regions which are output from said minimum coincidence ratio extraction means (31) and sequentially outputting only a predetermined number of minimum coincidence ratios in increasing order, and for comparing maximum coincidence ratios corresponding to the respective collation regions which are output from said maximum coincidence ratio extraction means (30) and sequentially outputting only a predetermined number of maximum coincidence ratios in decreasing order, and said computation means (40) averages the minimum coincidence ratios output from said selection means, and averages the maximum coincidence ratios output from said selection means.

16. The image collation apparatus according to claim 1, further comprising:

image processing means (600, 601) to reduce a width of an edge portion of a ridge of the second image and to output the second image with a reduced ridge width, said transformation means receives the first image and shifts each pixel of the first image by a predetermined amount and outputs the first image, and said collation means collates the test image output from said image processing means with the output from the said collation means.

17. The image collation apparatus according to claim 16, wherein said image processing means (600, 601) to perform selection of one of contraction and expansion for one of the first and second images.

18. The image collation apparatus according to claim 17, wherein said image processing means (600, 601) performs reduction of the width of the edge portion of the ridge of the second image by repeatedly executing image processing for a selected image for a predetermined amount.

19. The image collation apparatus according to claim 1, wherein said image processing means further comprises:
thinning means (610) for decreasing a line width of an input image to a value corresponding to about one pixel, and
expansion means (620) for fattening the image output from said thinning means, and
increases the line width corresponding to about one pixel to a predetermined width, and outputs the image.

20. The image collation apparatus according to claim 16, further comprising:
storage means (701) for storing an image output from said image processing means and outputting the image to said collation means.

21. The image collation apparatus according to claim 2, further comprising:
second image transformation means (14) for repeatedly executing at least one of translation processing (shifting) and rotation processing for the first image located at the first initial position within a predetermined range for every predetermined amount, and outputting a first image after the processing,
second collation means (24) for obtaining a coincidence ratio by comparing/collating the first image output from said second transformation means with the second image every time said second image transformation means performs processing, and
storage means (61) for storing a translation amount, rotational angle, or translation amount and rotational angle of the first image from the first initial position to a current position when the coincidence ratio output from said second collation means becomes maximum, and
said first image transformation means (13) moves the first image to a second initial position set by adding the translation amount, rotational angle, or translation amount and rotational angle stored in said storage means (61) to the first initial position, and executes at least one of translation processing and rotation processing for the resultant first image.

22. The image collation apparatus according to claim 21, further comprising:
image processing means (601) for selecting one of contraction and expansion for the second image and performing a plurality of different image processes, and
said storage means (701) for storing the second image output from said image processing means, and
said second collation means (24) obtains a coincidence ratio by comparing/collating the first image output from said second image transformation means with the second image output from said storage means every time said second image transformation means performs processing.

23. The image collation apparatus according to claim 21, wherein the range predetermined for said first image transformation means is narrower than the range predetermined for said second image transformation means.

24. The image collation apparatus according to claim 21, wherein the translation amount, rotational angle, or translation amount and rotational angle by which said second image transformation means moves the first image for each moving operation are larger than the translation amount, rotational angle, or translation amount and rotational angle by which said first image transformation means moves the first image for each moving operation.

25. The image collation apparatus according to claim 21, wherein a collation region in which the coincidence ratio is obtained by said second collation means is smaller than a collation region in which a coincidence ratio is obtained by said first collation means.

26. An image collation apparatus comprising:
first collation means (20, 22) for obtaining a relationship between first and second images for each collation unit by collating the first and second images with each other;
minimum coincidence ratio extraction means (31) for obtaining a minimum coincidence ratio from coincidence ratios in the relationship obtained from said first collation means;
region designation means (65) for sequentially designating a plurality of collation regions predetermined as regions in which the first and second images are collated with each other,
maximum coincidence ratio extraction means (30) for obtaining a maximum coincidence ratio from coincidence ratios output from said first collation means (20, 22),
computation means (40) for obtaining a difference between the maximum coincidence ratio output from said maximum coincidence ratio extraction means (30) and the minimum coincidence ratio output from said minimum coincidence ratio extraction means (31), and
determination means (50) for determining that the first and second images are identical, if the difference output from said computation means (40) is not less than a predetermined threshold, and said first collation means obtains coincidence ratios by sequentially collating the first and second images within the collation regions designated by said region designation means (65).

27. The image collation apparatus according to claim 26, further comprising:
image processing means (600, 601) to reduce a width of an edge portion of a ridge of the second image and to output the second image with a reduced ridge width,
transformation means to receive the first image and to shift each pixel of the first image by a predetermined amount and to output the first image,
wherein said first collation means collates the second image output from said image processing means with the output from the said collation means for selecting one of contraction and expansion for one of the first and second images having, said second image undergoing no image processing.

28. An image collation method comprising:
recording a second image as a registered image;
collating a first image with the registered image to obtain a plurality of coincidence ratios;
extracting a minimum coincidence ratio from the plurality of coincidence ratios obtained from collating;
determining that the first image and a registered image are identical if the extracted minimum coincidence ratio is smaller than a predetermined threshold value,
extracting a maximum coincidence ratio from coincidence ratios output in the collating, determining a difference between the maximum coincidence ratio and the minimum coincidence ratio, and determining that the first and second images are identical if the difference between the maximum coincidence ratio and the minimum coincidence ratio is not less than the predetermined threshold.

29. The image collation method according to claim 28, further comprising:
obtaining a quotient by dividing the maximum coincidence ratio by the minimum coincidence ratio, and
determining that that the first and second images are identical if the quotient is not less than another predetermined threshold.

30. The image collation method according to claim 28, further comprising:
determining that the first and second images are identical if the maximum coincidence ratio is not less than a first predetermined threshold and the minimum coincidence ratio is smaller than a second predetermined threshold (first threshold≧second threshold).

31. The image collation method according to claim 28, further comprising:
repeatedly executing at least one image translation process and rotation process for the first image located at a first initial position by a predetermined amount within a predetermined range,
collating the first image after image processing the second image every time image processing is performed for the first image to obtain a coincidence ratio, and
storing a translation amount, a rotational angle, or both a translation amount and the rotational angle of the first image from the first information position to a current position when the coincidence ratio becomes maximum, and
moving the first image to a second initial position set by adding the translation, the rotational angle, or translation amount and the rotational angle stored in the storing to the first initial position, and at least one of translation process and rotation process is executed for the first image.

32. The image collation method according to claim 31, wherein the predetermined range in the at least one image translation is narrower than a predetermined range in another image translation.

33. The image collation method according to claim 31, wherein a collation region in which the coincidence ratio is obtained in collating the second image is smaller than a collation region in which the coincidence ratio is obtained in collating the first image.

34. The image collation method according to claim 31, wherein the translation amount, the rotational angle, or the translation amount and the rotational angle by the first image is moved in the translation of the second image for each moving operation are larger than the translation amount, the rotational angle, or the translation amount and the rotational angle by which the first image is moved in the translation of the first image for each moving operation.

35. The image collation method according to claim 31, further comprising:
detecting reference points of the first and second images located at the first initial position,
determining a correction amount including obtaining a translation amount, a rotational angle, or both the translation amount and the rotational angle of the first image which is required to make the reference points of the first and second image coincide with each other, and the at least one transformation process for the first image comprises:
moving the first image to a second initial position set by adding the translation amount, the rotational angle, or the translation amount and the rotational angle obtained in the determining the correction amount to the first initial position, and executing the at least one of translation process and rotation process for the first image.

36. The image collation method according to claim 35, further comprising:
detecting reference points of the first and second images located at the first initial position before executing at least one other translation process and rotation process, and
the determining the correction amount is required to make the reference points of the first and second image coincide with each other, and
the at least one other translation process and rotation process comprises:
moving the first image to a new first initial position set by adding the translation amount, the rotational angle, or the translation amount and the rotational angle obtained in the determining the correction amount to the first initial position, and executing the at least one of translation process and rotation process for the first image.

37. The image collation method according to claim 32, further comprising:
sequentially designating a plurality of collation regions predetermined as regions in which the first and second images are collated with each other, and
sequentially collating the first and second images with each other in the collation regions to obtain coincidence ratios.

38. The image collation method according to claim 37, further comprising:
image processing including selecting one of contraction and expansion for one of the first and second images and performing a plurality of different image processes, and
collating the first and second images with each other, said collating including collating an image having undergone the image processing with another image having undergone no image processing.

39. An image collation method comprising:
a first collating to obtain a relationship between a first image and a second image by collating the first image and the second image with each other;
extracting a minimum coincidence ratio by obtaining the minimum coincidence ratio from coincidence ratios in the relationship obtained in the first collating;
determining that the first and second images are identical if the extracted coincidence ratio is smaller than a predetermined threshold; and
sequentially designating a plurality of collation regions predetermined as regions in which the first and second images are collated with each other,
obtaining a maximum coincidence ratio from coincidence ratios output in the first collating, and
obtaining a difference between the maximum coincidence ratio and the minimum coincidence ratio,
wherein coincidence ratios are obtained by sequentially collating the first and second images within the collation regions.

40. The method according to claim 39, further comprising:
   selecting one of contraction and expansion for one of the first and second images, and
   collating the first and second images, wherein said collating includes collating an image having undergone image processing with another image having undergone no image processing.

41. A recording medium storing image collation program instructions for causing a computer to execute:
   recording a second image as a registered image;
   collating a first image with the registered image to obtain a plurality of coincidence ratios;
   extracting a minimum coincidence ratio from the plurality of coincidence ratios obtained from collating; and
   determining that the first image and a registered image are identical if the extracted minimum coincidence ratio is smaller than a predetermined threshold value
   extraction a maximum coincidence ratio from coincidence ratios from the plurality of coincidence ratios,
   determining a difference between the maximum coincidence ratio and the minimum coincidence ratio, wherein the first and second images are identical if the difference between the maximum coincidence ratio and the minimum coincidence ratio is not less than the predetermined threshold.

42. The recording medium according to claim 41, further comprising:
   performing first image transformation by repeatedly executing at least one of a translation process and a rotation process for the first image within a predetermined range for each collation unit,
   wherein said collating obtain a coincidence ratio by collating the obtained first image after image processing with the second image.

43. The recording medium according to claim 41, further comprising:
   determining a quotient by dividing the maximum coincidence ratio by the minimum coincidence ratio,
   wherein the first and second images are identical if the quotient is not less than a predetermined threshold.

44. The recording medium according to claim 41, further comprising:
   determining that the first and second images are identical if the maximum coincidence ratio is not less than a first predetermined threshold and the minimum coincidence ratio is smaller than a second predetermined threshold (first threshold second threshold).

* * * * *

UNITED STATES PATENT AND TRADEMARK OFFICE
CERTIFICATE OF CORRECTION

PATENT NO. : 7,031,501 B2  Page 1 of 1
APPLICATION NO. : 09/876319
DATED : April 18, 2006
INVENTOR(S) : Adachi et al.

It is certified that error appears in the above-identified patent and that said Letters Patent is hereby corrected as shown below:

Title Page;
In Item [56], under Other Publications, line 1, please delete "Prceedings" and insert -- Proceedings --.

Signed and Sealed this

First Day of July, 2008

JON W. DUDAS
*Director of the United States Patent and Trademark Office*